United States Patent [19]

Suzuki

[11] 4,377,804
[45] Mar. 22, 1983

[54] SYNCHRONOUS DATA TRANSMISSION SYSTEM UTILIZING AC POWER LINE

[75] Inventor: Yoshiharu Suzuki, Kadoma, Japan

[73] Assignee: Matsushita Electric Works, Ltd., Osaka, Japan

[21] Appl. No.: 200,079

[22] Filed: Oct. 24, 1980

[30] Foreign Application Priority Data

Oct. 31, 1979 [JP] Japan .................................. 54-141577
Nov. 21, 1979 [JP] Japan .................................. 54-151210

[51] Int. Cl.³ ........................ H04M 11/04; H04Q 9/00
[52] U.S. Cl. .......................... 340/310 A; 340/310 CP; 340/538
[58] Field of Search ........ 340/310 A, 310 CP, 310 R, 340/538

[56] References Cited

U.S. PATENT DOCUMENTS

| | | | |
|---|---|---|---|
| 3,458,657 | 7/1969 | Lester et al. | 340/310 CP |
| 3,482,243 | 12/1969 | Buchsbaum | 340/310 CP |
| 3,525,078 | 8/1970 | Baggott | 340/310 R |
| 3,818,466 | 6/1974 | Honda | 340/310 CP |
| 4,024,528 | 5/1977 | Boggs et al. | 340/310 A |
| 4,179,624 | 12/1979 | Shindo et al. | 340/310 A |

*Primary Examiner*—Glen R. Swann, III

*Attorney, Agent, or Firm*—Birch, Stewart, Kolasch and Birch

[57] ABSTRACT

A data transmission system utilizing a power line transmits a data signal of a plurality of bits in a serial fashion in synchronism with the cycles of the alternating current of a power supply. A start signal, channel section signal, control data signal and end signal are sequentially generated to transmit the control data to a selected receiver to control a desired output. Each cycle is divided into at least two phase sections, the one being used for a busy signal and the other being used for a data signal. The data transmission system includes a plurality of transmitters and a plurality of receivers coupled to the power line. Each of the transmitters comprises a receiving circuit for receiving a busy signal from other transmitters, a transmitting circuit for transmitting a data signal, a key input switch for operation, a selecting switch for selecting a channel which receives the transmitted data signal, and a memory for storing the key input signal. The transmitting circuit generates a data signal in response to the key input signal stored in the memory and to a non-busy signal. One embodiment of the transmission system of the present disclosure enables information to be transmitted over multiple-phase power lines.

20 Claims, 51 Drawing Figures

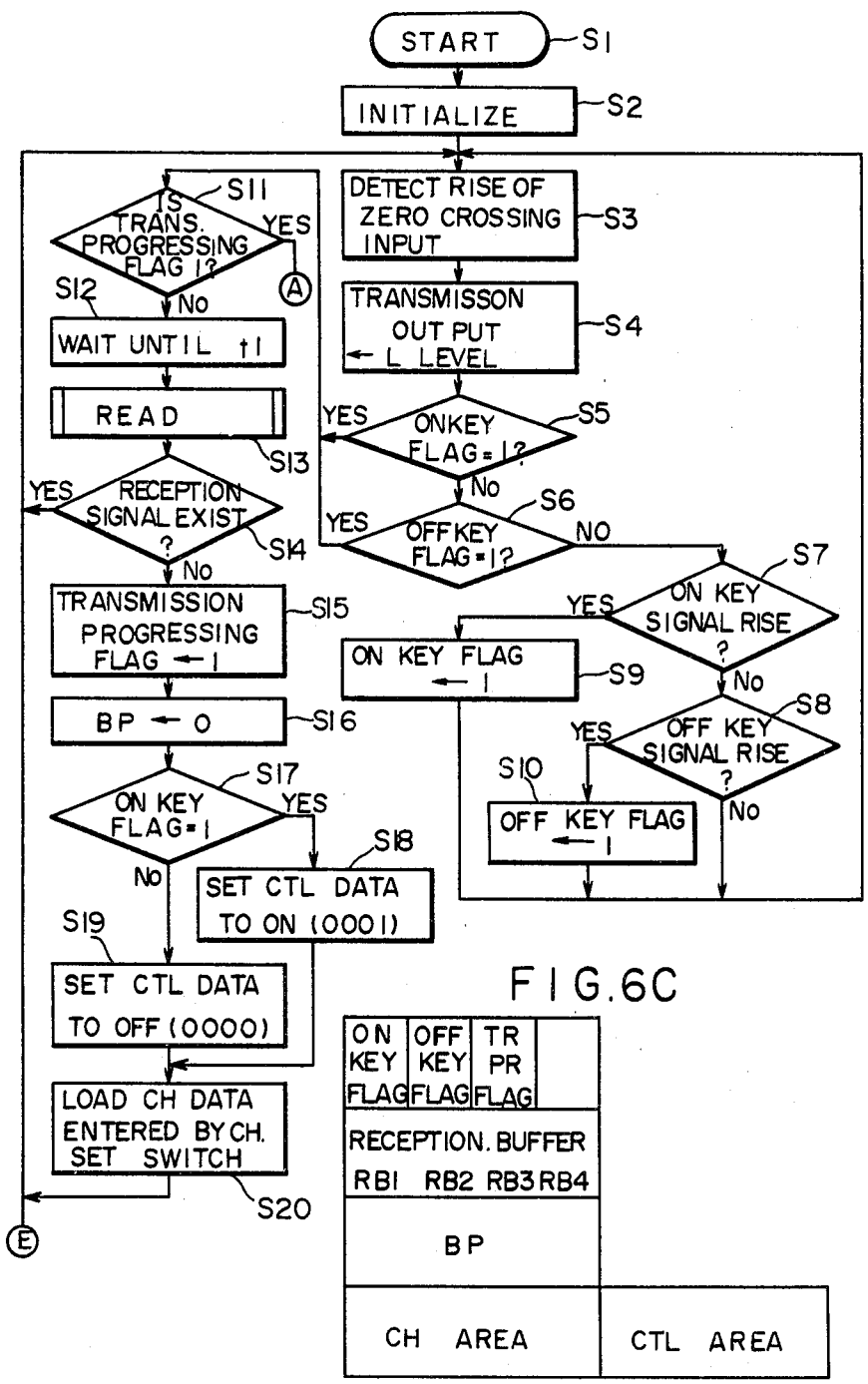

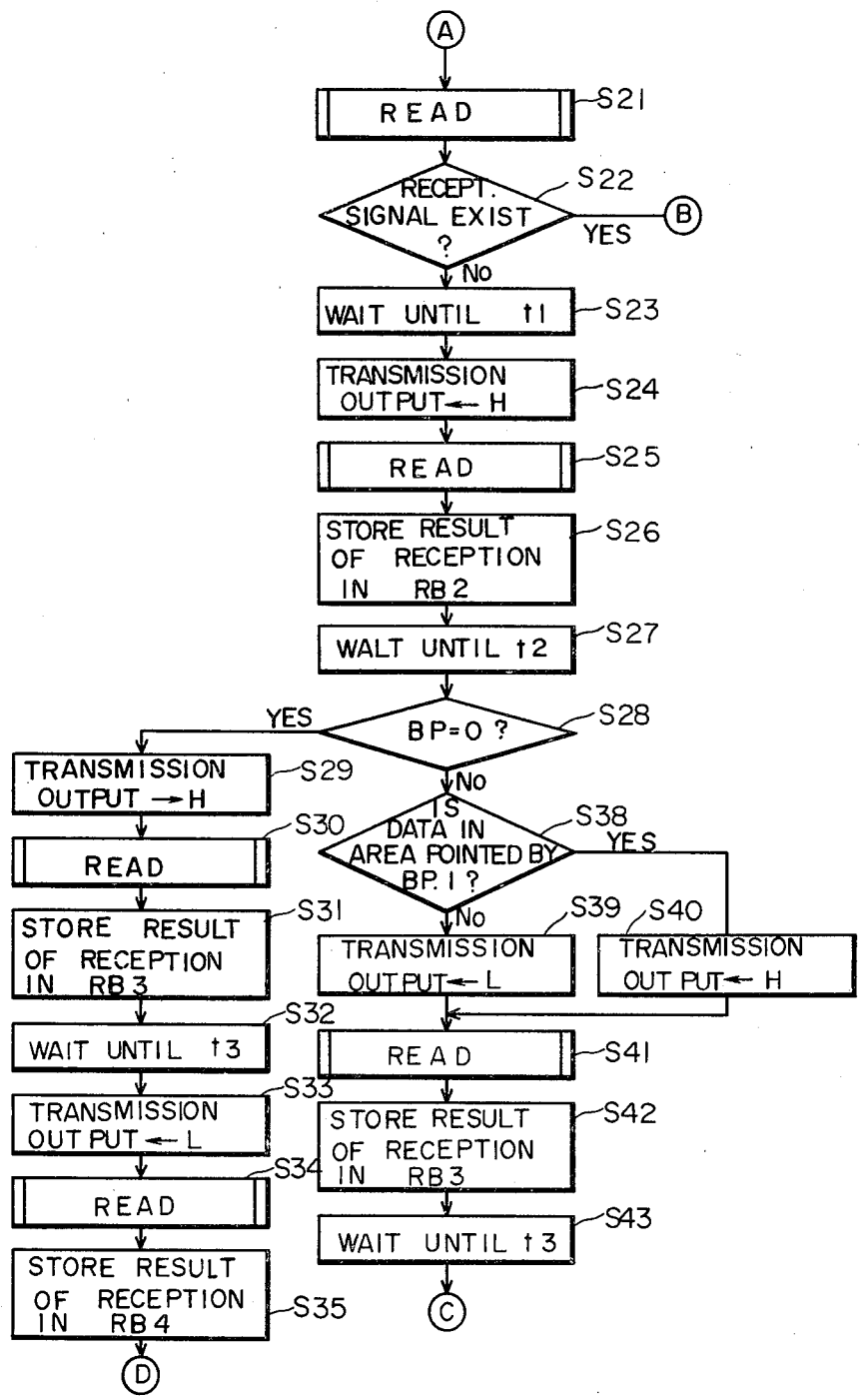
FIG.6A-(2)

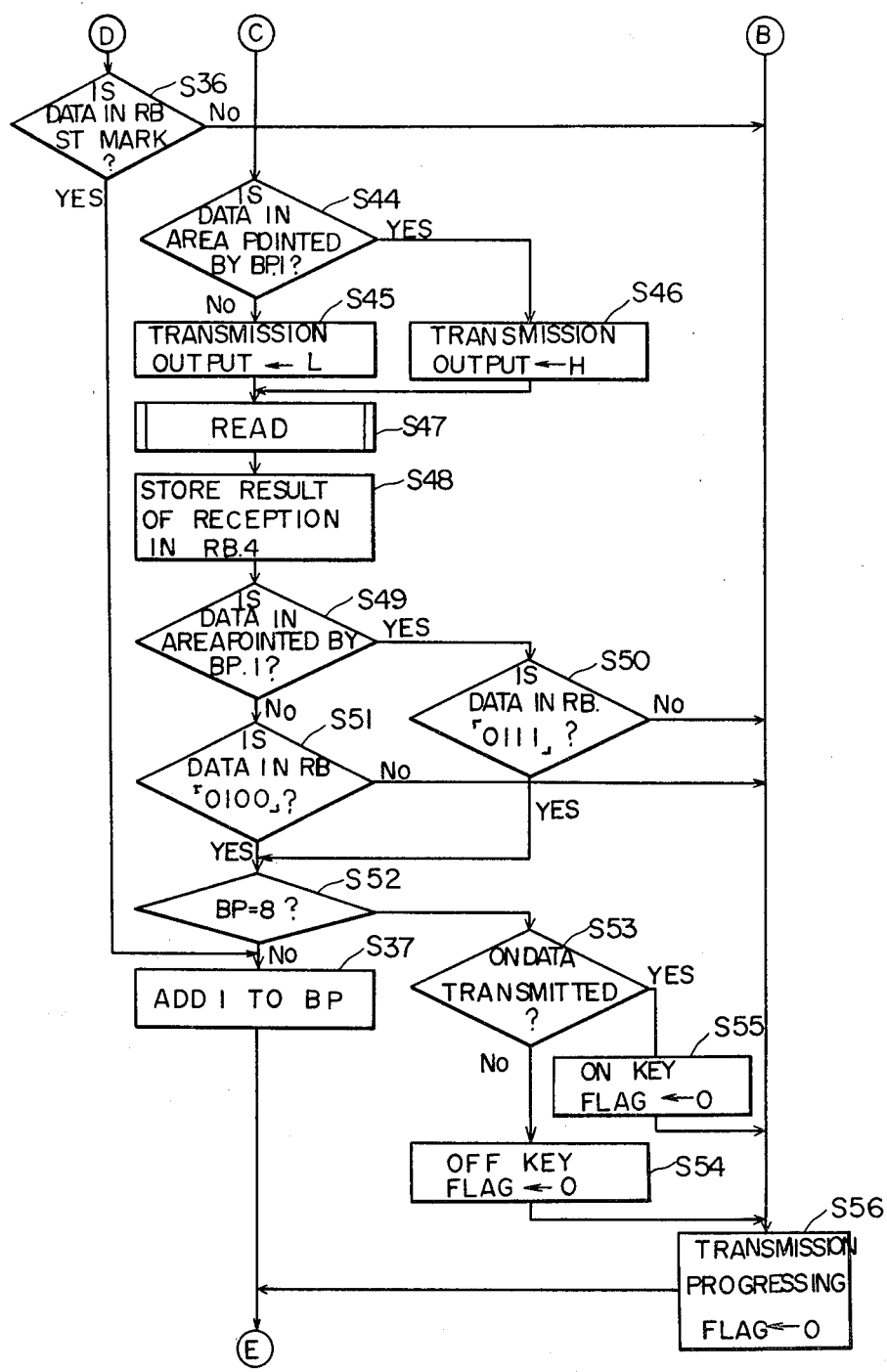

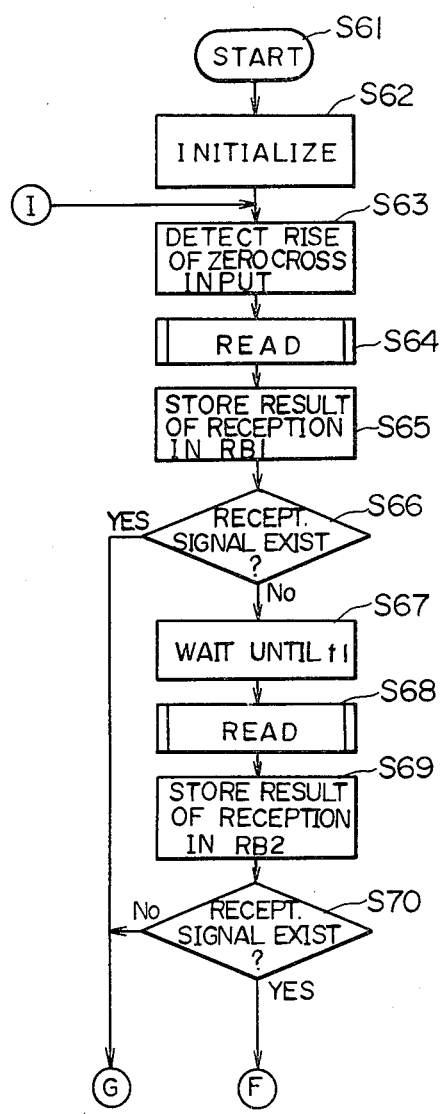
FIG.6B-(1)
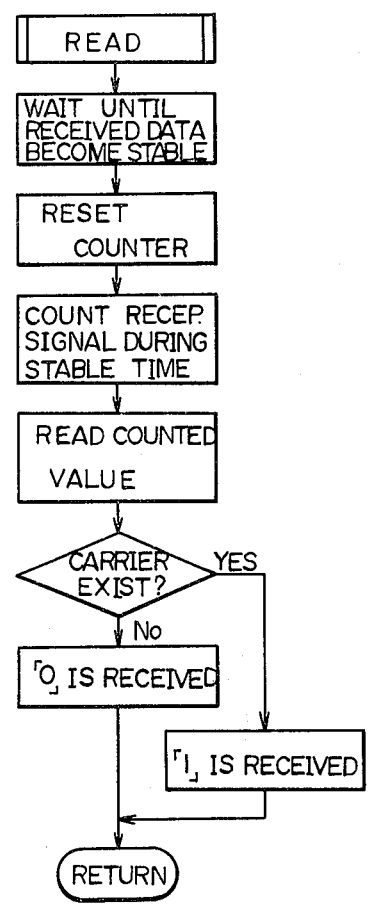
FIG.6D

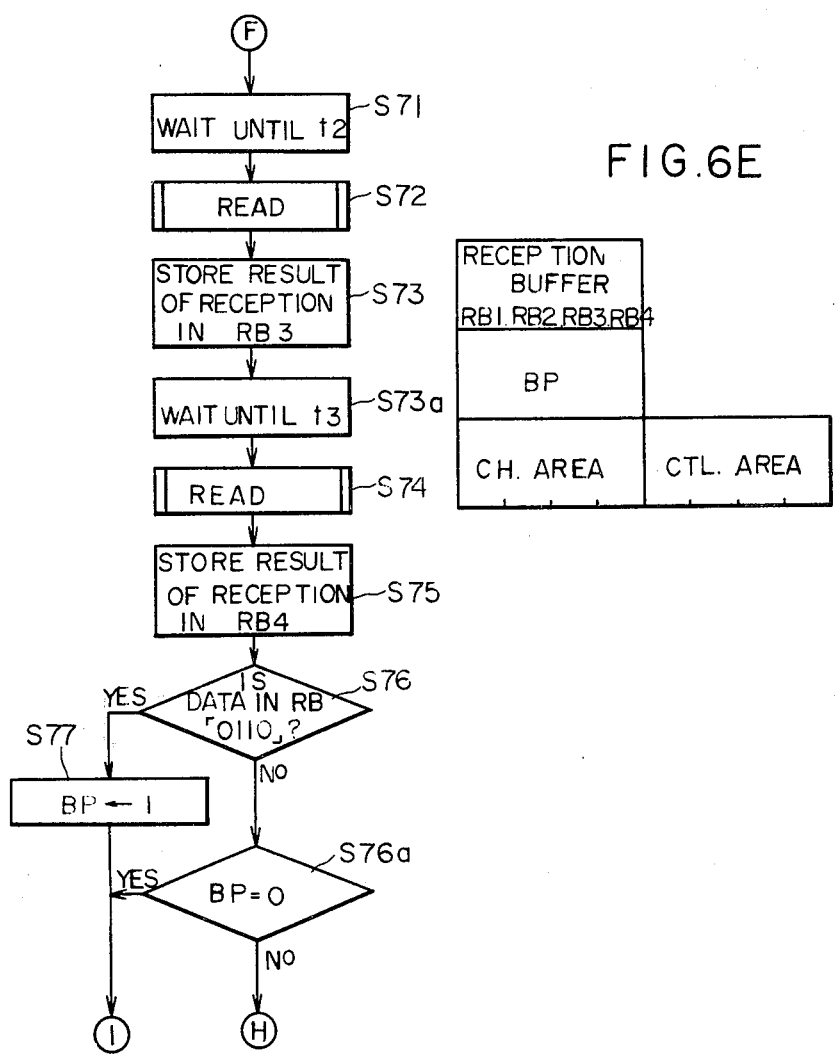

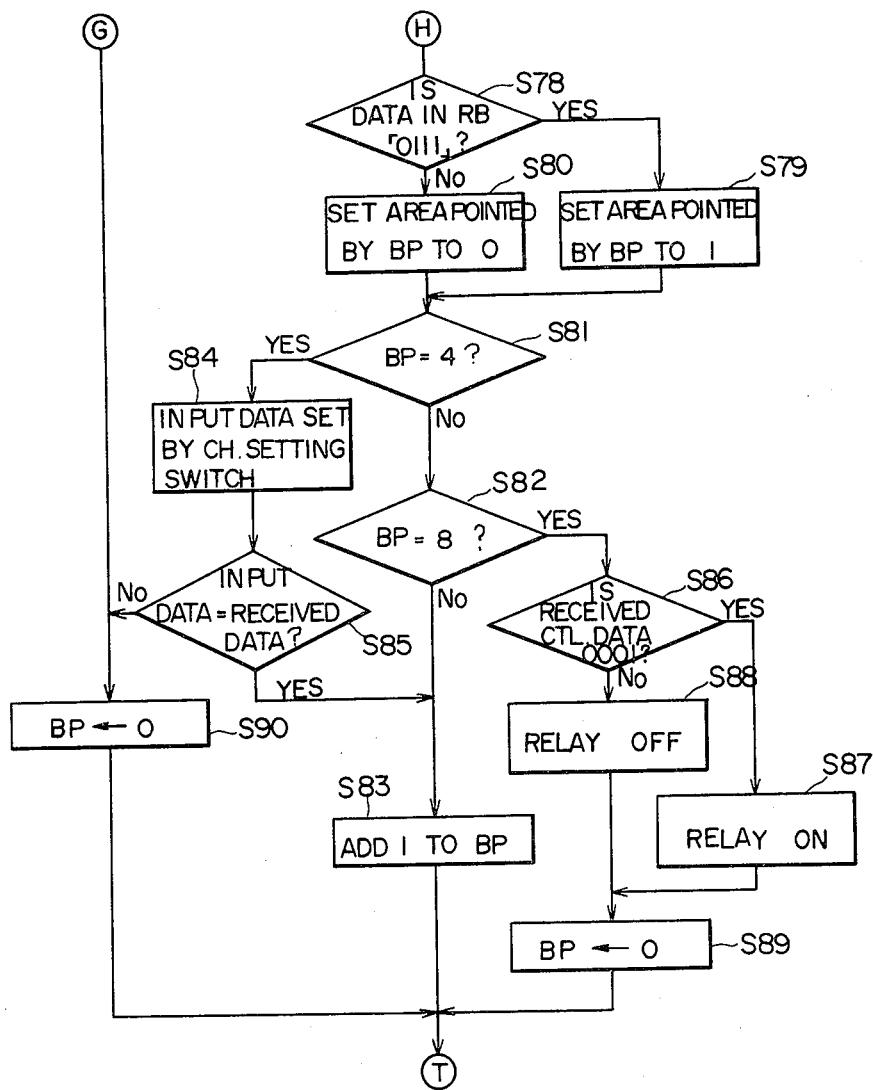
FIG.6B-(3)

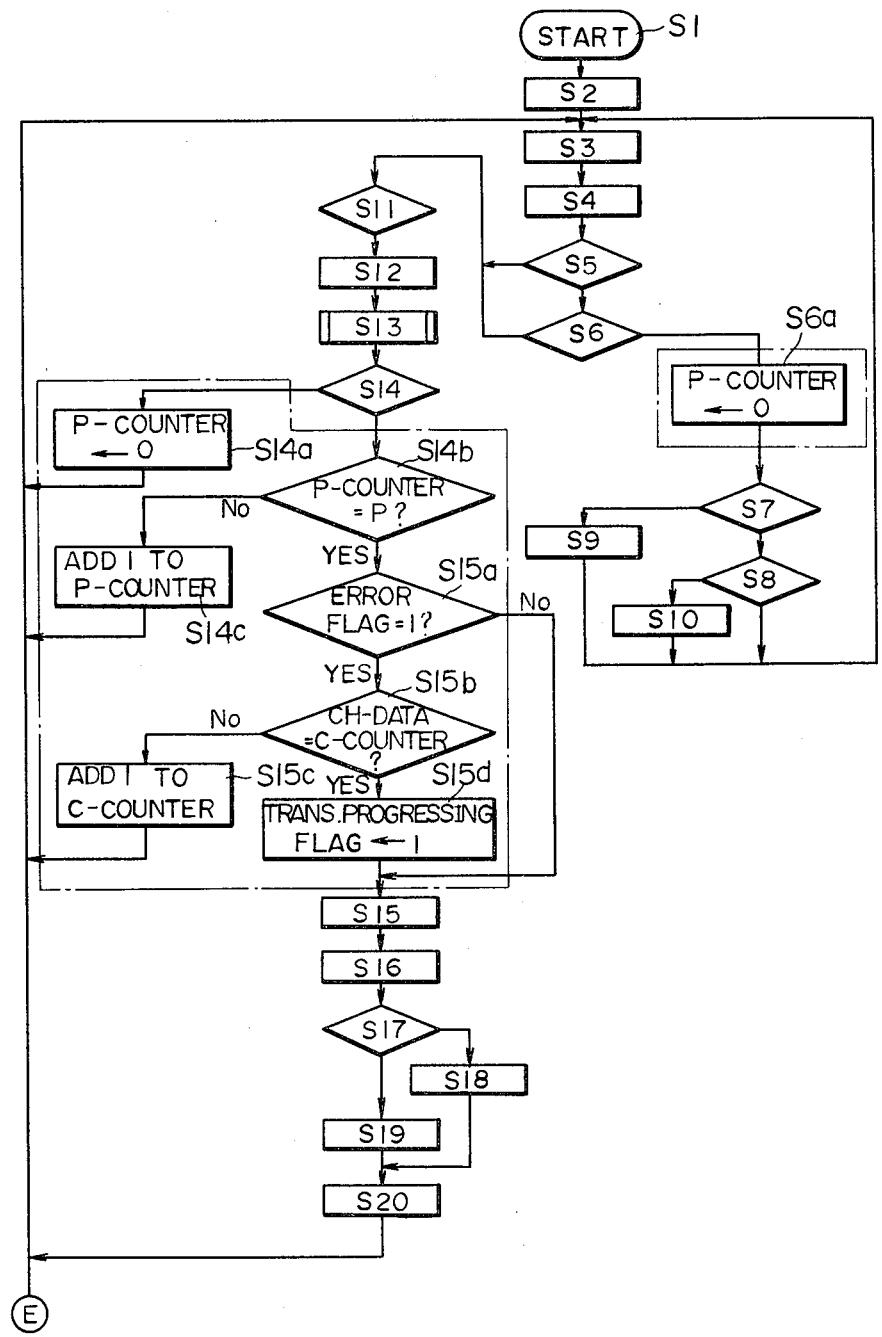
FIG. 11-(1)

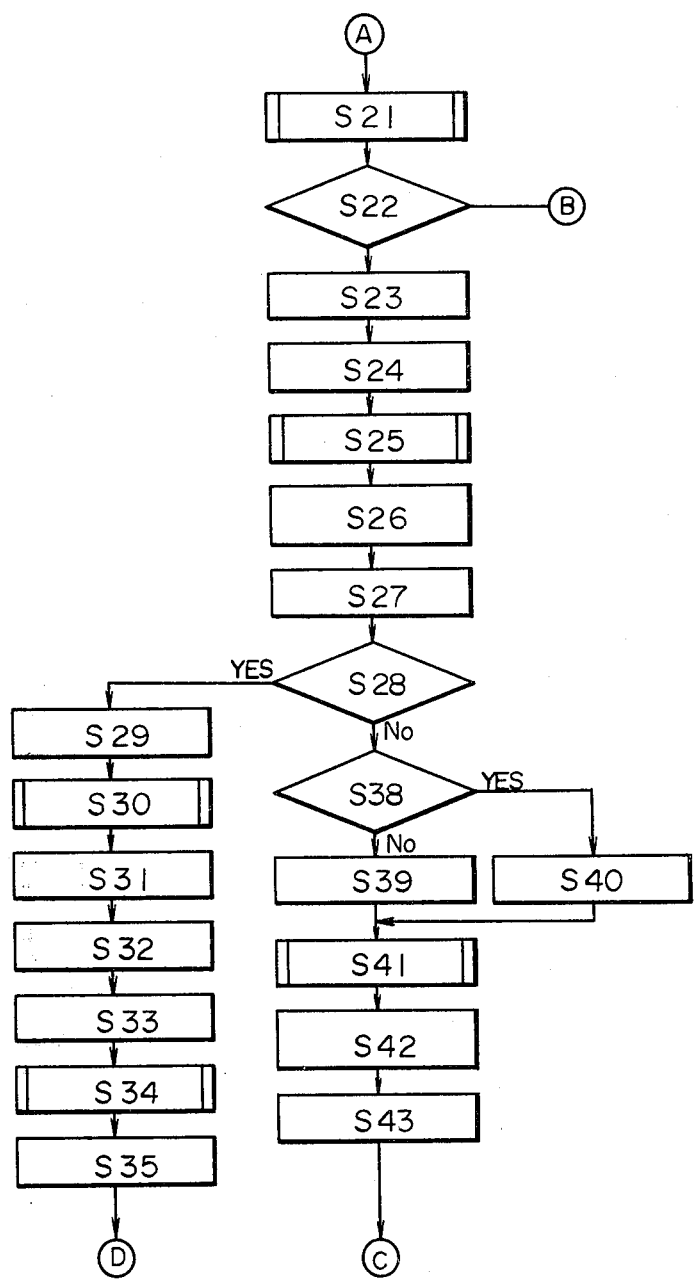
FIG. 11-(2)

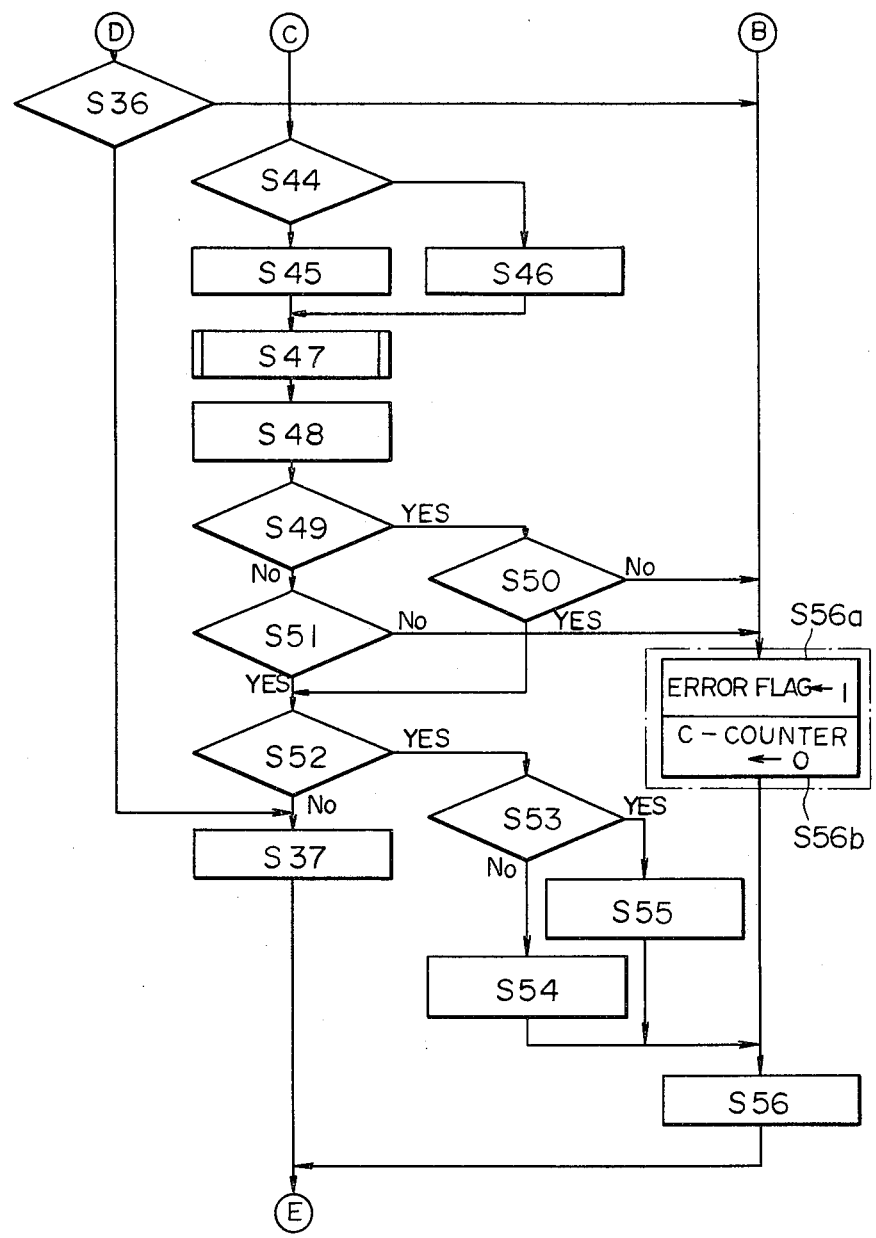
FIG.11-(3)

FIG.14A-(1)
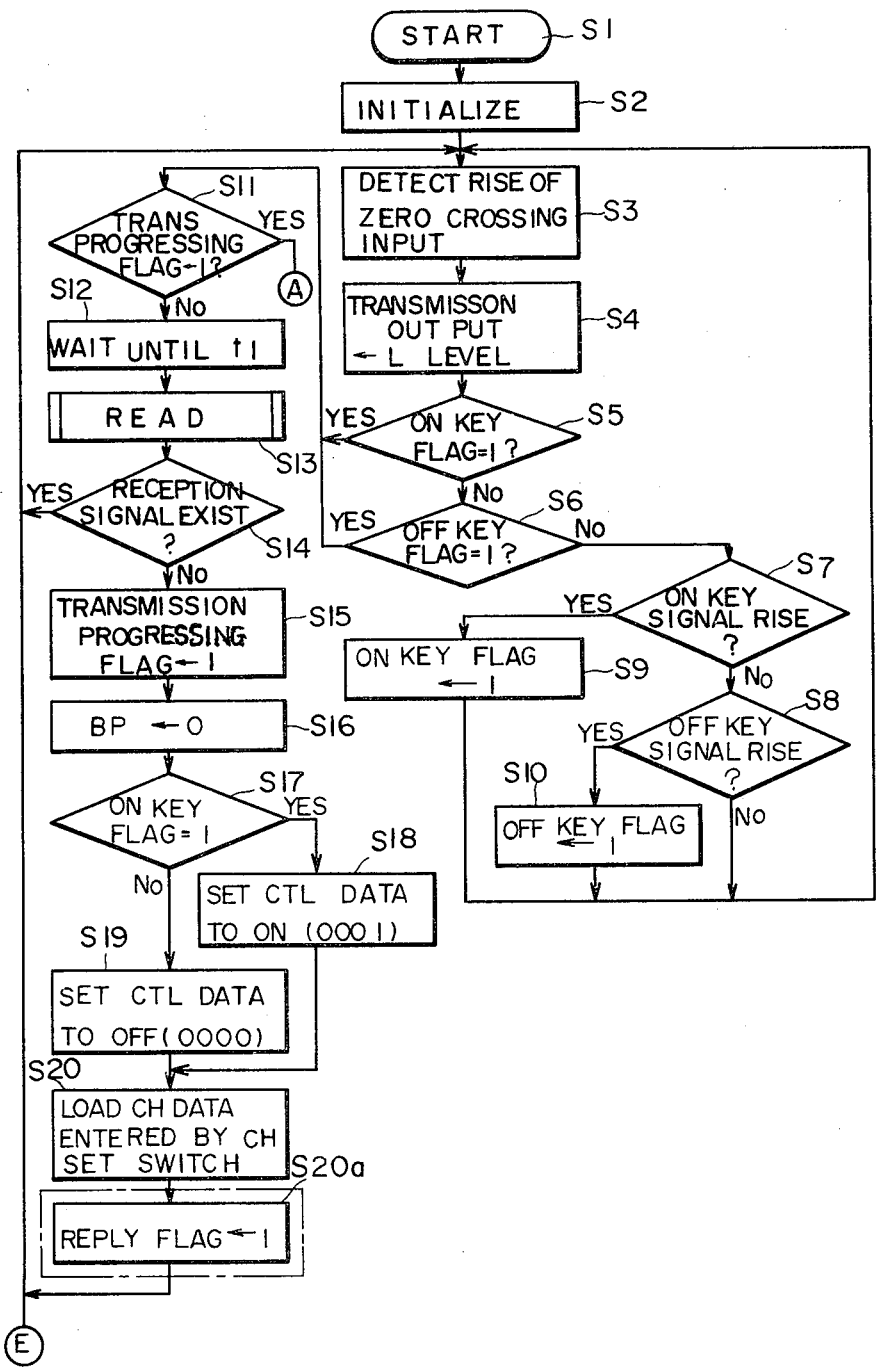

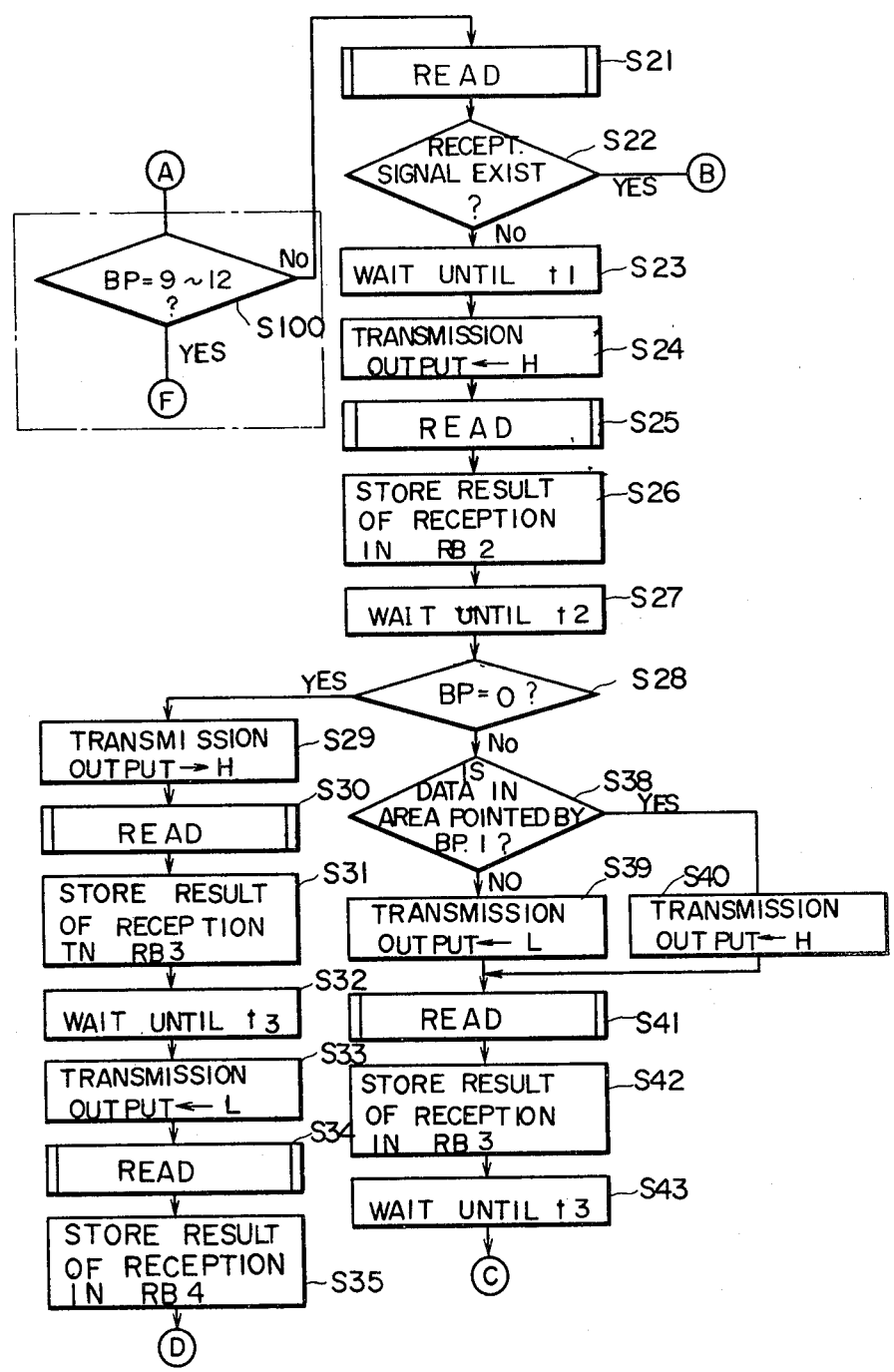
FIG.14A-(2)

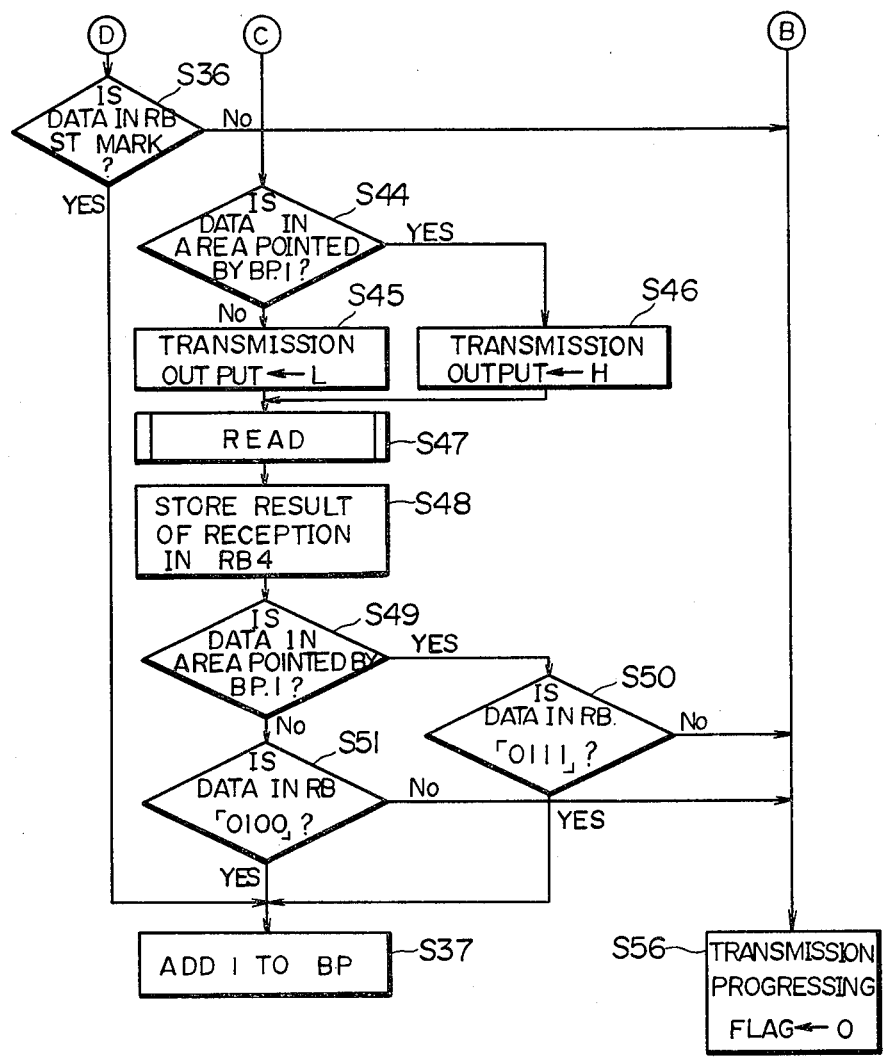
FIG.14A-(3)

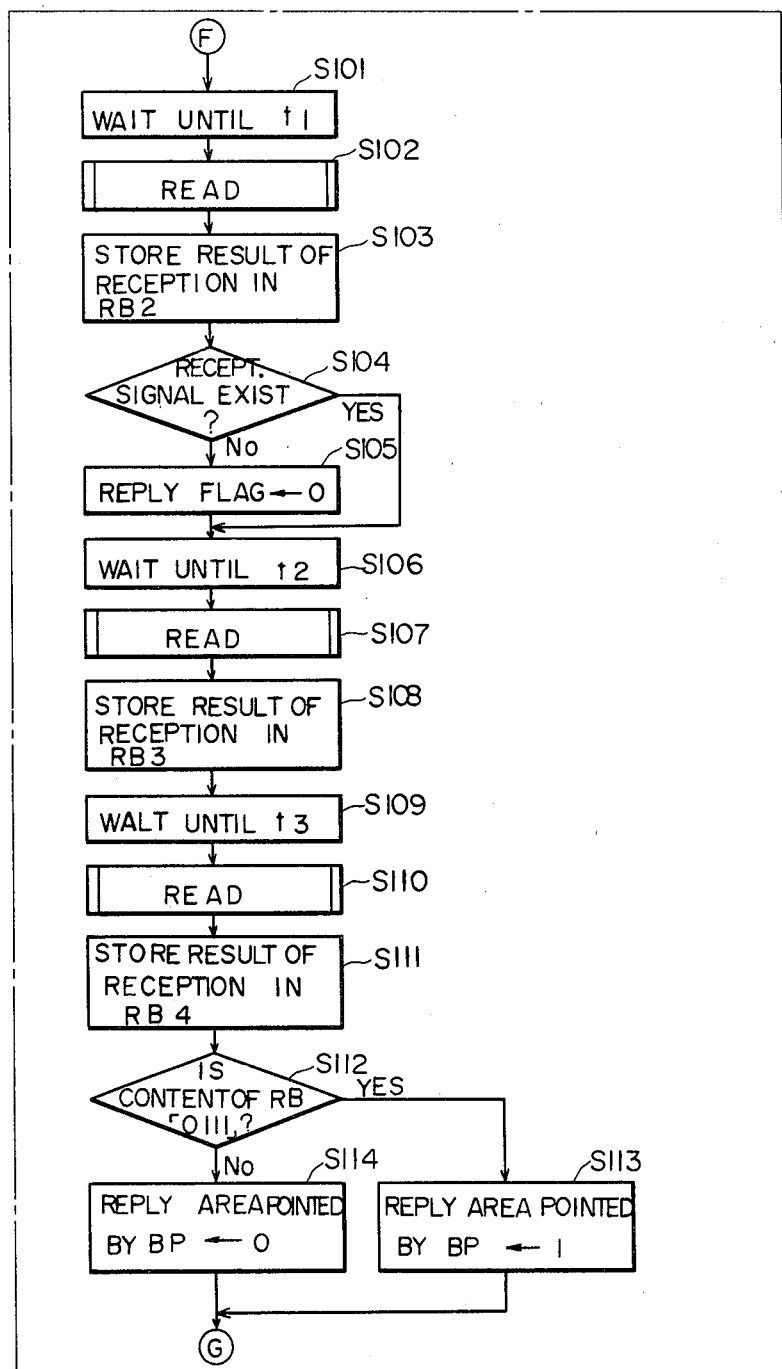
FIG. 14A-(4)

FIG. 14A-(5)
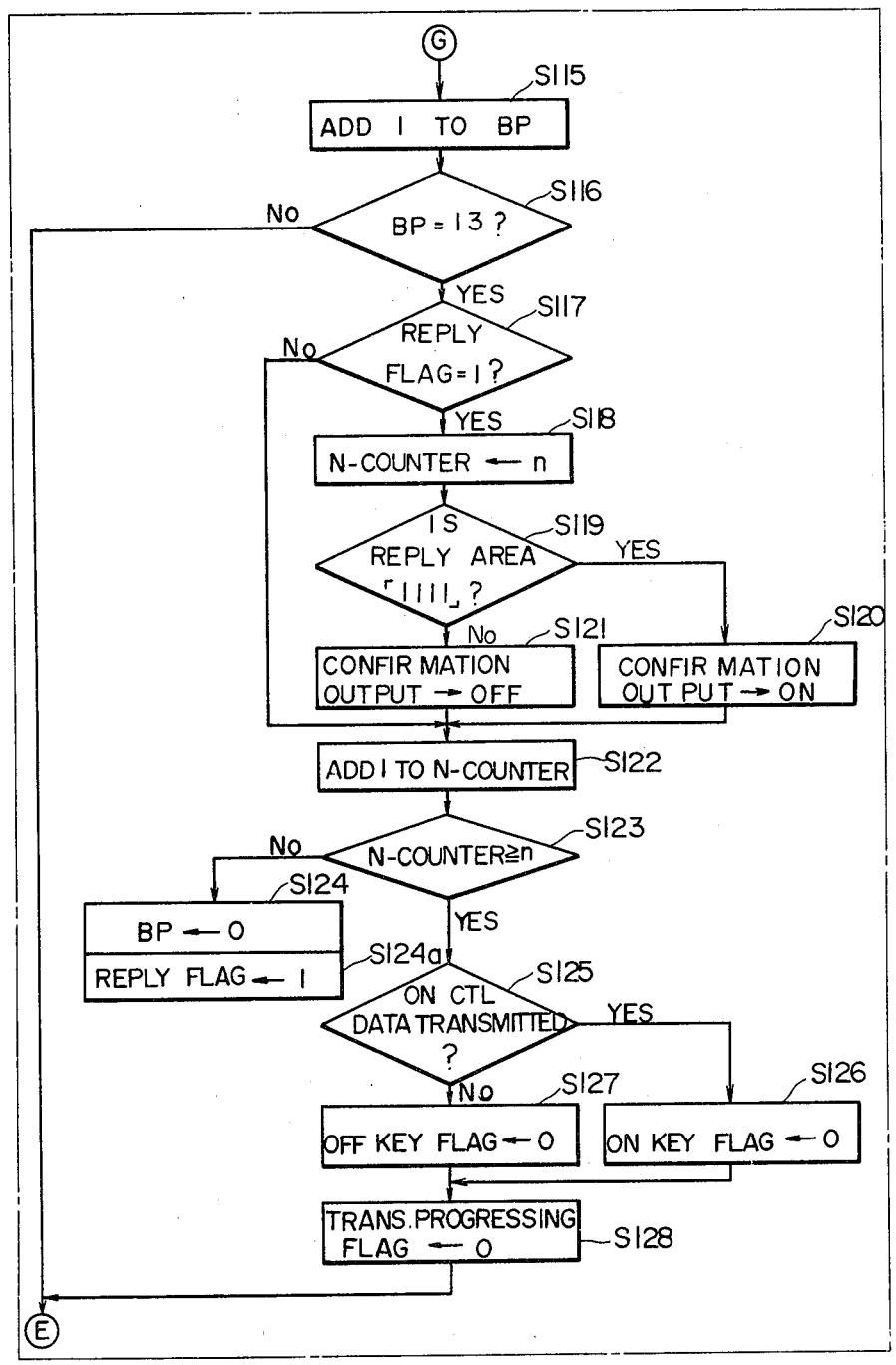

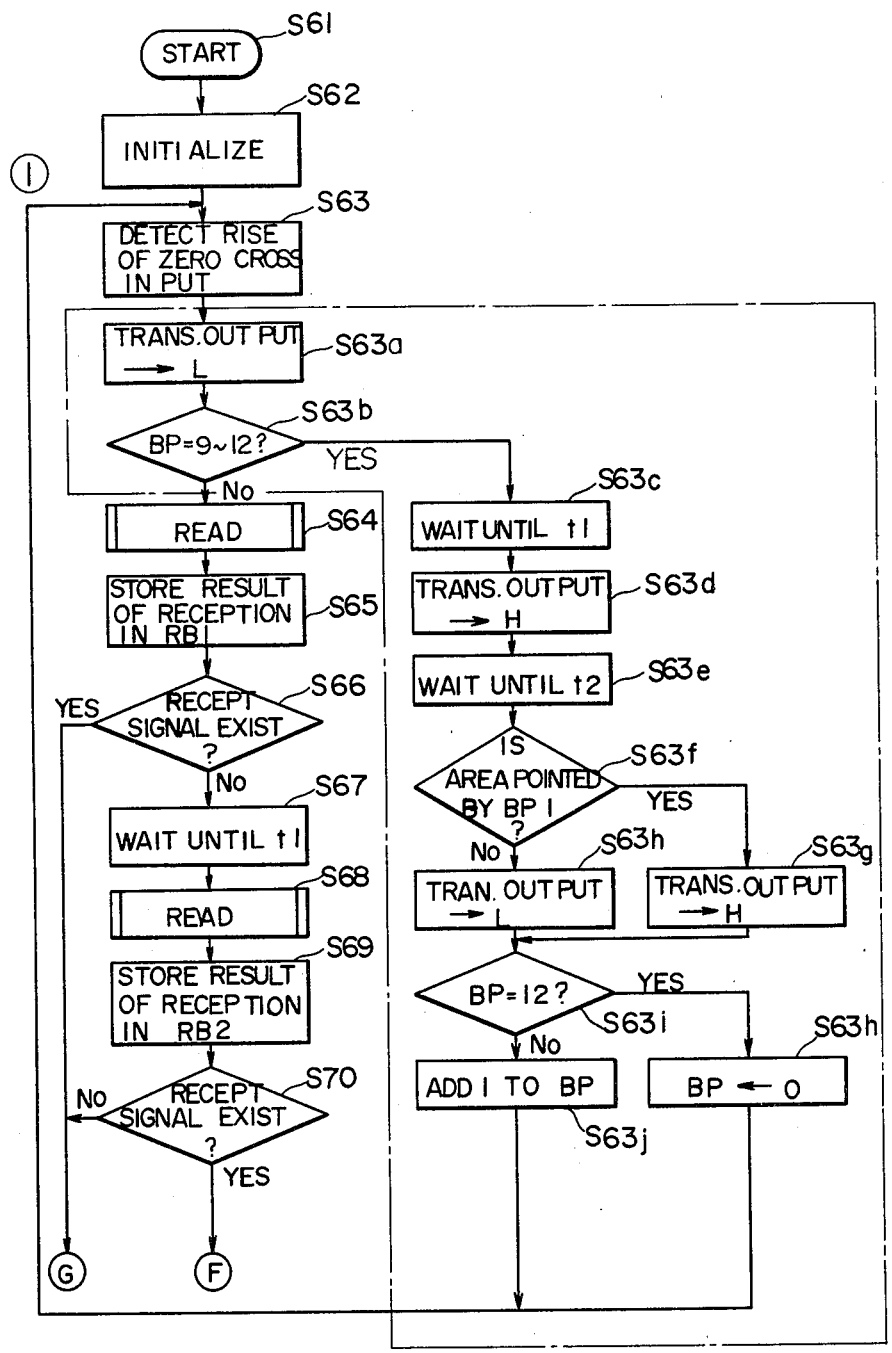
FIG.14B-(1)

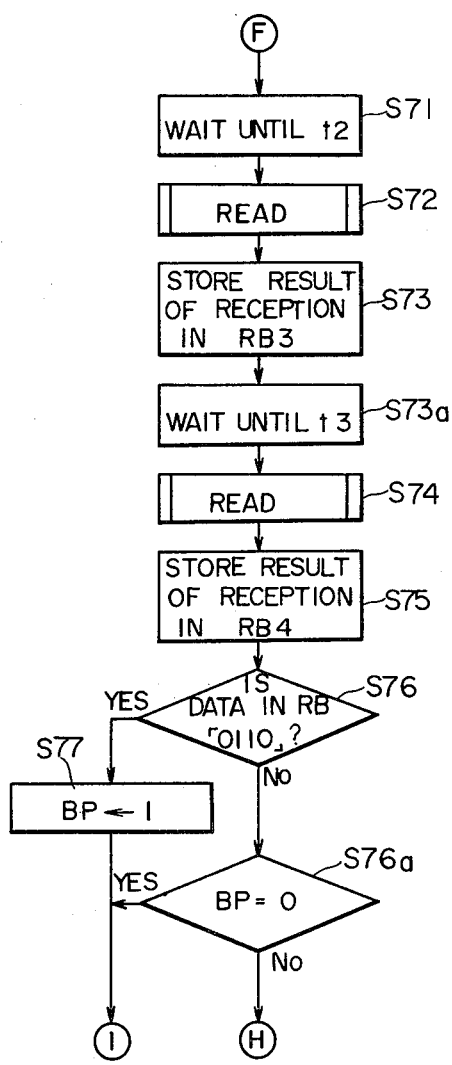
FIG.14B-(2)

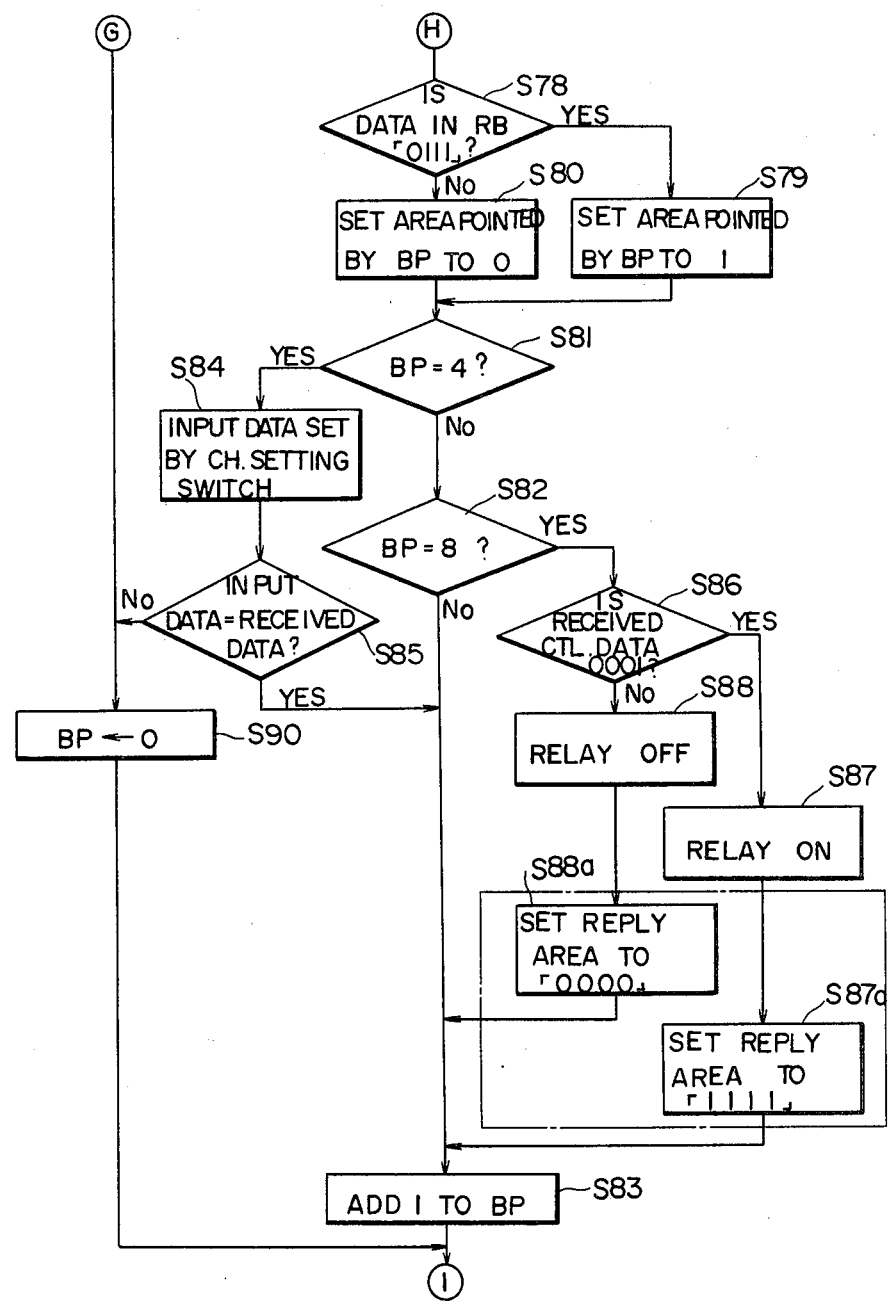
FIG. 14B-(3)

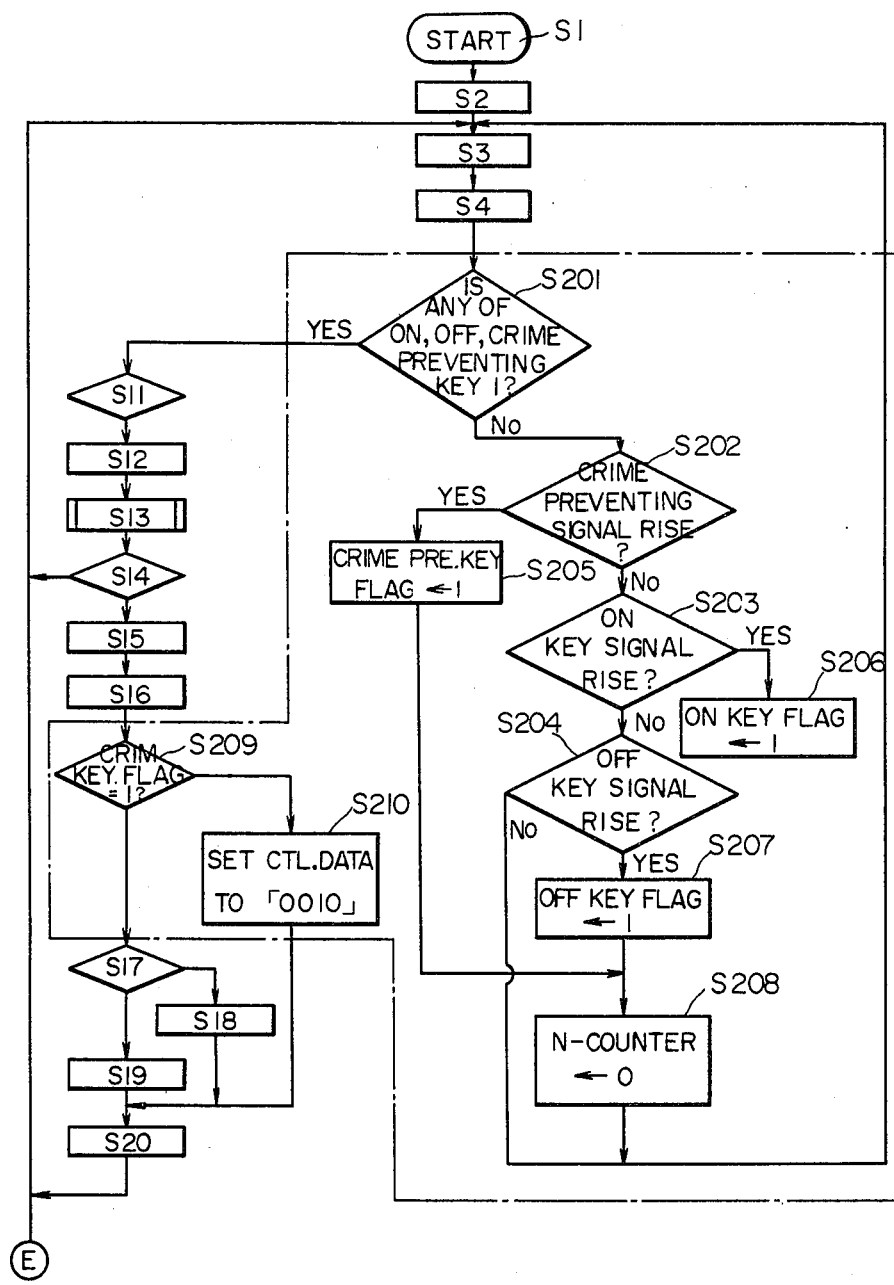
FIG.15A-(1)

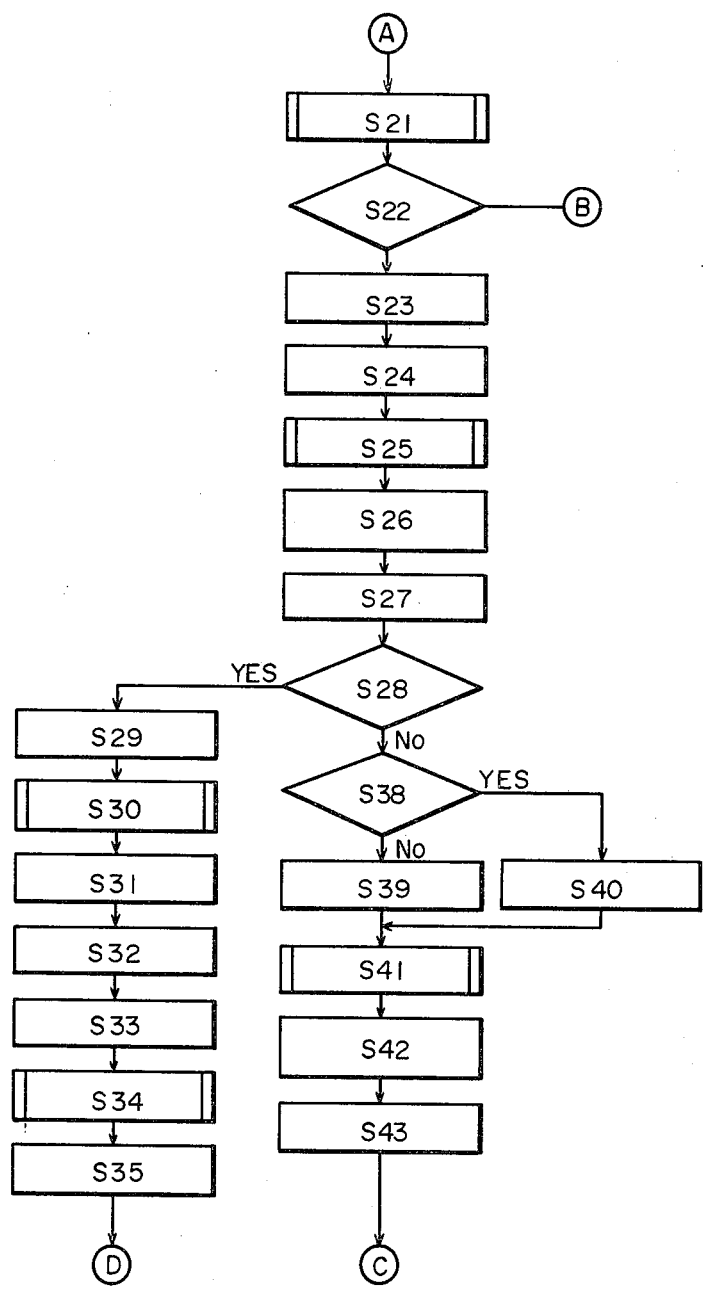
FIG.15A-(2)

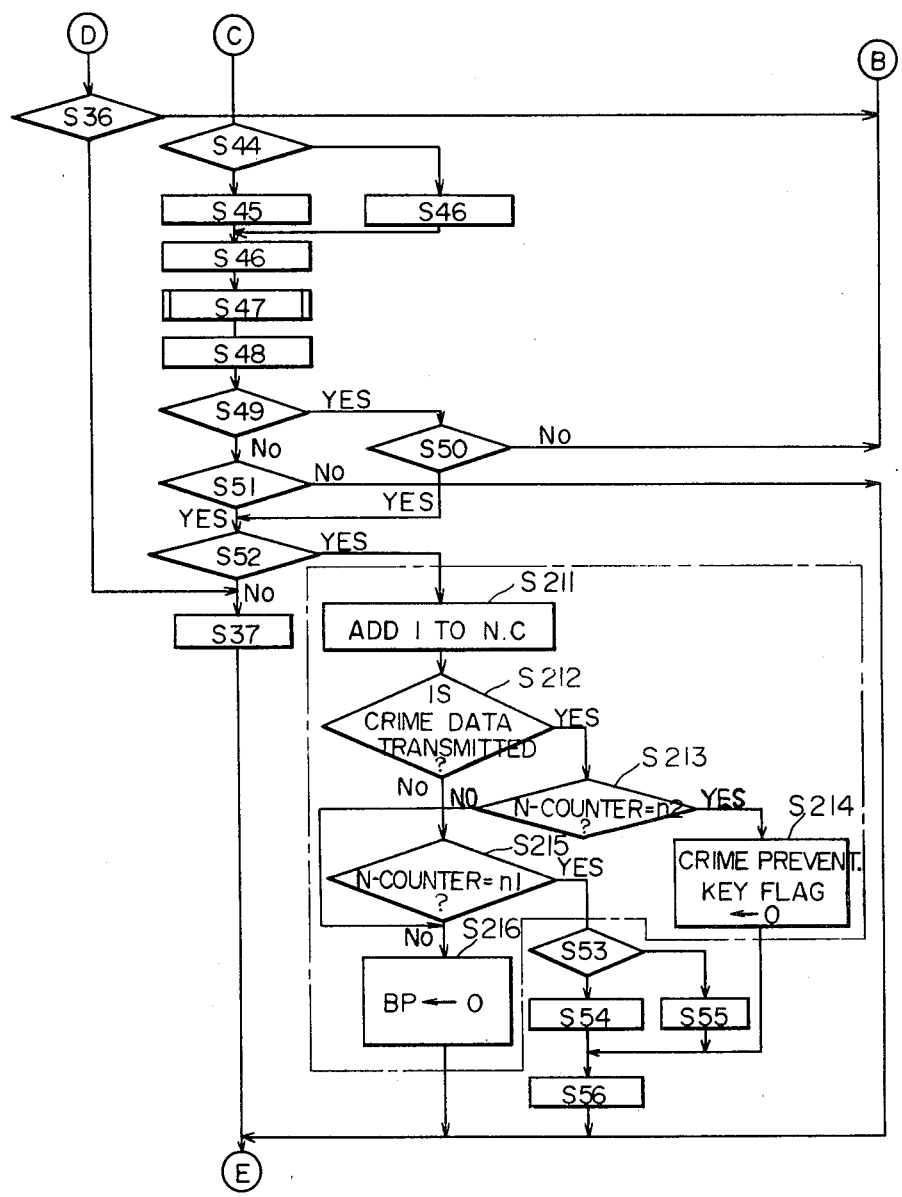
FIG.15A-(3)

FIG. 22A-(1)
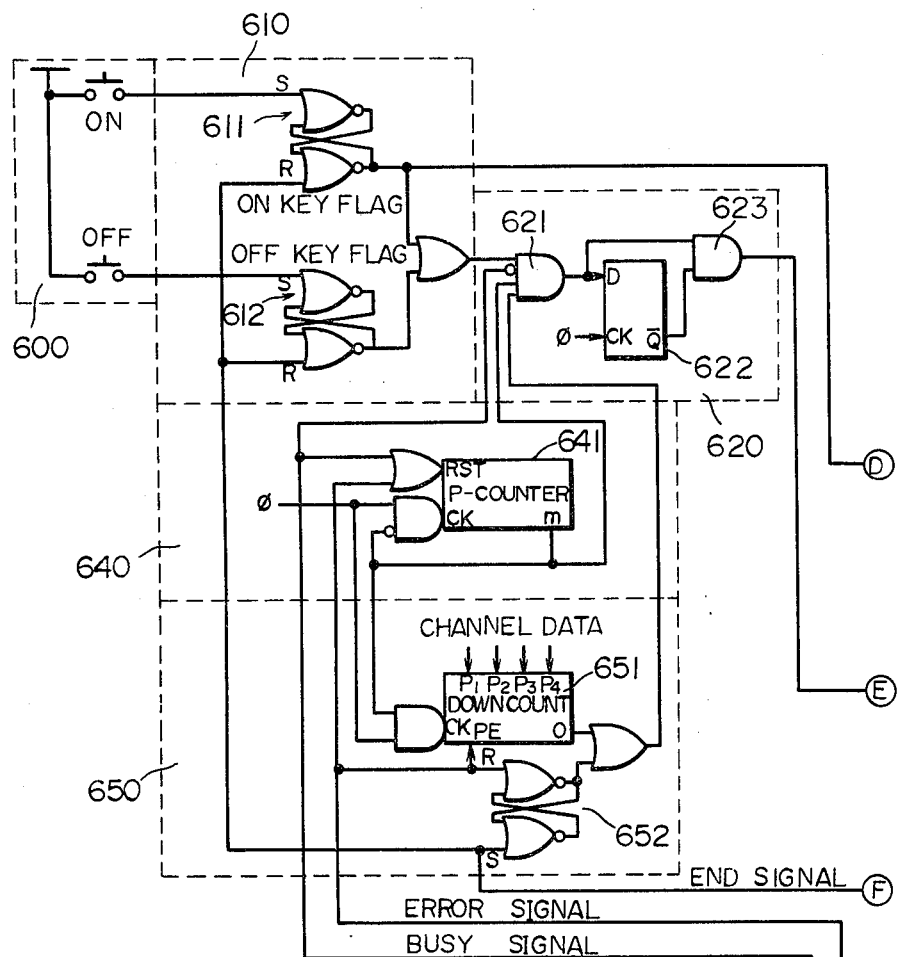
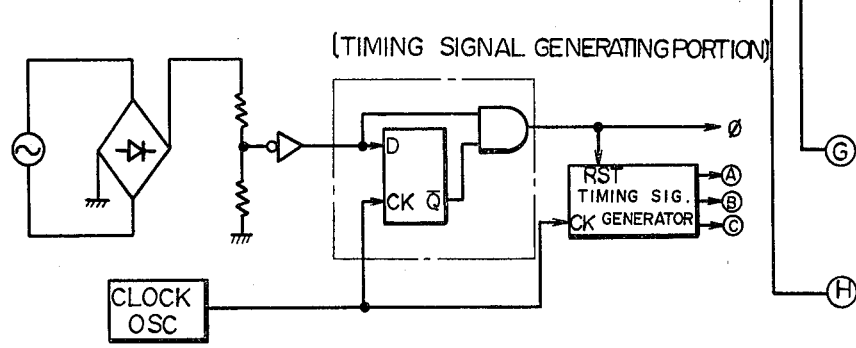

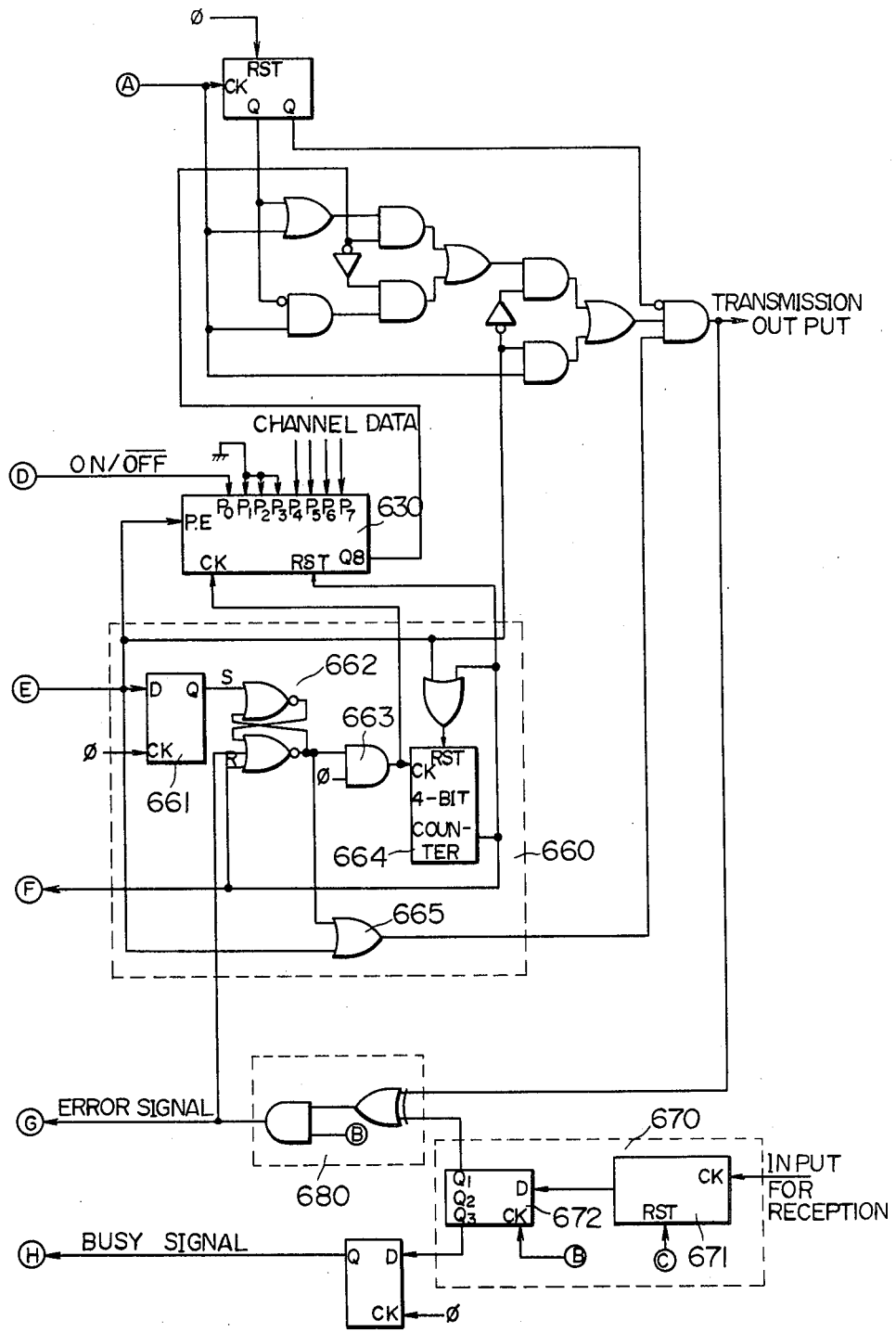
FIG. 22A-(2)

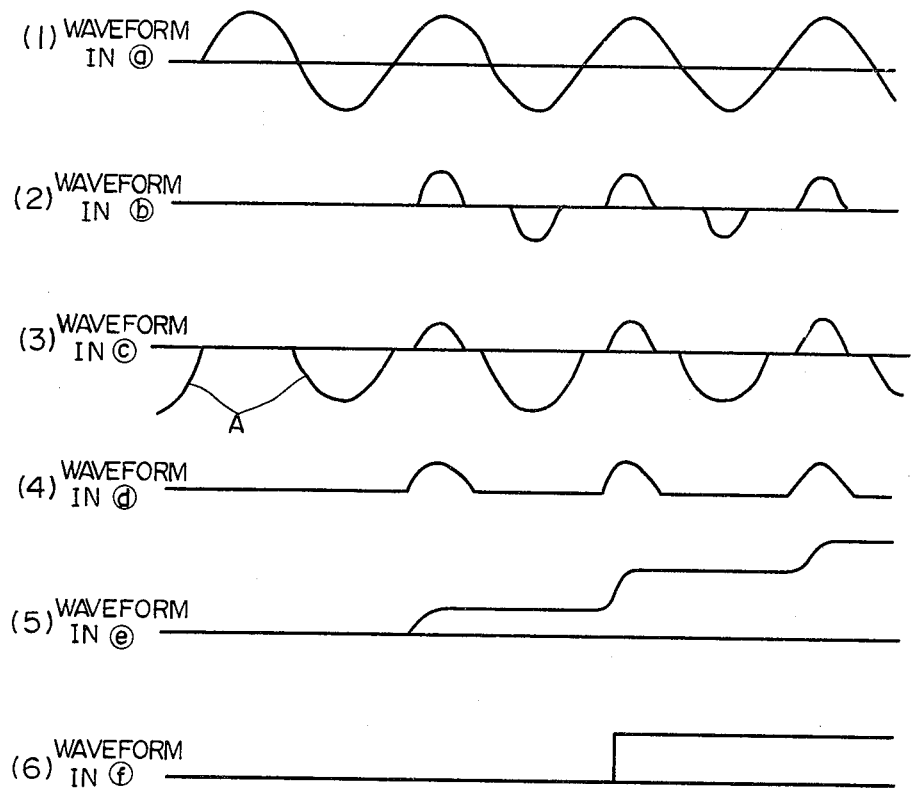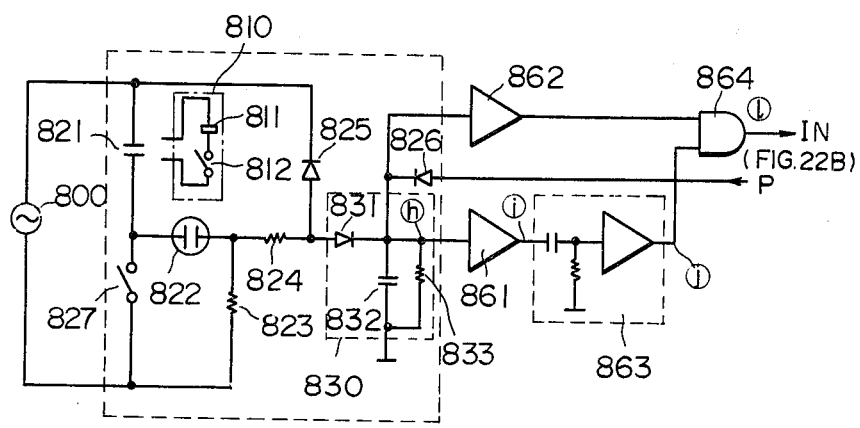

SYNCHRONOUS DATA TRANSMISSION SYSTEM UTILIZING AC POWER LINE

BACKGROUND OF THE INVENTION

1. Field of the Invention

The present invention relates to a data transmission system utilizing a power line. More specifically, the present invention relates to a data transmission system utilizing a power line for transmission of data in a bit serial code fashion in synchronism with the cycles of alternating current of a power supply.

2. Description of the Prior Art

A system for transmission of data utilizing a power line has been conventionally proposed and put into practical use. For example, a system for controlling various indoor electric appliances by superposing a high frequency carrier as control data on an alternating current wave of a power supply by the use of an indoor supply line has been put into practical use. In general, the data high frequency modulated in synchronism with the cycle of the alternating current of a power supply is superposed on an alternating current signal. The prior art of interest in transmitting necessary data through superposition of a signal high frequency modulated on such power supply alternating current wave is disclosed in Japanese Publication Gazette No. 34046/1970 filed July 7, 1966 by Matsushita Electric Industries Ltd. and published for opposition Nov. 2, 1970. The above referenced Japanese Patent Publication Gazette teaches that the phase position, i.e. the phase angle, of the alternating current is used to represent particular data information. More specifically, a half cycle of the power supply cycle, i.e. a time period from the phase of the voltage being zero to the subsequent phase of the voltage becoming zero again after a half cycle is divided into a plurality of phase sections, say 6 sections. Each of these sections, as divided, is allotted to represent in succession Channel Nos. 1, 2, ... 6. Therefore, if and when a high frequency is superposed only on the second section of the half cycle, then the phase position of the second section is treated as the data for identifying Channel No. 2. Another improved system of interest is disclosed in Japanese Patent Publication Gazette No. 34047/1970 filed Aug. 17, 1966 by Matsushita Electric Industries Co., Ltd. and published for opposition Nov. 2, 1970. More specifically, the referenced patent publication gazette teaches that the respective periods of the positive and negative polarities of a power supply alternating current are discriminated and the positive and negative polarity periods are combined to form two regions, whereby the number of channels two times that of the first referenced Japanese Patent Publication Gazette No. 34046/1970 is available. However, these systems disclosed in the above described two referenced Japanese Patent Publication Gazettes are adapted to represent different data for each of the divided sections by dividing a half cycle or one cycle of the alternating current into a plurality of sections and for this reason the number of channels is restricted to the number of division. Accordingly a difficulty is caused in increasing the number of division and hence a disadvantage is caused that the quantity of information being transmitted is limited. Furthermore, since the data available in one channel is only the logic one or zero, the quantity of data available in one channel is accordingly limited. In addition, since the data is determined in terms of the phase position or the phase angle, it is extremely difficult to achieve accuracy. On the other hand, an advantage is brought about by the above described prior art in that because of complete time division no problem of conflict is caused on the occasion of simultaneous operation of a plurality of channels.

A further system of interest to the present invention publicly available is a wireless remote control unit manufactured and sold under the name of system X-10 by BSR of the United States. The system X-10 utilizes power line transmission technology. With the system X-10, a clock is generated for each half cycle of the power supply alternating current. Then a bit serial code is provided using a plurality of cycles by using each half cycle of the alternating current as a reference, i.e. by allotting one bit to each half cycle. However, the X-10 system merely employs each half cycle as one bit and the system has not employed any countermeasure for an interference due to a noise or the like. Accordingly, a disadvantage is involved with the X-10 system in that the information is changed by one bit due to noise occurring during a half cycle or attenuation of a high frequency signal as superposed, resulting in malfunction.

Still a further system of interest to the present invention is disclosed in Japanese Utility Model Laid Open Gazette No. 59130/1979 filed Sept. 30, 1977 by the same assignee as the present invention and laid open for public inspection Apr. 24, 1979 and in Japanese Patent Laid Open Gazette No. 50940/1979 filed Sept. 30, 1977 by the same assignee and laid open for public inspection Apr. 21, 1979. More specifically, these laid open gazettes show that a half cycle of the alternating current is basically utilized to allot the address data of one channel in each half cycle, as done in the previously described prior art. However, according to the last described Japanese Laid Open Gazettes, each half cycle is divided into a plurality of sections and the channel data is coded depending on the divided bit positions in terms of the phase positions or angles. In transmitting the data, a start pulse is allotted in one half cycle and the channel order or sequence information is allotted in succession in the respective half cycles following the start pulse. The order or sequence information is represented by a bit serial code distributed over the half cycle. However, according to the prior art now in discussion, since the channel position is determined by the half cycle, a problem is caused that, when the number of channels is increased, designation of those channels being designated later in the order requires a prolonged response time period. Accordingly, the number of channels is restricted. Furthermore, no countermeasure exists for eliminating a conflict occurring in the case where the transmitted data changes due to a noise other than the data information coming in the alternating current waveform or in the case where attenuation of a signal high frequency modulated through superposition on the alternating current waveform occurs.

SUMMARY OF THE INVENTION

The present invention is directed to a data transmission system utilizing a power line adapted for sending data in a bit serial code fashion in synchronism with the cycles of the alternating current of a power supply. One field of the data being transmitted comprises channel designating data and control data. One field comprises a plurality of cycles of the alternating current. Each cycle period of the alternating current is divided into at least two phase sections. One phase section or the first phase section is used as a busy indicating phase section for indicating that the data is being transmitted. The other phase section or the second phase section is used as a data indicating phase section. A plurality of transmitters and a plurality of receivers are coupled to the power line. Each of the transmitters is adapted to generate a synchronizing signal in synchronism with the cycle of the alternating current of the alternating current power supply supplied through the above described power line. The transmission data is formed using the synchronizing signal as a reference. Each of the transmitters comprises a reception channel setting means for selecting a channel of a receiver which is to receive the transmitted data, and an input means for inputting an enabling signal for enabling generation of the transmission data. The enabling signal is stored in a storing means. The present invention is adapted such that even if a reception channel is selected and an enabling signal is inputted, the transmission data is not immediately generated. The reason is that a situation could occur wherein the data is transmitted on the power line by another transmitter so that the power line is being used or is busy when the above described transmission data is to be generated. In such a situation, a conflict could occur. For the purpose of eliminating such a conflict, therefore, each transmitter is provided with a means for detecting a busy signal being transmitted on the power line using the busy indicating phase section for representing that the power line is being used or busy. According to the the present invention, desired transmission data is generated and transmitted if and when no busy signal is detected and the stored output is obtainable from the storing means. On the other hand, each of the receivers is also provided with a channel setting means for setting channel designating data allotted in advance. The set data set by the channel setting means and the reception channel data being transmitted from a transmitter are compared. In the case of a coincidence as a result of comparison, control data for controlling a means to be controlled on the part of the receiver is provided. Thus, according to the present invention, each half cycle period is divided into at least two phase sections and one of the two divided phase sections is used as a busy indicating phase section and, upon detection of the absence of a busy signal, transmission is initiated, thereby to prevent any conflict of communication.

In a preferred embodiment of the present invention, detection of a busy signal by the receiver is made over a predetermined number of cycle periods. A non-busy state of the power line is determined if and when no busy signal is detected over a predetermined number of cycle periods. As a result, determination as to whether the power line is busy or not can be assuredly made and any conflict can be assuredly prevented. If a determination as to whether the power line is busy has been made in only one cycle, malfunction could occur such that an incorrect determination that the power line is not busy is generated when a busy signal in one cycle is lost due to a noise or the like.

In another preferred embodiment of the present invention, the predetermined number of times for detection of a busy signal, i.e. the above described predetermined number of cycle periods is selected to be different depending on a predetermined preferential order for each of the plurality of transmitters. As a result, when a transmission state is about to occur simultaneously among two or more transmitters, transmission is initiated in the above described preferential order, whereby any conflict can be eliminated.

In a further preferred embodiment of the present invention, one field constituting the above described data further comprises reply data being provided responsive to receipt of the transmission data. The receiver is adapted to transmit to the transmitter the reply data representing that the control data is provided to the means being controlled. The transmitter is responsive to receipt of the reply signal to terminate transmission of the transmission data. Thus, adoption of the reply data assures establishment of a normal communication state between transmitter and receiver. Preferably, the transmitter is adapted to repeat transmission of the data a predetermined number of times in the case where no reply data is received in the transmitter in spite of the fact that the transmission data is transmitted by the transmitter. More preferably, the number of repetitions of the transmission of the transmission data is set depending on the importance of each of the means being controlled, controlled by the transmission data. Thus, the means being controlled are controlled assuredly depending on the importance thereof.

In still a further preferred embodiment of the present invention, a three-phase alternating current is used as the power supply alternating current. The synchronizing signal generating circuit included in each of the transmitters and receivers is adapted to generate three phase signals of different phases responsive to one phase of the three-phase alternating current. One of the three phase signals is selected and used as a synchronizing signal.

Accordingly a principal object of the present invention is to prevent a conflict among a plurality of transmitters and a plurality of receivers in a data transmission system utilizing a power line adapted for transmitting data in a bit serial code fashion in synchronism with the cycles of the alternating current.

Another object of the present invention is to assuredly discriminate the data being transmitted from an incoming noise in a data transmission system utilizing a power line adapted for transmitting data in a bit serial code fashion in synchronism with the cycles of the alternating current.

A further object of the present invention is to return reply data from a receiver to ensure a communication state among a plurality of transmitters and a plurality of receivers in a data transmission system utilizing a power line adapted for transmitting data in a bit serial code fashion in synchronism with the cycles of alternating current.

Still a further object of the present invention is to prevent a conflict between a plurality of transmitters and a plurality of receivers in a data transmission system utilizing a three phase power line adapted for transmitting data in a bit serial code fashion in synchronism with the cycles of the alternating current.

These objects and other objects, features, aspects and advantages of the present invention will become more apparent from the following detailed description of the present invention when taken in conjunction with the accompanying drawings.

BRIEF DESCRIPTION OF THE DRAWINGS

FIGS. 6A(1) to 6A(3) illustrate a flow diagram for explaining the operation of the transmitter;

FIGS. 6B(1) to 6B(3) illustrate a flow diagram for explaining the operation of the receiver;

FIG. 6C shows the content in the random access memory necessary for the operation of the FIG. 6A flow diagram;

FIG. 6D shows one example of the subroutine at one step shown in FIG. 6A;

FIG. 6E shows the content in the random access memory required for operation depicted in the FIG. 6B flow diagram;

FIGS. 11(1) to 11(3) illustrate a flow diagram of another embodiment of the present invention;

FIGS. 14A(1) to 14A(5) illustrate a flow diagram for explaining the operation of the embodiment depicted in conjunction with FIG. 13;

FIGS. 14B(1) to 14B(3) illustrate a flow diagram for the receiver corresponding to the flow diagram for the transmitter shown in FIG. 14A;

FIGS. 14A(1) to 15A(3) show one example of the flow diagram for the transmitter of still a further embodiment of the present invention;

FIGS. 22A(1) to 22A(2) illustrate a block diagram showing the transmitter implemented in a hardware configuration to achieve the flow diagrams previously described;

FIG. 25 is a graph showing waveforms for explaining the operation of the FIG. 24 embodiment;

FIG. 26 is a schematic diagram of a modification of the FIG. 24 diagram; and

DESCRIPTION OF THE PREFERRED EMBODIMENTS

Figure 1:
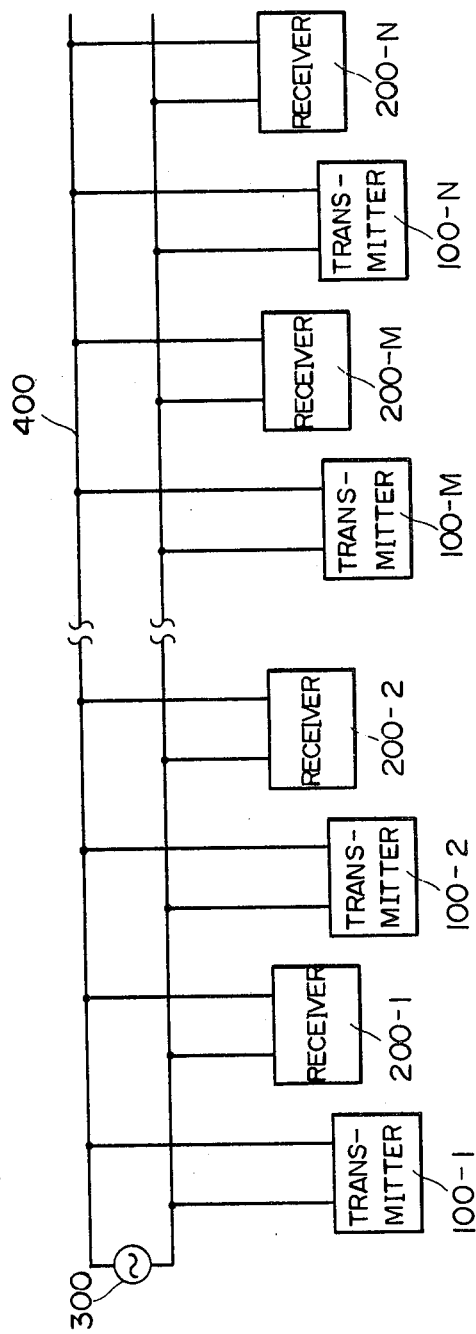
FIG. 1 is a block diagram showing an outline of the inventive signal transmission system utilizing a power line.

FIG. 1 is a block diagram showing an outline of the inventive signal transmission system utilizing a power line. A plurality of transmitters 100-1, 100-2, ... 100-M and 100-N, and a plurality of receivers 200-1, 200-2, ... 200-M, and 200-N are coupled to a power line 400 which is connected to an alternating current power supply such as a commercial power supply 300. Preferably, each of the transmitters and each of the receivers are provided to be paired but, as to be described subsequently, depending on the manner of selection of reception channels on the part of one transmitter, it is not necessarily required to provide a plurality of transmitters each to be paired with a receiver. The data signal being transmitted from the transmitters 100 is transferred to the corresponding receivers through the power line 400. The details of the data signal will be more fully described subsequently with reference to FIG. 2 and further figures. Typically, each transmitter and each receiver may be formed with a compact plug-in connector, for example. Thus each transmitter and each receiver are connected to the power line of the commercial power supply by inserting the plug-in connector into a commercial power supply outlet. In the case of a receiver, a means being controlled such as a power switch may be provided for selective supply of electric power therethrough from the commercial power supply outlet to an electric appliance to be connected to the plug-in connector.

Figure 2:
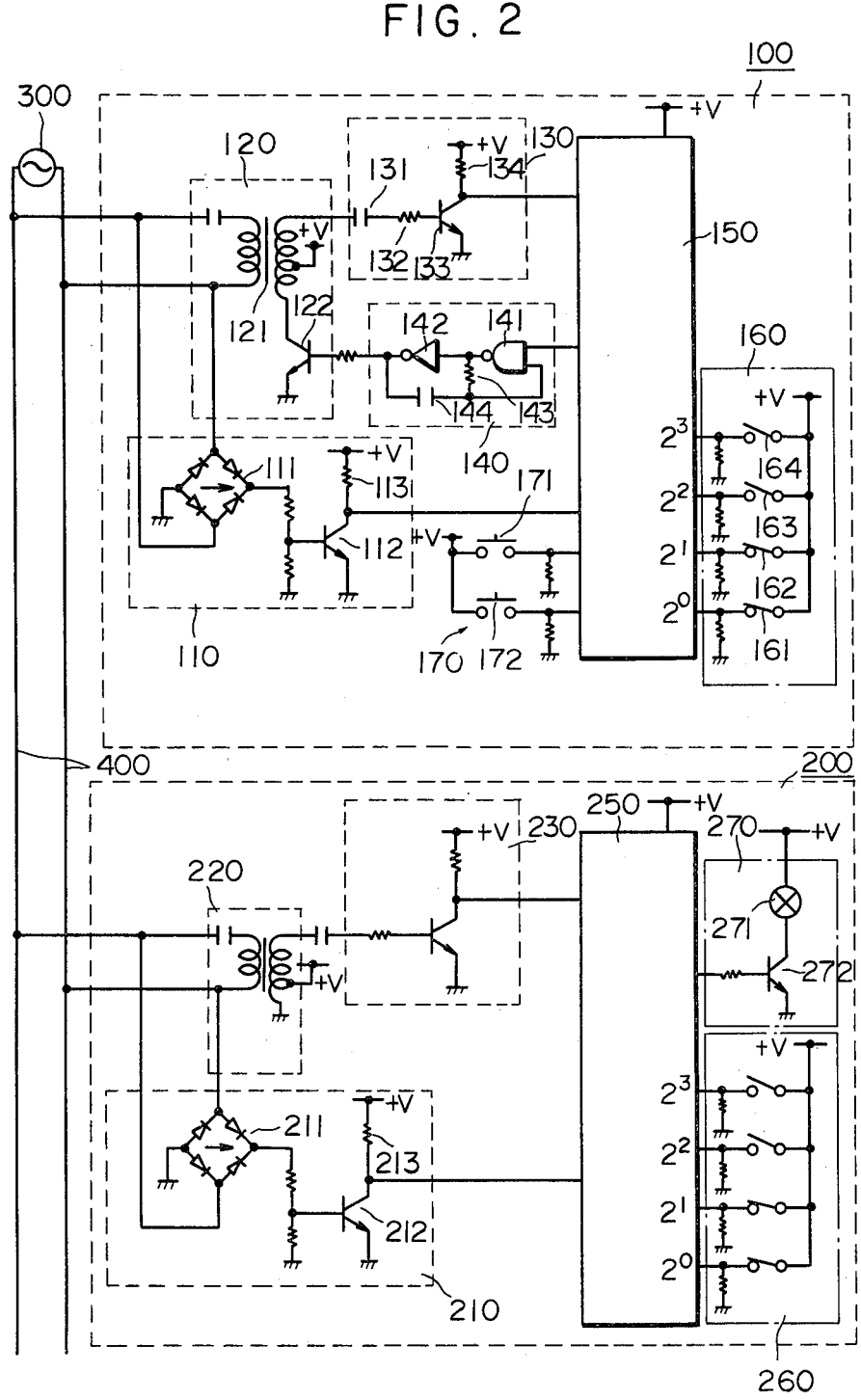
FIG. 2 is a schematic diagram showing in detail one transmitter and one receiver shown in FIG. 1.

FIG. 2 is a schematic diagram showing in detail one transmitter 100 and one receiver 200 shown in FIG. 1. The transmitter 100 comprises a clock generating circuit 110 connected to the commercial power supply 300 through the power line 400. The clock generating circuit 110 is adapted to generate a clock in synchronism with each half cycle of the alternating current of the commercial power supply 300. To that end, the power supply alternating current is full-wave rectified by means of a full-wave rectifying circuit 111 included in the clock generating circuit 110. The full-wave rectified output is voltage divided by a voltage dividing resistor network and the voltage divided output is applied to the base electrode of a transistor 112. The emitter electrode of the transistor 112 is connected to the ground and the collector electrode of the transistor 112 is connected to the +V source through a resistor 113. The junction of the collector electrode of the transistor 112 and the resistor 113 is connected to a logic circuit 150 to be described subsequently. As a result, the above described transistor 112 provides to the above described logic circuit 150 a clock is synchronism with each half cycle of the alternating current of the commercial power supply at the phase position where the above described full-wave rectified output is at the zero level.

The transmitter 100 comprises a coupling circuit 120 including a coupling transformer 121 for coupling the power line 400 to a transmission circuit portion and a reception circuit portion to be described subsequently for the purpose of transmission and/or reception of a signal. More specifically, the above described coupling transformer 121 detects a high frequency signal superposed on the power line 400 to withdraw the same. The withdrawn high frequency signal is applied through an amplifier 130 to the logic circuit 150. The amplifier 130 comprises an amplifying transistor 133 and the base electrode of the transistor 133 is connected to receive a high frequency signal received by the coupling circuit 120 through a capacitor 131 and a resistor 132. The emitter electrode of the transistor 133 is connected to the ground and the collector electrode of the transistor 133 is connected to the +V source through a resistor 134. On the other hand, a signal such as control data or the like is applied from the logic circuit 150 to an oscillation circuit 140 in a manner to be described subsequently. The oscillation circuit 140 comprises a series connection of a NAND gate 141, an inverter 142 and a capacitor 144 connected in a well-known manner, and is responsive to the high level of the transmitted data obtained from the logic circuit 150 to make an oscillating operation. The oscillation output of the oscillation circuit 140 is applied to the base electrode of a transistor 122 included in the above described coupling circuit 120. The emitter electrode of the transistor 122 is connected to the ground and the collector electrode of the transistor 122 is connected to the above described coupling transformer 121. As a result, the oscillator output from the oscillation circuit 140 is withdrawn through the coupling circuit 120, i.e. through the transistor 122 and the coupling transformer 121, to the power line 400.

Although the detail of the logic circuit 150 will be described subsequently, briefly the logic circuit 150 reads the content of the data of the reception signal received through the above described coupling circuit 120 and the amplifying circuit 130 and also reads the content set in a channel setting portion 160 to be described subsequently and also stores the turning on of a push-button switch 170, thereby to generate a control data signal for controlling the oscillation circuit 140. In actuality, the operation of the logic circuit 150 is controlled in accordance with a program of a microcomputer. The above described channel setting portion 160 comprises four operation switches 161, 162, 163 and 164 and four pull-down resistors, so that the reception channels in which the transmission signal is to be received may be set, i.e. the address of a receiver may be designated. To that end, as shown the respective switches are weighted like $2^0$, $2^1$, $2^2$ and $2^3$. More specifically, a 4-bit arrangement of switches is adopted to enable designation of sixteen different addresses. On the other hand, the push-button switches 170 comprise an ON operating push-button switch 171 and an OFF operating push-button switch 172, for example. Depression of these push-button switches is stored in the storage included in the logic circuit 150.

On the other hand, the receiver 200 has substantially the same circuit configuration as that of the transmitter 100, except for the oscillation circuit 140 and the push-button switch 170 of the transmitter 100. However, as a further feature, the receiver 200 is provided with a circuit being controlled 270 which is controlled responsive to a control signal obtained from the logic circuit 250 controlled in accordance with a program of a microcomputer. The circuit being controlled 270 may comprise a means being controlled, such as a relay 271 or a transistor 272. The control signal from the logic circuit 250 is applied to the base electrode of the transistor 272.

Figure 3:
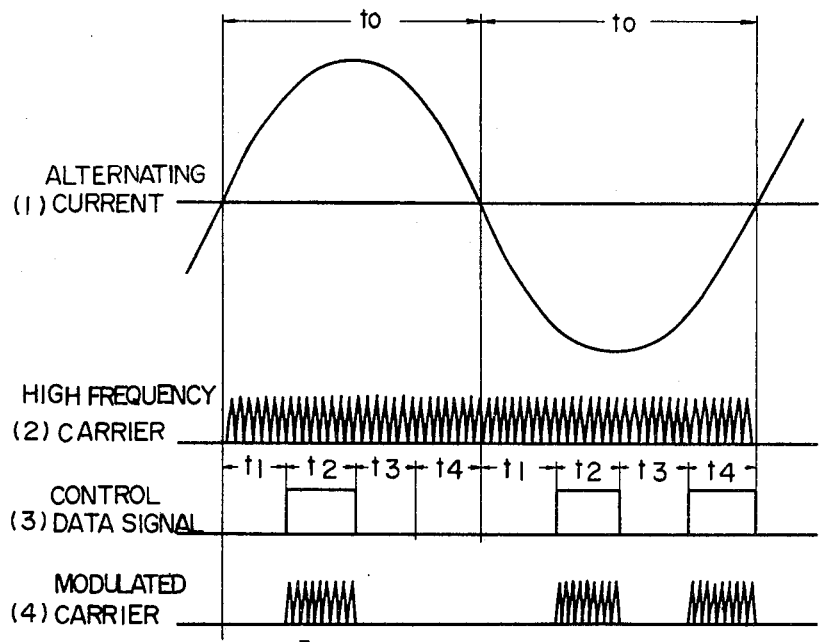
FIG. 3 is a graph showing waveforms of various signals for explaining the fundamental concept of the present invention.

FIG. 3 is a graph showing waveforms of various signals for explaining the fundamental concept of the present invention. Referring to FIG. 3, the curve (1) shows an alternating current waveform of the commercial power supply 300 for use in the present invention, the curve (2) shows a high frequency carrier wave, which is generated by the oscillation circuit 140, the curve (3) shows one example of a control data signal being fed from the logic circuit 150 to the oscillation circuit 140, and the curve (4) shows a high frequency carrier wave modulated by the above described control data signal. The high frequency carrier wave is applied from the oscillation circuit 140 through the coupling circuit 120 to the power line 400. The fundamental concept of the present invention resides in that each half cycle period t0 of the power source alternating current wave is divided into at least two phase sections, and preferably into four phase sections, such as t1 to t4, so that the first section t1 is used as a section where no high frequency carrier exists, and the second section t2 is allotted as a data transfer indicating section for indicating that machine controlling data is being transferred, i.e. the power line is being used or is busy. The fourth section t4 is used as a control data section wherein the high frequency carrier wave modulated by the machine controlling data is transmitted. In the embodiment shown, the third section t3 is further used as a control section wherein a transmission start signal and a transmission end signal of the machine controlling data are transmitted. According to one example of the modulated high frequency carrier wave shown as (4) in FIG. 3, the high frequency carrier wave exists in the second section t2 of the first half cycle and no high frequency carrier wave exists in the other sections of the first half cycle, which means that the logical information in the half cycle is the logic zero. On the other hand, in the following half cycle the high frequency carrier wave exists in the second and fourth sections, which represents that the logical information in this half cycle is the logic one. More specifically, the information of the logic zero or one in each half cycle is determined depending on whether the high frequency carrier wave exists in the fourth section. On the other hand, existence of the high frequency carrier wave in the second section t2 represents that the control data is presently being transmitted. More specifically, the information of one bit is allotted to each half cycle of the alternating current and the information of one bit is constituted of four subbits for the purpose of transmission. According to the embodiment shown, each half cycle is divided into four phase sections; however, basically each half cycle is divided into at least two phase sections, one being allotted as a busy indicating section and the other being allotted as a logical state indicating section to represent the logic zero or one.

Figure 4A:
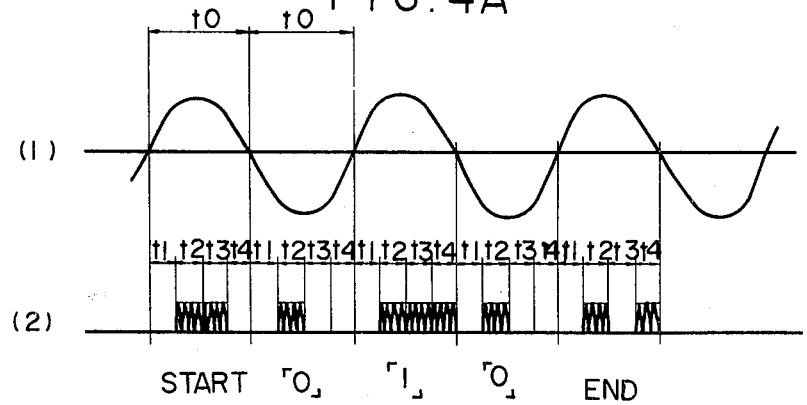
FIG. 4A shows a signal format in the case where the data of one field using five half cycles is to be transmitted.
Figure 4B:
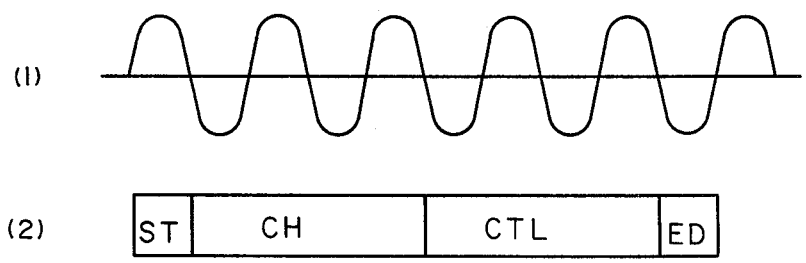
FIG. 4B shows a preferred signal format wherein one field of information for one time transmission comprises the transmission start data in the first half cycle, the channel data of the following four half cycles, the controlled data in the further following four half cycles, and the transmission end data at the final half cycle.

FIG. 4A shows one example of a signal format in the case where the data of one field using five half cycles is to be transmitted. In the first half cycle the high frequency carrier wave exists in the second and third sections, thereby to represent transmission start data. In the second, third and fourth half cycles the control data of "0", "1", and "0", respectively, is represented. In the fifth half cycle, the high frequency carrier wave exists in the second and fourth sections, thereby to represent transmission end data. Preferably, as shown in FIG. 4B, one field of information for transmission comprises the transmission start data ST in the first half cycle, the channel data CH of the following four half cycles, the controlled data CTL in the further following four half cycles, and the transmission end data at the final half cycle. More specifically, each of the channel data and the control data is represented by a bit serial code of four bits each represented by each half cycle.

Referring again to FIG. 3, according to the embodiment shown, the convention is established that no high frequency carrier wave exists in any situation in the first phase section t1 and therefore detection of some signal during the first section t1 may be determined as a noise interference. Thus, the first section t1 is used for detection of a noise.

Figure 5A:
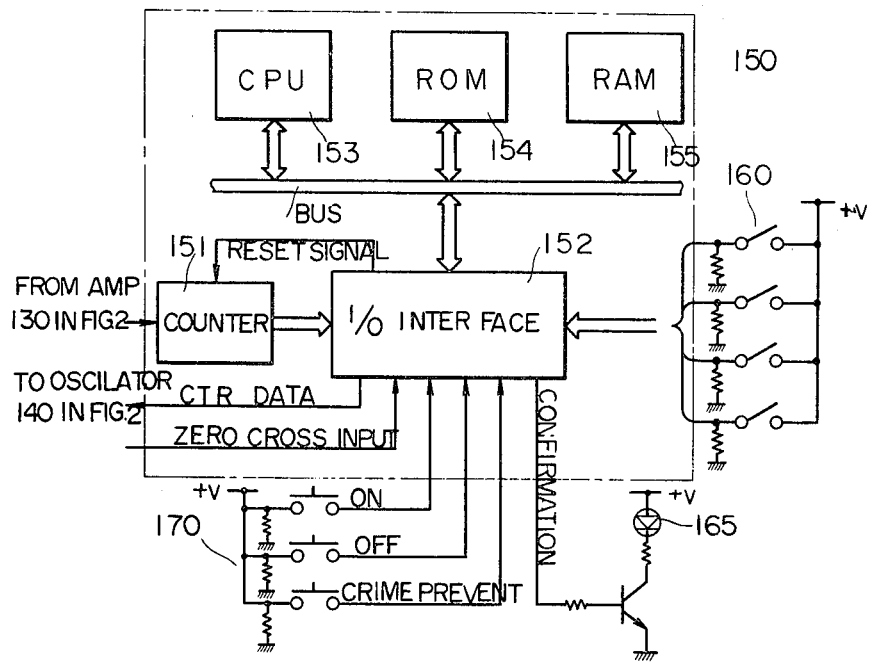
FIG. 5A is a block diagram showing an outline of the logic circuit 150 of the transmitter shown in FIG. 2.

FIG. 5A is a block diagram showing an outline of the logic circuit 150 of the transmitter shown in FIG. 2. Basically the logic circuit 150 comprises a central processing unit 153, a read only memory 154 and a random access memory 155. The input signals being received from the outside and the output signals being withdrawn to the outside are transferred through an input/output interface 152 and a bus line for communication with the central processing unit 153, the read only memory 154 and the random access memory 155. The above described read only memory 154 is used to store a program to be described subsequently. On the other hand, the random access memory 155 is used as a storage for data as transmitted. The central processing unit 153 makes a processing operation in accordance with the program stored in the read only memory 154. Now referring to FIG. 5A, an outline of the operation will be described. The input signal received through the coupling circuit 120 and the amplifier 130 is applied to the counter 151 provided in the logic circuit 150. The counter 151 counts the repetition frequency of the high frequency signal received in the predetermined period. For example, assuming that the high frequency carrier wave is 120 kHz and the counting period is 1 mm second, the count value in the counter 151 becomes 120 when the high frequency carrier wave is received. Accordingly, in order to discriminate the signal from noise, reception of a signal is determined in the central processing unit 153 when the count number exceeds 100. The received input signal comprises a busy signal and a channel data signal, as described previously. Determination as to whether the received input signal is a busy signal, a channel data signal or the like is made by the central processing unit 153 in accordance with the program stored in the read only memory 154. The counter 151 provides the count data to the central processing unit 153 through the input/output interface 152 and the bus line. Responsively, a counter reset signal is applied to the counter 151 from the central processing unit 153 through the bus line and the input/output interface 152. As a result, the counter 151 is returned to a condition ready for counting the next received input signal. On the other hand, the channel set data set by the channel setting switch 160 is stored in the random access memory 155 through the input/output interface 152. Likewise, the ON key input or the OFF key input entered by the push-button switch 170 is applied through the input/output interface 152 and the bus line to the central processing unit 153. In the absence of detection of the busy signal, the central processing unit 153 is responsive to the channel set data and the key input to transmit a transmission data signal to the oscillation circuit 140 (see FIG. 2) through the bus line and the input/output interface 152. If and when a reply signal is received notifying that the data signal transmitted by the transmitter is received by the receiver, the central processing unit 153 is responsive to the reply signal to provide a confirmation output signal through the bus line and the input/output interface 152. A confirmation indicating lamp 165 may be provided to be responsive to the confirmation output signal thereby providing a display.

Figure 5B:
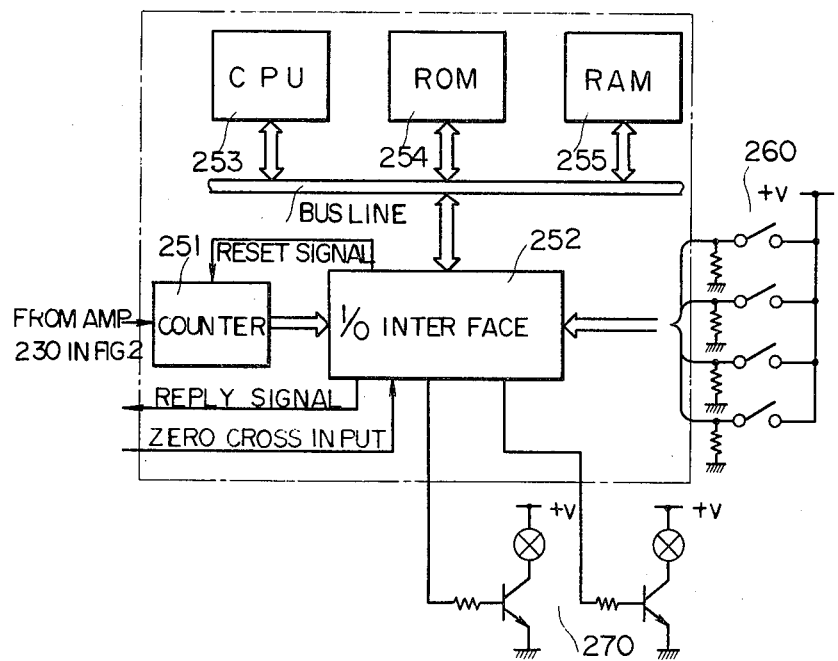
FIG. 5B is a block diagram showing an outline of the logic circuit 250 included in the receiver shown in FIG. 2.

FIG. 5B is a block diagram showing an outline of the logic circuit 250 included in the receiver 200 shown in FIG. 2. The fundamental structure of the FIG. 5B logic circuit 250 is substantially the same as that of the logic circuit 150 shown in FIG. 5A. Accordingly, an outline description in conjunction with FIG. 5B will be omitted. The detail of the operation performed by the logic circuits shown in FIGS. 5A and 5B will be described in the following with reference to the flow diagrams shown in FIG. 6A and 6B.

FIG. 6A is a flow diagram for explaining the operation of the transmitter. In order to facilitate the understanding of the FIG. 6A flow diagram, first the content in the random access memory necessary for the operation of the FIG. 6A flow diagram will be described with reference to FIG. 6C. The random access memory comprises a storing area for the channel data of four bits and a storing area for the control data of four bits. An area of four bits is provided as a transmission bit pointer (BP) for designating the bit position of the channel data and the control data. This is required, because the number of bits for the data to be transmitted are nine in total including start data and four bits are required to designate the bit positions in terms of a binary value. The random access memory further comprises reception buffer areas of four bits RB1, RB2, RB3 and RB4. The reception buffers each temporarily store the information received for each of the subbits corresponding to the previously described phase sections. The random access memory further comprises a storing area for storing key entry of the ON switch required in execution of the flow diagram, i.e. on ON key flag, a storing area for storing key entry of the OFF switch, i.e. an OFF key flag, and a storing area for storing transmission being in progress, i.e. a transmission progressing flag. With these various storing areas included in the random access memory in mind, the flow diagram shown in FIG. 6A will be described in the following.

(1) When key entry is not made, i.e. no transmission is made:

The operation in such situation starts with the step S1 and at the step S2 initial setting of the memory is made. More specifically, at the steps S1 and S2 the internal setting on the occasion of turning on of the power supply is made. Then at the step S3 the rise of the zero crossing input of the alternating current waveform is detected. The following routine is executed in synchronism with the zero crossing input or the clock signal. Detection of the rise of the zero crossing input is made by the central processing unit 153 based on the input from the clock generating circuit 110 shown in FIG. 2, as described previously. Then at the following step S4 the transmission output is set to the low level. The reason is that according to the convention the high frequency carrier wave should not exist at the first subbit position t1, i.e. the first phase section (see FIGS. 3 and 4A). Then at the following step S5 it is determined whether the ON key flag is the logic one, i.e. the ON key switch has been operated. Since no key entry has been made, the program proceeds to the step S6, where it is determined whether the OFF key flag is the logic one, i.e. the OFF key has been operated. Since the OFF key has neither been operated, the program proceeds to the step S7. At the step S7 it is determined whether a change of the rise of the input signal of the ON key has occurred. Since the ON key has not been operated, such change of rise has not occurred and therefore the program proceeds to the step S8, where it is determined whether a change of rise of the input signal of the OFF key has occurred. Since the OFF key has neither been operated, the program then returns to the step S3. The above described operation of the same steps S3, S4, S5, S6, S7 and S8 is then repeated. Unless any key entry is made, the above described routine is repeated.

(2) In the case where the ON or OFF key switch is depressed and power line has not been used for transmission:

In such a case, the program first proceeds in the same manner as described previously in the preceding paragraph (1) for the steps S1 to S7. If and when the ON key is operated, since a rising change of the key input signal occurs responsive thereto, the program proceeds from the step S7 to the S9. At the step S9 the ON key flag is set to the logic one. If and when the OFF key is operated, the program proceeds from the step S7 to step S8 and further to the step S10. At the step S10 the OFF key flag is set to the logic one. Thus entry of the key switch is stored. Thereafter the program proceeds from the S9 or the step S10 through the steps S3 and S4 to the step S5 or the step S6. At either the step S5 or the step S6 it is determined whether the key flag has been set to the logic one. Since the key flag has been set to the logic one at the step S9 or S10, the program proceeds from the step S5 or S6 to the step S11. At the step S11 it is determined whether the transmission progressing flag has been set to the logic one. Since no transmission has been started at that stage, the program then proceeds to the step S12. At the step S12 time is allowed to lapse until the end of the first subbit section, i.e. until the period t1 lapses. Thereafter the program proceeds to the step S13. The step S13 is a subroutine for reading out the received data. Briefly described, the subroutine for reading out the received data is adapted to count the repetition frequency of the high frequency carrier wave received during a time period corresponding to a stabilized period in the vicinity of the center of the subbit time period, thereby to determine that a received signal exist when the count number exceeds a predetermined number and to determine that no received signal exist when the count number is smaller than a predetermined number. One example of the subroutine at the step S13 is shown in FIG. 6D. Since no high frequency carrier wave exist on the power line in such situation, no busy signal appears at the second subbit position, i.e. the second phase section. Accordingly, the program proceeds from the step S14 to the step S15. More specifically, at the steps S12, S13 and S14 it is determined whether a busy signal is received, i.e. whether the power line is being used. At the step S15 the transmission progressing flag is set to the logic one. At the following step S16 the content of the transmission bit pointer BP is first set to the logic zero to be ready for transmission. Setting the transmission bit pointer BP to the logic zero means that the program is in a state before the data storing areas are designated. At the following step S17 it is determined whether the ON key flag has been set to the logic one. Since either the ON key or the OFF key has been set to the logic one at the step S9 or S10, at the step S17 it is determined which one has been depressed, the ON switch or the OFF switch, by only determining the set state of the flag of the ON key. If and when the ON switch has been operated, the program then proceeds to the step S18, whereas if and when the OFF switch has been operated, then the program proceeds to the step S19. When the ON switch has been operated, at the step S18 the control data is set to "0001", which is then loaded in the control data areas. If and when the OFF switch has been operated, at the step S19 the control data is set to "0000" and the same is loaded in the control data areas. At the following step S20 the channel data entered by the channel setting switch 160 is loaded in the channel data storing areas of the random access memory. As the result a state ready for transmission is established.

As shown as (2) in FIG. 4A, at the subsequent half cycle including four subbits, i.e. four phase sections, then the transmission start data or the start pulse is transmitted. As seen from (2) in FIG. 4A, the transmission start data has the high level outputs at the second subbit t2 (the second phase section) and the third subbit t3 (the third phase section). With this in mind, the flow diagram in this connection will be described. After the above described step S20 is completed, the program returns to the step S3. As a result, the program in the following cycle is started. At the step S4 the transmission output is set to the low level. As described previously, this means that the first subbit is set to the low level. Then at the step S5 it is determined whether the ON key flag has been set to the logic one. Since the flag has been set to the logic one, the program then proceeds to the step S11. Since the transmission progressing flag 1 has been set to the logic one at the step S15 described previously, the program proceeds from the step S11 to the step S21. Since the step S21 is a subroutine for reading out a received signal, the received signal is detected in this subroutine when the received signal is available. If and when the received signal is available at that stage, the received signal must be a noise. Considering a case where no noise exists, the program proceeds from the step S22 to the step S23. At the step S23 time is allowed to lapse up to the end of the first bit t1, whereupon at the step S24 the transmission output is set to the high level. More specifically, the fact that the transmission output is set to the high level after the lapse of the time period t1 means that the output of the second subbit is brought to the high level. The reason is that the second subbit is a period allotted for a busy signal and since presently transmission is in progress it is necessary to set the second subbit period to the high level. Thereafter at the step S25 detection of the received signal is made again. Since the transmission output has been withdrawn at the immediately previous step S24, this time its own busy signal is received. At the step S26 the result of reception is stored in the second area RB2 of the reception buffers corresponding to the position of the second subbit. Thereafter at the step S27 time is allowed to lapse until the end of the second subbit period t2, whereupon the program proceeds to the step S28. At the step S28 it is determined whether the bit pointer BP is the logic zero. Since the bit pointer BP has been set to the logic zero at the previous step S16, the following step is the step S29. At the step S29 the transmission output is brought to the high level for the third subbit period t3. The carrier wave is generated responsive to the transmission output. The carrier wave is read out at the step S30 and at the step S31 the result thereof is stored in the third storing area RB3 of the reception buffers corresponding to the third subbit t3. Thereafter at the step S32 time is allowed to lapse until the end of the third subbit time period t3, whereupon at the step S33 the transmission output is brought to the high level corresponding to the fourth subbit. The result thereof is stored in the fourth storing area RB4 of the reception buffers through the step S34 and at the step S35. Thus, the storing areas RB1 to RB4 of the reception buffers store the data of "0110". At the step S36 it is determined whether the data of the reception buffer RB is the data "0110" representing the transmission start. Since the determination is YES as a matter of course, the program then proceeds to the step S37. At the step S37 one is added to the transmission bit pointer BP. Then the program returns to the step S3. Thus, the transmission start data is transmitted during the half cycle period of the alternating current.

Thereafter the following cycle is started, so that the channel data is transmitted based on the channel data stored in the channel data storing areas in the random access memory during the following four half cycles in total. First of all the operation in the case where the data of the first bit of the channel data is transmitted will be described. At the step S3 the start of the following cycles is confirmed and at the step S4 the first subbit is set so that the transmission output becomes the low level, as described previously. Thereafter the program proceeds from the step S5 or S6 through the step S11 to the step S21. At the steps S22 to S26 the data of the second subbit is transmitted. At the step S27 time is allowed to lapse until the start of the third subbit and at the step S28 it is determined whether the transmission bit pointer BP is the logic zero. Since one has been added to the transmission bit pointer BP at the previous step S37, the transmission bit pointer BP is not 0 at that time point and accordingly the program proceeds to the step S38. At the step S38 it is determined whether the data stored in the data storing area designated by the transmission bit pointer BP is 1 or 0. Since the data bit pointer BP is 1 at that time, it is determined whether the data stored in the first channel data storing area is the logic one or zero. In the case where the data is the logic zero the program proceeds to the step S39, whereas in the case where the data is the logic one the program proceeds to the step S40. At the step S39 the transmission output is set to the low level and at the step S40 the transmission output is set to the high level. Thereafter the program proceeds through the routine S41 for reading out the received data and at the step S42 the data now received is stored in the third area RB3 of the reception buffers. Thus at the third subbit, a high frequency carrier wave is generated in the case where the transmission data is the logic one and a high frequency carrier wave is not generated in the case where the transmission data is the logic zero. At the end of the third subbit period at the step S43 the program proceeds to the step S44. At the steps S44 to S48 the same operation as that at the above described steps S38 to S42 is carried out. Thus the data signal of the fourth subbit, i.e. the fourth phase section, is transmitted.

Thereafter at the steps S49, S50 and S51 it is confirmed whether the transmitted data and the received data coincide with each other. More specifically, at the step S49 it is determined again as in the case of the above described steps S38 and S44 whether the data being transmitted is the logic one or zero. In the case where the data being transmitted is the logic one, the program proceeds to the step S50. At the step S50 it is determined whether the information stored in the reception buffers is "0111". As is clear from the above described steps, since the second, third and fourth subbits are all the logic one in the case where the data is the logic one, the program then proceeds to the step S52. Likewise, at the step S51 it is determined whether the information stored in the reception buffers is "0100", and then the program proceeds to the step S52. At the step S52 it is determined whether the transmission bit pointer BP is 8 to see whether the control data has progressed to the eighth bit position. Since at that time pointer BP is 1 as a matter of course, the program proceeds to the following step S37. At the step S37 one is further added to the bit pointer BP. Thus, the signal of the first bit of the channel data is transmitted.

In the same manner, the signal of the following cycle, i.e. of the second bit of the channel data, is transmitted. More specifically, the flow of the steps S3, S4, S5 or S6, S11, S12, S22 to S28, S38, S39 or S40, S41 to S42, S45 or S46, S47 to S49, S50 or S51, S52 and S37 is repeated. At the step S52 in the eighth repetition, the transmission bit pointer BP becomes 8 for the first time, i.e. BP=8, the program proceeds from the step S52 to the step S53. At the step S53 it is determined whether the ON control data has been transmitted and, if the determination is YES, the ON key flag is reset at the step S55. In the case where the OFF control data has been transmitted, the program proceeds from the step S53 to the step S54 and the OFF key flag is reset. After the key flag is reset, at the step S56 the transmission progressing flag is reset this time, whereby the transmission is completely terminated.

(3) In the case where power line is being used when transmission is about to be started:

In such situation, the ON key or the OFF key has been depressed for the purpose of transmission. Accordingly, as described in the preceding paragraph (2), the program proceeds from the step S1 through the step S7 or S8, the step S9 or S10, the steps S3, S4 and S5 or S6 and from the step S11 to the step S14. However, since the power line is being used, i.e. the busy signal has been transferred, the busy signal is read out at the step S13.

Accordingly, at the step S14 it is determined that the reception signal exists and the program returns again from the step S14 to the step S3. At the step S3 time is allowed to lapse until the following zero crossing input is detected, whereupon the program proceeds through the step S4 and the step S5 or S6 to the step S11. Since at that stage the program has not progressed from the step S14 to the step S15, the transmission progressing flag has not been set to the logic one. Accordingly, the program proceeds to the step S12 and to the step S13. If the busy signal is still detected at that stage, the program returns again through the step S14 to the step S3. More specifically, insofar as the busy signal is detected, the loop of the steps S3, S4, S5 or S6, S11, S12, S13 and S14 is repeated many times. If and when the busy signal is not detected, for the first time the program proceeds from the step S14 to the step S15. The further operation progresses in the steps in the case of the transmission mode described in the preceding paragraph (2).

(4) In the case where an error exists:

In the case where a noise occurs in the first subbit, the program proceeds from the step S22 to the step S56 of FIG. 6A(3), whereby the transmission progressing flag is reset to return to the step S3. Likewise, in the case where its own transmitted data and the data as received and stored in the reception buffer do not coincide with each other, the program proceeds from the step S36 and the step S50 or the step S51 to the step S56, whereby the transmission progressing flap is reset to return to the step S3.

FIG. 6B is a flow diagram for explaining the operation of the receiver. In order to facilitate the understanding of the FIG. 6B flow diagram, first of all the content of the random access memory required for operations depicted in the FIG. 6B flow diagram will be described with reference to FIG. 6E. As in the case of the random access memory for the transmitter shown in FIG. 6C, the random access memory shown in FIG. 6B comprises an area for the channel data of 4 bits and an area for the control data of 4 bits. The random access memory further comprises an area of 4 bit as a transmission bit pointer BP for designating the bit positions of the channel data and the control data and reception buffer areas of 4 bits. The role of the reception buffer is the same as that of the FIG. 6C random access memory. With these storing areas of the FIG. 6E random access memory in mind, the flow diagram shown in FIG. 6B will be described. For facility of the understanding of the flow diagram, the operation will be described by dividing the same into the following four modes, i.e. (1) in the case where the data transmitted with its own channel designated and without any interference such as a noise is received, (2) in the case where the data was transmitted without any intereference such as a noise but its own channel has not been designated, (3) in the case where no data has been transmitted, and (4) in the case where a noise exists on the power line.

(1) In the case where data transmitted without any interference such as noise and with its own channel designated is received:

The flow of the operation in such situation starts with the step S61 and at the step S62 the initial setting of the memory and the like is made. More specifically, at the steps S61 and S62 merely the internal settings of the apparatus made necessary by turning on of the power supply are performed. Then at the step S63 the rise of the zero crossing input of the alternating current wave is detected. As in the case of the FIG. 6A flow diagram, the further routine is executed in synchronism with the zero crossing input or the clock signal. The reception of the rise of the zero crossing input is made by the central processing unit responsive to the input of the FIG. 2 clock generating circuit 210, as described previously. Then at the step S64 which is a subroutine for reading out the received data, the same operation as described in conjunction with FIGS. 6A and 6D is executed. At the stage of the step S64 the information of the first subbit has been received. Since there is no interference such as a noise or the like, the result of reception is stored in the first area RB1 of the reception buffer at the following step S65. Then at the step S66 it is determined whether the reception signal is available. Since during the first subbit period no reception signal exists, the program proceeds to the following step S67. At the step S67 and the following steps S68 and S69 the reception signal during the second subbit period is read out. First at the step S67 time is allowed to lapse until the end of the first subbit period t1. When the second subbit period t2 starts, the reception signal is read out at the following step S68 and the result is stored in the second area RB2 of the reception buffer at the following step S69. Thereafter at the step S70 it is determined whether the received signal is available. In other words, at the step S70 it is determined whether a busy signal has been received. In the mode now in discussion, the signal has already been transmitted and therefore the busy signal is available in the second subbit. Accordingly, the program proceeds to the following step S71. At the step S71 and the following steps S72 and S73, the reception signal existing in the third subbit period is read out and is stored this time. More specifically, at the step S71 time is spent until the second subbit period is completely ended and when the third subbit period is started after the second subbit period is ended the signal included in the third subbit period is read out at the following step S72. The result as read out is then stored in the third area RB3 of the reception buffer at the following step S73. In the same manner, at the steps S73a, S74 and S75 the received signal of the fourth subbit period is read out and is stored in the area RB4 of the reception buffer. At that stage the data received during the initial half cycle of the alternating current, i.e. one cycle of the clock or zero crossing signal, has been stored in the reception buffer in terms of the logic one or zero. Since the data included in the first cycle is the reception start data, at the following step S76 it is determined whether the content in the reception buffer is the content "0110" is corresponding to the reception start data. Since the mode now in description is the mode in which the signal is properly received, the content already stored in the reception buffer is "0110" corresponding to the transmission start data. Accordingly, the program proceeds to the following step S77. At the step S77 the transmission bit pointer BP is set to one. Thereafter the program returns to the step S63, thereby to await detection of the following zero crossing input. Upon detection of the rise of the following zero crossing input, the following cycle of receiving operation is started.

The following cycle is exactly the same, as far as the previously described steps S64 to S75 are concerned. The program then proceeds to the step S76 and for the first time the steps to be followed become different. More specifically, since at the step S76 it is determined whether the content in the reception buffer is "0110" corresponding to the transmission start data, naturally the program proceeds to the following step S76a. The reason is that the content being presently stored in the reception buffer is the content of the first bit of the channel data. At the step S76a it is determined whether the content in the transmission bit pointer BP is zero. Since the content of the transmission bit pointer BP has been set to one, at the step S77 the program proceeds to the following step S78. At the step S78 it is determined whether the content being presently stored in the reception buffer is "0111" corresponding to the logic one. If and when the content of the first bit of the channel data as received is the logic one, the program proceeds to the step S79, whereas if and when the content is the logic zero the program proceeds to the step S80. In the case of the step S79 the data area shown by the transmission bit pointer BP is set to one. Since the transmission bit pointer BP is one, i.e. BP=1 at that time, the first data area, i.e. the first bit area of the channel data is loaded with the logic one. At the step S80 the logic zero is stored in that area in the same manner. After the operation at the step S79 or S80 the program proceeds to the step S81 and it is determined whether the transmission bit pointer BP is equal to 4. At the step S81 it is determined whether the channel data has been completely stored in the channel area. Since the transmission bit pointer BP is one, i.e. BP=1 at that time, the program proceeds to the step S82. At the step S82 it is determined whether transmission bit pointer BP is equal to 8. At the step S82 it is determined whether the control data have also been stored in the random access memory. Since the content of the bit pointer BP is 1, at the following step S83 one is added to the content of the bit pointer BP. Therefore, BP=2 will result. Then the program returns to the step S63 to proceeds to the following cycle.

At the following cycle the information of the second bit of the channel data is received and stored. The flow for that operation is exactly the same as the flow in the case where the information of the first bit of the above described channel data is read and stored. More specifically, after the program returns to the step S63, the flow of the following steps S64 to S76, S76a, S78, S79 or S80, S81, S82 and S83 is repeated. The repetition of the above described flow is repeated until the information of the fourth bit of the channel data is read out and stored. At the step S81 in the course of progress of the flow for reading and storing the fourth bit of the channel data, for the first time determination as to whether BP=4 becomes YES. Accordingly, the program proceeds from the step S81 to the step S84 this time. The progress of the program from the step S81 to the step S84 means that all the channel data is received and is completely stored in the reception buffer. Accordingly, at the step S84 the data set by the channel setting switch (260 of FIG. 2) of the receiver is inputted. At the following step S85 it is determined whether coincidence with the data stored in the channel data area of the random access memory already received exists. Since in the mode now in description its own channel has been designated, the data of both coincide with each other. Accordingly, the program proceeds to the step S83 and at the step S83 one is added to the bit pointer BP. As a result, BP=5 will result. Again the program returns to the step S63.

This time reception of the first bit of the control data is made. The operation flow proceeds in the same manner as described previously in the order of the steps S64 to S76, S76a, S78, S79 or S80, S81, S82 and S83. Since the control data is of four bits, the above described flow is repeated four times. However, at the step S82 in the course of the fourth repetition, BP=8 will result for the first time. Accordingly, the program proceeds from the step S82 to the step S86 this time. The progress of the program from the step S82 to the step S86 means that the reception and storage of the control data are completed. At the step S86 it is determined whether the control data as received, i.e. the content stored in the random access memory is "0001". For convenience sake, it is assumed that the data "0001" is an ON control signal. Of course, this is one example of the convention and a different code may represent the ON control signal. If and when determination at the step S86 is YES, then the program proceeds to the step S87 and an output relay is turned on, whereas if the determination at the step S86 is NO, then the program proceeds to the step S88 so that the output relay is turned off. Upon operation at the steps S87 and S88, the fundamental operation of reception is completed. Accordingly, at the step S89 the bit pointer BP is reset to zero and the program returns to the step S63. As described in the foregoing, a normal receiving operation is achieved.

(2) In the case where the data transmitted without interference such as noise is received but is not of the channel data designating own:

In the case of this mode as well, the operation after the channel data of 4 bits is received until the same is stored in the channel data area of the random access memory is the same as that of the mode described in the preceding paragraph (1). The difference resides in the operation after BP=4 is attained at the step S81, i.e. the reception of the channel data of 4 bits is completed and the data of the channel setting switch 260 is inputted at the step S84. More specifically, at the step S84 comparison is made between the channel data received and the data inputted by the channel setting switch. Since the channel data received is not the channel data designating own, the decision at the step S85 is NO. Accordingly, the program proceeds to the step S90 and the transmission bit pointer BP is set to zero. The program then returns to the step S63.

However, even if the transmission bit pointer BP is cleared to zero, reception of the data being transmitted is continued. More specifically, at the following cycle the first bit of the control data is to be received and the data received is to be stored in the data area indicated by the transmission bit pointer BP. It should be noted that in order to prevent each time such situation from occurring, the step S76a is provided between the steps S76 and S78. More specifically, after the transmission bit pointer BP is cleared to zero at the step S90, even if the program has proceeded from the step S63 to the step S76 and the data of the first bit of the control data has been received, the program necessarily proceeds from the step S76 to the step S76a. The reason is that the subbit code of the first bit of the control data is different from the subbit code of the reception start mark. Accordingly, since BP=0 at the step S76a, the program proceeds to the step S63 to enter into the following cycle. Since the above described operation is repeated, non-coincidence occurs between the channel data received and the channel data of its own, and accordingly even if the bit pointer BP is cleared to zero, the following control data will not be stored in the channel data area.

(3) The mode where no data is transmitted:

In the case of this mode, it is sufficient to determine whether a reception signal is available in the second subbit of each cycle. The reason is that usually the first subbit is a region where no signal is transferred, whereas a busy signal indicating that the line is being used is transferred in the second subbit. To that end, the program is adapted to proceed from the step S61 to the step S70 in the same manner as in the previous case. However, since no reception signal is available, the determination at the step S70 is NO. Accordingly, the program proceeds to the step S90 and the transmission bit pointer BP is cleared to zero. Insofar as no transmission signal is available, the program proceeds from the step S63 to the step S70 and to the step S90 and such operation is only repeated.

(4) In the case where noise is superposed on the transmission line:

In this case, at the step S64 the noise is received and the reception result is stored in the reception buffer S65. At the step S66 it is determined whether the reception signal is available. Since the noise was received as a reception signal, the determination at the step S66 is YES. As a result, the program proceeds to the step S90 and at the step S90 the transmission bit pointer BP is cleared. Thereafter the program returns to the step S63 and the flow of the following cycle is started. Insofar as a noise is superposed on the power line, the flow in the order of the steps S63, S64, S65, S66 and S90 is repeated.

Figure 7:
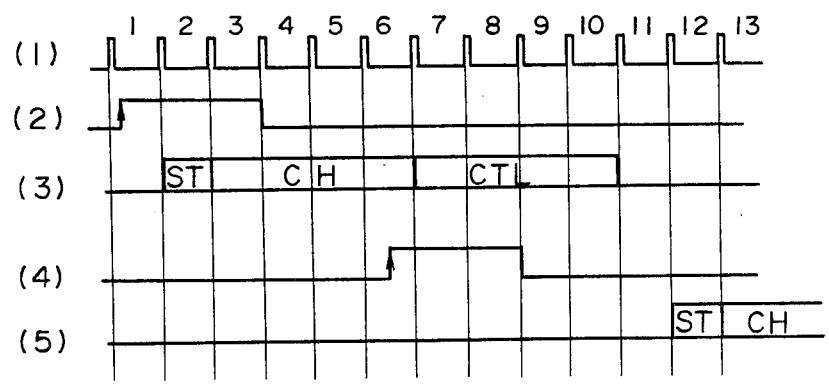
FIG. 7 is a graph explaining the fundamental concept of the embodiment achieved in accordance with the flow diagrams shown in FIGS. 6A and 6B.

FIG. 7 is a graph explaining the fundamental concept of the embodiment achieved in accordance with the flow diagrams shown in FIGS. 6A and 6B. As shown as (2) in FIG. 7, let it be assumed that the push-button switch of the transmitter of the N-th channel, for example, is depressed at the first timing of the clock as (1) in FIG. 7. Accordingly, at the second timing of the clock a carrier signal having the data of the signal format shown as (3) in FIG. 7 starts being transmitted from the transmitter. Let it be assumed that in the course of the transmission the push-button switch of the transmitter of the M-th channel is turned on at the sixth timing of the clock as shown as (4) in FIG. 7. In such a case, the logic circuit 150 of the transmitter of the M-th channel detects the data signal being transferred from the transmitter of the N-th channel on the power line. More specifically, the busy signal is detected by the transmitter of the M-th channel. Accordingly, the data transmission is not started at the seventh timing of the following clock pulse. Actuation of the push-button switch of the M-th channel transmitter is stored in the memory and, after the data signal produced by the N-th channel transmitter is transferred, i.e. after the busy signal is not detected at the eleventh timing of the clock, for example, the data transmission of the M-th channel transmitter is started, as shown as (5) in FIG. 7, in the order of the transmission start data, the channel data and the control data, starting from the twelfth timing of the clock.

Figure 8:
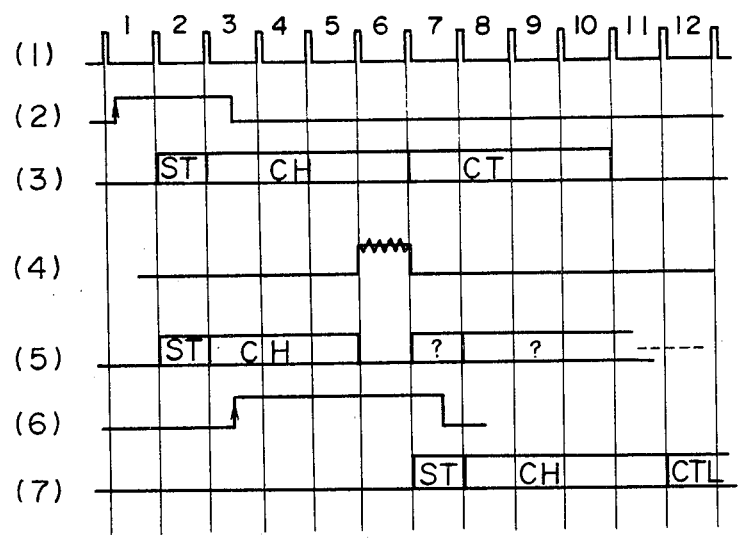
FIG. 8 shows a time chart for explaining how a conflict situation occurs.

It could happen that a conflict situation arises in the case where a noise occurs or the signal is attenuated in the course of the data transmission. Therefore, the elimination of such conflict situation by the embodiment of the present invention will now be described. First of all how such conflict situation occurs will be described with reference to the time chart shown in FIG. 8. The waveform (1) in FIG. 8 shows a clock pulse generated in synchronism with each half cycle of the alternating current, as described previously. The waveform (2) in FIG. 8 shows a case where the operation push button switch 170 of the transmitter 100N (FIG. 1) of the N-th channel is turned on between the first clock and the second clock. The waveform (3) in FIG. 8 shows the data transmitted by the transmitter 100N responsive to the turning on of the above described push-button switch 170. The waveform (4) in FIG. 8 shows an occurrence of a noise or attenuation of the signal between the sixth and seventh clocks. As a result, the data received through the coupling circuit 120 and the amplifier 130 of the M-th channel transmitter 100M includes a missing portion of the data. Such state is shown as (5) in FIG. 8. Accordingly, assuming that the pushbutton switch 170 of the of the transmitter 100M has been turned on in the course of transmission by the N-th transmitter 100N, as shown as (6) in FIG. 8, then the M-th channel transmitter 100M starts data transmission as shown as (7) in FIG. 8 at the pulse following the missing timing of the waveform (5) in FIG. 8. As a result, in spite of the fact that the N-th transmitter 100N is in the course of data transmission, the M-th channel transmitter 100M starts data transmission, thereby causing a conflict situation. Therefore, for the purpose of preventing occurrence of such conflict state in such case, the embodiment of the present invention is adapted to determine whether the missing portion of the received high frequency signal occurs more than a predetermined number of times and, only in the case where such a missing portion occurs more than a predetermined number of times, is the M-th channel transmitter 100M started for the first time for the data transmission. More detailed description will be given in the following with reference to FIGS. 9 and 10.

Figure 9:
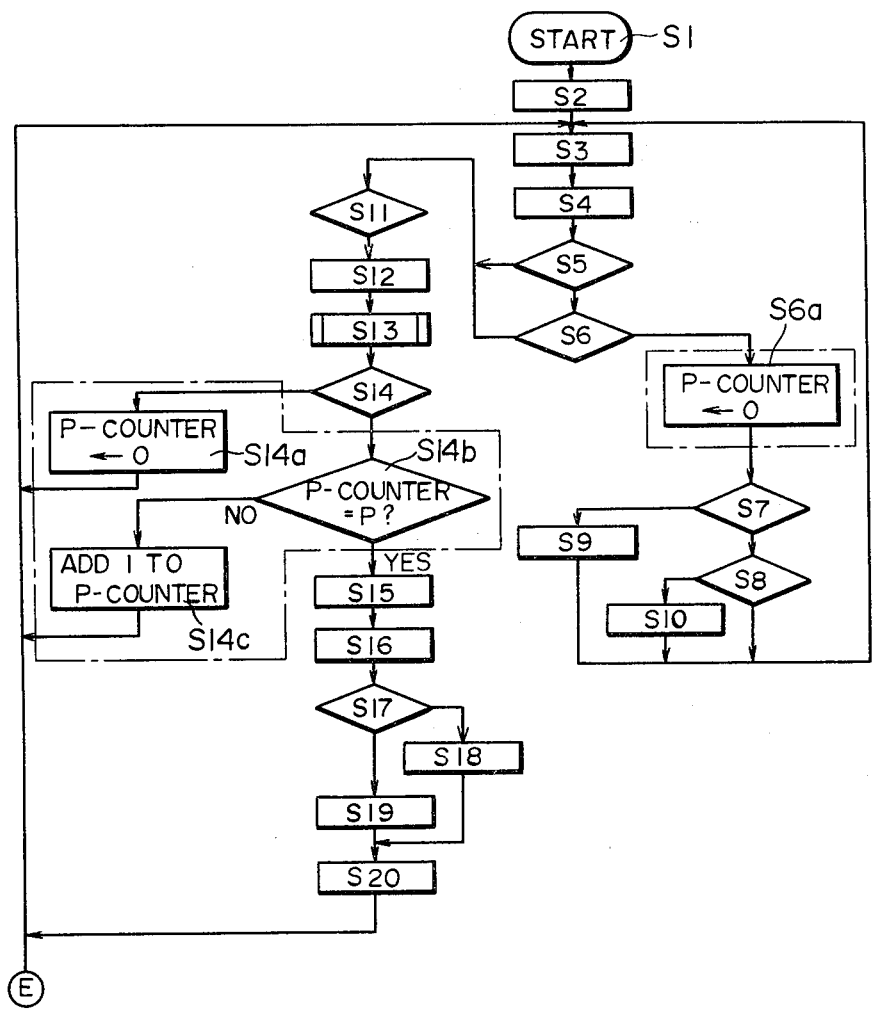
FIG. 9 shows a flow diagram of another embodiment of the present invention adapted to eliminate a conflict state due to a missing data signal portion caused by a noise.
Figure 10:
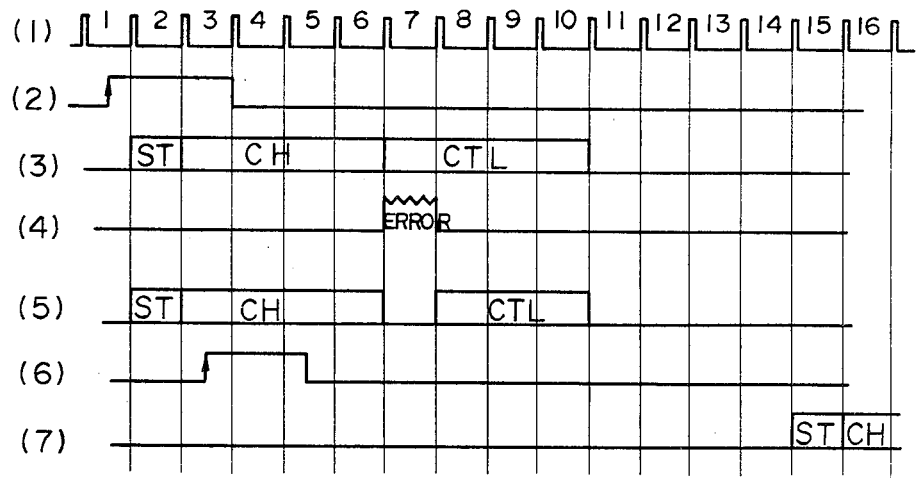
FIG. 10 is a time chart for explaining the operation of the FIG. 9 embodiment.

FIG. 9 shows a flow diagram of another embodiment of the present invention adapted to eliminate such conflict state due to missing of the data signal portion caused by such noise as described previously. FIG. 10 is a time chart for explaining the operation of the FIG. 9 embodiment. Before entering into a detailed description of the FIG. 9 flow diagram, a brief description of the operation will be given with reference to FIG. 10. The waveforms (1) to (5) in FIG. 10 correspond to the waveforms (1) to (5) in FIG. 8. Accordingly, the received data in the M-th channel transmitter 100M contains a missing portion as (5) in FIG. 10. The logic circuit 150 is responsive to such missing portion to count the clock pulses, thereby to determine the length of such missing portion or the number of cycles where such missing portions exist. If and when the count number is smaller than a predetermined number of clocks P, the logic circuit 150 determines that there is a missing portion due to a noise, an attenuated signal, or the like. In the case of the embodiment shown, since the channel data and the control data are each constituted of four half cycles, by setting the clock count number as P=4, it is determined that there is a missing portion in the transmitted data due to a noise or the like when the clock count number is smaller than 4. Upon such determination, the data transmission is not started by the M-th channel transmitter 100M and at the timing of for example the fifteenth clock timing pulse when the transmission of the data by the N-th channel transmitter 100N is completed and P becomes larger than 4, the transmission of the data by the M-th channel transmitter 100M is started as shown as (7) in FIG. 10. Thus, even if the transmission data is temporarily missing due to a noise, an attenuated signal, or the like, transmission is not started by another transmitter and as a result malfunction due to a conflict can be avoided. Even if a signal format is used in the data signal being transmitted in which blank periods corresponding to the plurality of clock count numbers exist, substantially the same effect can be achieved by setting the number P corresponding to the predetermined period, including normal vacant periods as well. With such concept in mind, the operation of the flow diagram shown in FIG. 9 will be described.

The FIG. 9 flow diagram comprises a modification of those steps encircled in one dotted line to be applied to the FIG. 6A-(1) flow diagram. The other steps in FIG. 9 embodiment are exactly the same as the steps in FIG. 6A flow diagram. Therefore, the drawings corresponding to FIG. 6A-(2) and FIG. 6A-(3) are omitted from FIG. 9 flow diagram. Accordingly, the fundamental operation of the transmitter is carried out in accordance with the FIG. 6A diagram. The FIG. 9 embodiment is adapted not to immediately start transmission, even when no busy signal is received during one cycle of the zero crossing detected signal or the clock. In other words, the embodiment shown is adapted to start transmission for the first time when a busy signal is not received even after the lapse of a predetermined time period. In order to measure such predetermined time period, a plurality (p) of cycles are allotted. In order to prevent the above described flow, the random access memory shown in FIG. 6C further comprises a counter region (hereinafter referred to as a P counter) capable of counting the count number p. As is clear from the FIG. 9 flow diagram, at the steps S13 and S14 it is determined whether a busy signal has been received. In the case where the busy signal is received, the program always proceeds from the step S14 to the step S14a and at the step S14a the content of the P counter is cleared. Then program returns to the step S3 and awaits the start of the following cycle. The next and further cycles progress in accordance with the flow of the normal mode, as previously described with reference to FIG. 6A.

If and when the busy signal is not received, the program proceed from the step S14 to the step S14b. At the step S14b it is determined whether the content in the P counter is equal to p. The content in the P counter when the busy signal is received for the first time is zero. Accordingly, the program proceeds from the step S14b to the step S14c. As the step S14c +1 is added to the content in the P counter. Thereafter the program returns to the step S3 to await the start of the following cycle. Then in the following cycle at the same steps S13 and S14 presence or absence of the busy signal is determined. If and when the busy signal is not continually received, then the program proceeds to the step S14b. At the step S14b again it is determined whether the content in the P counter is p. Assuming that the number p is 4, as described previously, then at that stage the program proceeds further to the step S14c and one is further added to the content in the P counter. Such operation is repeated for p cycles and at the step S14c of the P-th cycle 1 is again added to the content in the P counter, whereupon the content in the P counter becomes p for the first time. Accordingly, at the step S14b of the (p+1)-th cycle the content in the P counter is determined as p for the first time. Accordingly, the program proceeds to the step S15 and the transmission progressing flag is set to the logic one for the first time. If and when a busy signal is received before the (p+1)-th cycle is reached, the program proceeds from the step S14 to the step S14a. At the step S14a the content in the P counter so far counted is cleared. Accordingly, it is detected that the busy signal is not received continually p times, whereupon the program proceeds to a transmission start state.

Meanwhile, the step S6a for turning the content in the P counter to zero is provided between the steps S6 and S7. The purpose is to always clear the content in the P counter zero, even in the routine for determining whether key entry was made.

FIG. 11 is a flow diagram of another embodiment of the present invention. The FIG. 9 embodiment was adapted to start transmission for the first time when a busy signal is not received for a predetermined time period, thereby to prevent malfunction due to an interference of a noise or the like. However, the FIG. 9 embodiment could cause a conflict when such an error as described in the following occurs. For example, consider a case where the respective operation key switches of two or more transmitters are operated simultaneously so that the transmission start data are simultaneously transmitted. In such a case, as is clear from the description in conjunction with the FIG. 6A flow diagram, the received data and its own transmitted data are compared in the respective transmitters, whereby an error occurrence is detected at the step S36. Since the data of both do not coincide with each other, the program proceeds to the step S56, where the transmission progressing flag is reset and the transmission is terminated. The respective transmitters are each placed in a state for awaiting the next transmission timing. However, unless a preferential order is set among a plurality of transmitters where the operation keys are simultaneously depressed, again the transmission is started simultaneously, thereby to cause a conflict, with the result that an error occurrence state continues. The FIG. 11 embodiment is adapted to set in advance a preferential order for each of the respective transmitters and thus the respective channels, in order to eliminate such a problem on the occasion of an error occurrence. Fundamentally, the FIG. 11 embodiment is substantially the same as the embodiments depicted in conjunction with FIGS. 6A and 9 and the FIG. 11 embodiment comprises a modification of the steps enclosed with one dotted line to be applicable to the FIG. 6A embodiment. In order to implement the FIG. 11 flow diagram, the random access memory further comprises a counter region (hereinafter referred to as a C counter) capable of counting the number corresponding to a predetermined preferential order of each of the respective transmitters, and an error flag region. As additional steps, the step S56a for setting the error flag to the logic one and the step S56b for clearing the C counter are interposed between the steps S51 and S56. Addition of the step S56a sets the error flag to the logic one responsive to no-coincidence between the received data and its own transmitted data. The C counter is cleared at the step S56b. At the following cycle the steps S3, S4, S5, or S6, S11, S12, S13 and S14 are repeated. Now consider that a busy signal is not detected for a predetermined time period at the steps described in conjunction with FIG. 9. In the case of the FIG. 9 embodiment, thereafter the program proceeds from the step S14b to the step S15, whereas in the case of the FIG. 11 embodiment the new step has been added between the steps S14b and S15. First at the step S15a it is determined whether the error flag has been set to the logic one, i.e. whether the error has occurred. Since the error flag has been set to the logic one at the step S56a, the program proceeds to the following step S15b. Since the error flag is not set to the logic one at the step S56a as a matter of course in the case where no error has occurred, the program proceeds from the step S15a to the step S15 and the transmission progressing flag is set to the logic one, whereby the program is in the state of ready for transmission. At the step S15b it is determined whether the content in the C counter coincides with the data set by the channel setting switch. If and when the content in the C counter does not coincide with the channel set data, the program proceeds to the step S15c and 1 is added to the content in the C counter. Thereafter the program returns to the step S3 and the following cycles are started. Thus, each time 1 is added to the content in the C counter and the same cycle is repeated until the content in the C counter finally comes to coincide with the channel designating data. During the time period when these cycles are repeated, transmission is stopped. If and when the content in the C counter finally comes to coincide with the channel designating data, the program proceeds from the step S15i b to the step S15d. At that time point the error flag is reset and then at the step S15 the transmission progressing flag is set, thereby to be in a state ready for transmission. Thus, according to the FIG. 11 embodiment, the program becomes a state ready for transmission for the first time a predetermined time period after a busy signal is not received and, in addition, in case of occurrence of an error at that time point, transmission is stopped in the period corresponding to its own channel data.

Figure 12:
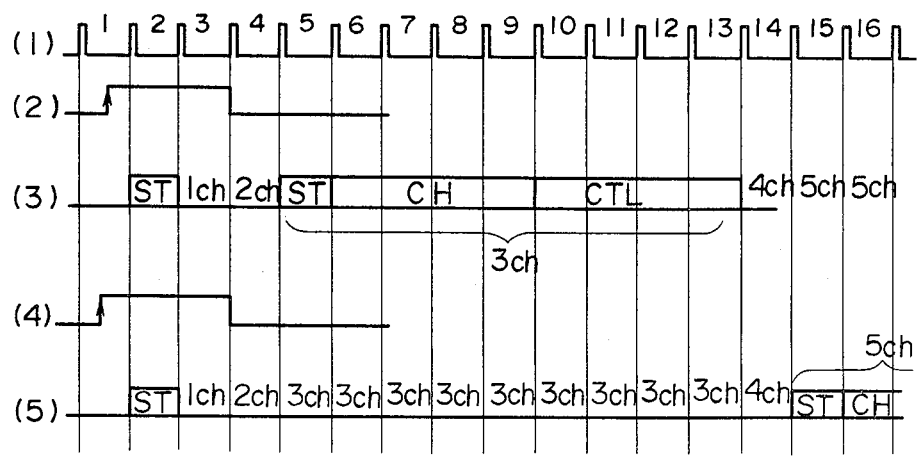
FIG. 12 is a time chart showing in a simplified manner the case of the FIG. 11 embodiment.

FIG. 12 is a time chart showing in a simplified manner the case of the FIG. 11 embodiment. For simplicity of illustration, a predetermined waiting time period shown in the FIG. 9 embodiment has been omitted. In the FIG. 12 time chart will be briefly described. The waveform (1) in FIG. 12 is a zero crossing signal or a clock pulse generated in synchronism with each half cycle of the alternating current. The waveforms (2) and (3) in FIG. 12 show the time chart of the transmitter of the third channel and the waveforms (4) and (5) in FIG. 12 show the time chart of the transmitter of the fifth channel. At a first timing pulse of the clock, the pushbutton switches 170 of the transmitters of the third and fifth channels are coincidently depressed, whereby the key entry signals are generated (see (2) and (4) in FIG. 12). Responsively, the transmission start data or the start pulse is transmitted at the next timing, as shown as (3) and (5) in FIG. 12, from each of the transmitters. At each of the transmitters the received data and its own transmitted data are compared, thereby to detect occurrence of an error and determine a preferential order. As a result, a signal missing period is counted by each of the transmitters. In case of the third channel transmitter, after two signal missing periods are counted, the transmission start data, the channel data and the control data are transmitted at the next timing. On the other hand, in the case of the fifth channel transmitter in conflict with the third channel transmitter, after the lapse of the transmission period of the third channel, and further after the lapse of the signal missing period allotted for the next fourth channel, predetermined data is transmitted.

In the above described various embodiments, various countermeasures were employed to prevent malfunction caused by an interference due to noise. However, the above described embodiments still involve such an inconvenience as described in the following. More specifically, in the case where the number of times of transmission of the transmission data has been set to a relatively few number of times, a noise suddenly occurring in the course of transfer of the data could come in a transmitted signal, in which case such signal becomes an erroneous signal and an erroneous controlling operation is caused. On the other hand, if the number of times of transmission is set to a large number of times to prevent such inconvenience, another channel cannot be used while the data is being transmitted for one channel, with the result that a waiting time period is prolonged. Therefore, it is desired that the number of times of transmission is made different depending on the degree of importance of the operation key entry. More specifically, it is desired that in the case where a means of importance is to be controlled, a larger number of times of transmission is repeated, thereby preventing malfunction of the equipment due to a bursting noise, whereas in the case where a means of less importance is to be controlled, the number of times of transmission is limited to the minimum, thereby to reduce a waiting time period to make the power line utilizable as much as possible.

Figure 13:
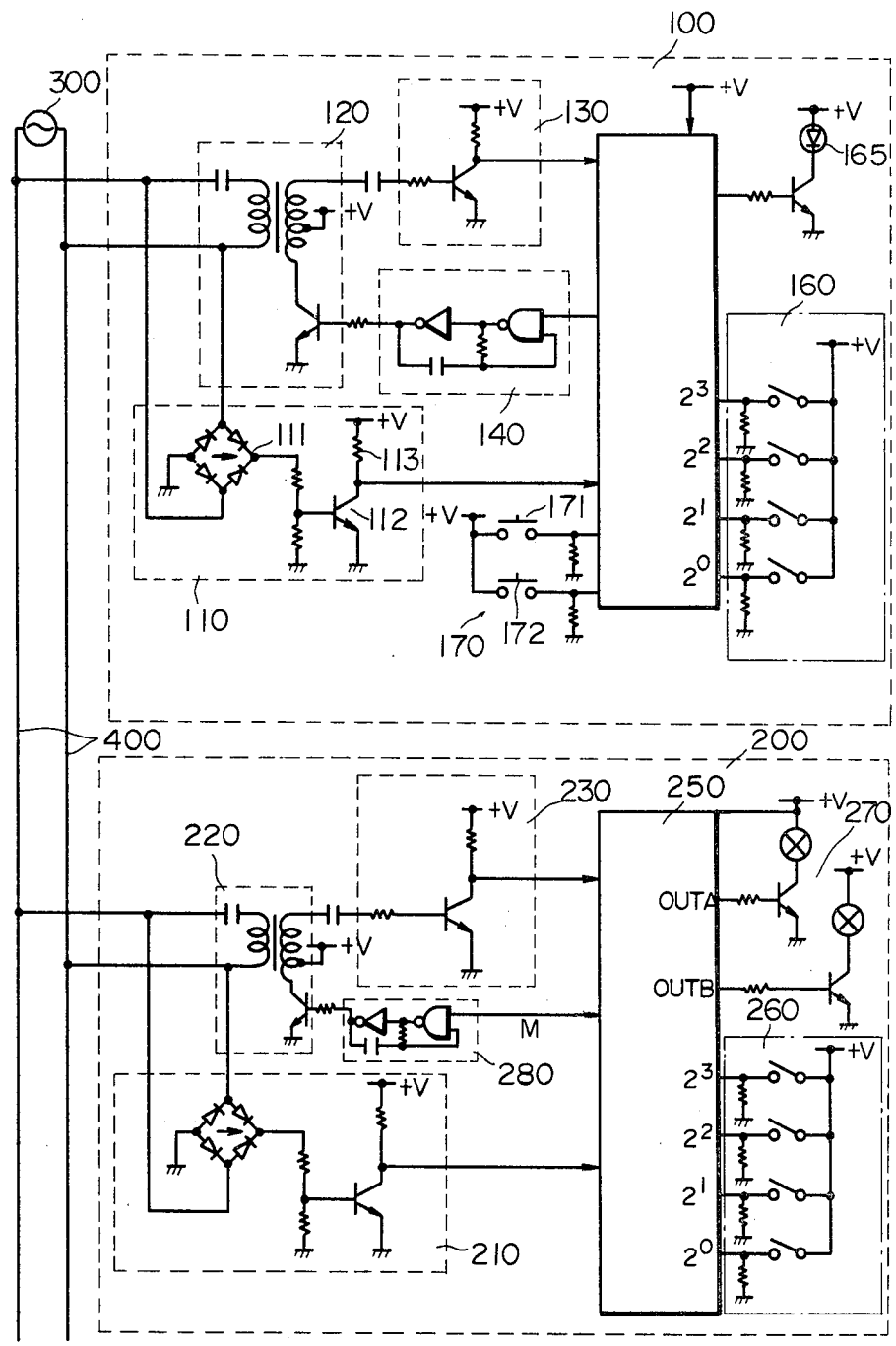
FIG. 13 is a schematic diagram of a signal transmission system adapted for preventing malfunction by awaiting the above described operation entry depending on the degree of importance of the operation entry.

FIG. 13 is a schematic diagram of a signal transmission system adapted for preventing malfunction by awaiting the above described operation entry depending on the degree of importance of the operation entry. Since the FIG. 13 is similar to FIG. 2, like elements have been denoted by like reference characters. A different and important feature of the FIG. 13 embodiment, as compared with the FIG. 2 embodiment, is that an oscillating circuit 280 is provided in the receiver 200, as in the case of the transmitter 100. A further feature of the FIG. 13 embodiment is that the receiver 200 is responsive to receipt of the data transmitted from the transmitter 100 and responsive to the fact that a means being controlled is actually controlled to provide an operation confirming signal or a reply signal. When the operation confirming signal is detected by a transmitter 100, then transmission of the data is stopped. If and when the transmitter 100 does not detect the operation confirming signal in spite of the fact that the transmitter 100 transmitted the data, then the transmitter 100 repeats transmission of the data a number of times predetermined depending on the degree of importance of the operation switch of the operation pushbutton switch 170. If and when the operation confirming signal M is returned midway or the data is repetitively transmitted by a predetermined number of times, then transmission of the data is stopped. More detailed description will be given in conjunction with a flow diagram shown in FIG. 14 to be described subsequently. On the other hand, the receiver 200 is responsive to the transmitted data and to the fact that the means being controlled 270 coupled to the terminal of the receiver 200, such as a relay, is actually controlled, to cause the logic circuit 250 to provide the operation confirming data of a digital signal format. The oscillation circuit 280 is responsive to the operation confirming data to make continuous oscillation, thereby to provide the operation confirming signal M. The operation confirming signal M is also superposed on the power line 400 through the coupling circuit 220. More detailed description of the fundamental operation of the FIG. 13 embodiment will be described in the following with reference to the flow diagram shown in FIG. 14A.

FIG. 14A is a flow diagram for explaining the operation of the embodiment depicted in conjunction with FIG. 13. Briefly described, the FIG. 14A shows a flow diagram of the operation of a transmitter in a system adapted for returning a reply signal indicating that the data transmitted from the transmitter to the receiver is received by the receiver, wherein, after the data is transmitted until the reply signal is received from the receiver by the transmitter, data is transmitted a plurality (n) of times. In order to attain such operation, the random access memory comprises a storing area for storing a reply flag, a counter area (hereinafter referred to as an N counter) capable of counting the number corresponding to a predetermined number of times, and a reply data storing area of 4 bits for storing the reply data as received. The reply data storing area is provided at the ninth to twelfth positions indicated by the transmission bit pointer BP. With such content of the random access memory in mind, a feature of the FIG. 14A flow diagram which is different from the FIG. 6A flow diagram is first pointed out. Firstly, the step S20 is followed by a new step S20a for setting in advance the reply flag to the logic one. The step S20a is not intended to set the reply flag to the logic one upon receipt of the reply data, i.e. the operation confirming data, but is intended to set provisionally the reply flag to the logic one after the channel setting data is in advance stored in the channel data area at the step S20. A second different feature is that the steps S52, S53, S54 and S55 in FIG. 6A flow diagram are omitted. The reason is that determination as to whether transmission was completed is carried out at the steps encircled with one dotted line newly added to the FIG. 6A diagram (FIG. 14A-(4) and (5)). The third different feature is that the flow shown by one dotted line was added between the steps S11 and S21 (FIG. 14A-(2)).

As fully described in conjunction with the FIG. 6A flow diagram, first a process until the transmission bit pointer BP becomes 8 is considered. Until BP=8 is attained, the step following the step S100 is the step S21 and the steps thereafter are exactly the same as those in the normal transmission mode previously described in conjunction with FIG. 6A. In the following cycle, when it is determined at the step S100 whether the transmission bit pointer BP is between 9 and 12, the determination is YES, and the program proceeds to the step S101. At the steps S101 and S103, the information of the second subbit of the ninth cycle is read out and the result is stored in the second area RB2 of the reception buffer. At the step S104 it is determined whether the received signal is available. Since the timing in the process to the above described step S101 is the timing for receiving the reply signal, the step S104 may be set to be a step for determining whether the reply signal is received. Accordingly, in the case where a received signal is available at the second subbit, this means that a reply signal was received. On the other hand, if a received signal is not available, it is indicated that no reply signal is available and at the following step S105 the reply flag previously set to the logic one provisionally at the step S20a or set to the logic one at the step S124 to be described subsequently is reset. Thereafter at the steps S104 to S108 the data in the third subbit is read out and at the steps S109 to S111 the data in the fourth subbit is read out and is stored in the reception buffer. After the data of up to the fourth subbit is read out, at the step S112 it is determined whether the content stored in the reception buffer is "0111". If the determination is YES, the program proceeds to the step S113, whereas if the determination is NO the program proceeds to the step S114, whereupon the reply data storing area indicated by the transmission bit pointer is turned to the logic one or zero. Thereafter at the step S115 one is further added to the transmission bit pointer BP. Then at the step S116 it is determined whether BP=13. The step S116 is aimed to determine whether the reply data reception cycle is completed. Accordingly, until BP=13, the program returns to the step S3 and the same flow is repeated for the following cycles. When BP=13 is reached, the program proceeds from the step S116 to the step S117. At the step S117 it is determined whether the reply flag has been set to the logic one. If and when the reply data (the operation confirming data) including four bits has been normally received, the program does not proceed to the step S105 and the reply flag remains set to the logic one. Accordingly, the program proceeds to the step S118. At the step S118 the content in the N counter is set to n. The reason is that since the reply data was normally received it is not necessary to transmit the data any more. At the following step S119 it is determined whether the content in the transmission data storing area is "1111". If the determination is YES, the confirming output is turned ON at the step S120, whereas if the determination is NO the confirming output is OFF at the step S121. Thereafter at the step S122 one is added to the N counter. Then at the step S123 it is determined whether the content in the N counter is larger than n. Since the program has proceeded through the steps S118 and S122, the content in the N counter is (n+1). Accordingly, the step S123 is followed by the step S125. At the step S125 it is determined whether the ON signal has been transmitted and if so at the step S126 the ON key flag is reset and otherwise at the step S127 the OFF key flag is reset. These steps correspond to the steps S52, S53, S54 and S55 in FIG. 6A. Thereafter at the step S128 the transmission progressing flag is also reset and the transmission is completed.

If and when no reply data has been received at the timing of reception of the reply signal, at the step S105 the reply flag is reset to zero. At that time the program proceeds from the step S117 to the step S122. At the step S122 one is added to the content in the N counter. At the step S123 it is determined whether the content in the N counter is larger than n. If and when reception of the reply data does not reach n times, i.e. unless the transmission data is transmitted n times, the content in the N counter is smaller than n and then the program proceeds from the step S123 to the step S124. At the step S124 the transmission bit pointer BP is cleared. At the following step S124a the reply flag is set to the logic one. Then the program returns to the following step S3 and again the flow of a normal transmission mode is repeated. Unless the reply data is received each time the normal transmission mode is repeated, ultimately the transmission is repeated n times, as is clear from the flow diagram shown in FIG. 14A. In the absence of reception of the reply data even after the transmission is repeated n times, the program proceeds from the step S123 to the step S125. The program then proceeds through the step S126 or the step S127 and the transmission flag is reset. More specifically, in the absence of the reply signal even after repetition of transmission n times, at the step S126 or S127 the key entry of ON or OFF key entered in advance is reset, resulting in a transmission completed state.

FIG. 14B is a flow diagram for the receiver corresponding to the flow diagram for the transmitter shown in FIG. 14A. More specifically, FIG. 14B shows a flow diagram which is capable of returning to the transmitter the reply data which is the reception confirming data upon receipt of the transmitted data. The fundamental flow diagram for the receiver is shown in FIG. 6B and only those steps enclosed with one dotted line in FIG. 14B is applicable to the FIG. 6B flow diagram. In order to achieve the flow diagram shown in FIG. 14B, the random access memory is further provided with a reply data storing area of four bits.

Briefly described, the FIG. 14B embodiment is adapted to attain the transmission mode in the transmitter at the timing shown as 9 to 12 by the transmission bit pointer BP on the occasion of the reply data transmitting cycle. More specifically, after the reception mode is started at the step S63, first of all the transmission output is set to the low level at the step S63a. At the step S63b it is determined whether the content in the transmission bit pointer BP is between 9 and 12, in other words in the reply data transmitting timing. Since the system is in the reception mode insofar as the content in the transmission bit pointer is smaller than 8 as a matter of course, the program proceeds to the step S64 and thus the fundamental reception mode depicted in conjunction with FIG. 6B is achieved. When the content in the transmission bit pointer BP becomes 9, i.e. when the reply cycle is started, the program proceeds from the step S63b to the step S63c. At the step S63c the operation is in a time waiting state until the first bit period is completed, whereupon at the step S63b the transmission output of the second subbit is set to the high level. The high level of the second subbit means a busy signal. At the step S63e the operation is in a time waiting state until the second subbit period is completed, whereupon at the step S63f it is determined whether the logic one has been stored in the reply data storing area indicated by the transmission bit pointer BP. If the logic one has been stored in the reply data storing area, at the step S63g the transmission output is set to the high level. If and when zero has been stored, at the step S63h the transmission output is brought to the low level. More specifically, at the steps S63f, S63g and S63h it is determined whether the third and fourth outputs should be set to the high level or the low level depending on the data to be transmitted is the logic one or zero. In the case of the example shown, when the reply data of one bit is the logic one the subbit code is "0111" and the reply data of one bit is the logic zero the subbit code is "0100". Thereafter at the step S63i it is determined whether the content in the transmision bit pointer BP is 12. Until the content in the transmission bit pointer BP becomes 12, the program repeats the above described flow by passing the step S63j for adding 1 to the transmission bit pointer BP. If and when the content in the transmission bit pointer BP becomes 12, at the step S63k the content in the transmission bit pointer BP is cleared. In the case where the output relay is to be turned on, at the step S87a the data "1111" is stored in the reply data storing area of the random access memory and in the case where the output relay is to be turned off at the step S88a the data "0000" is stored in the reply data storing area of the random access memory.

Figure 14C:
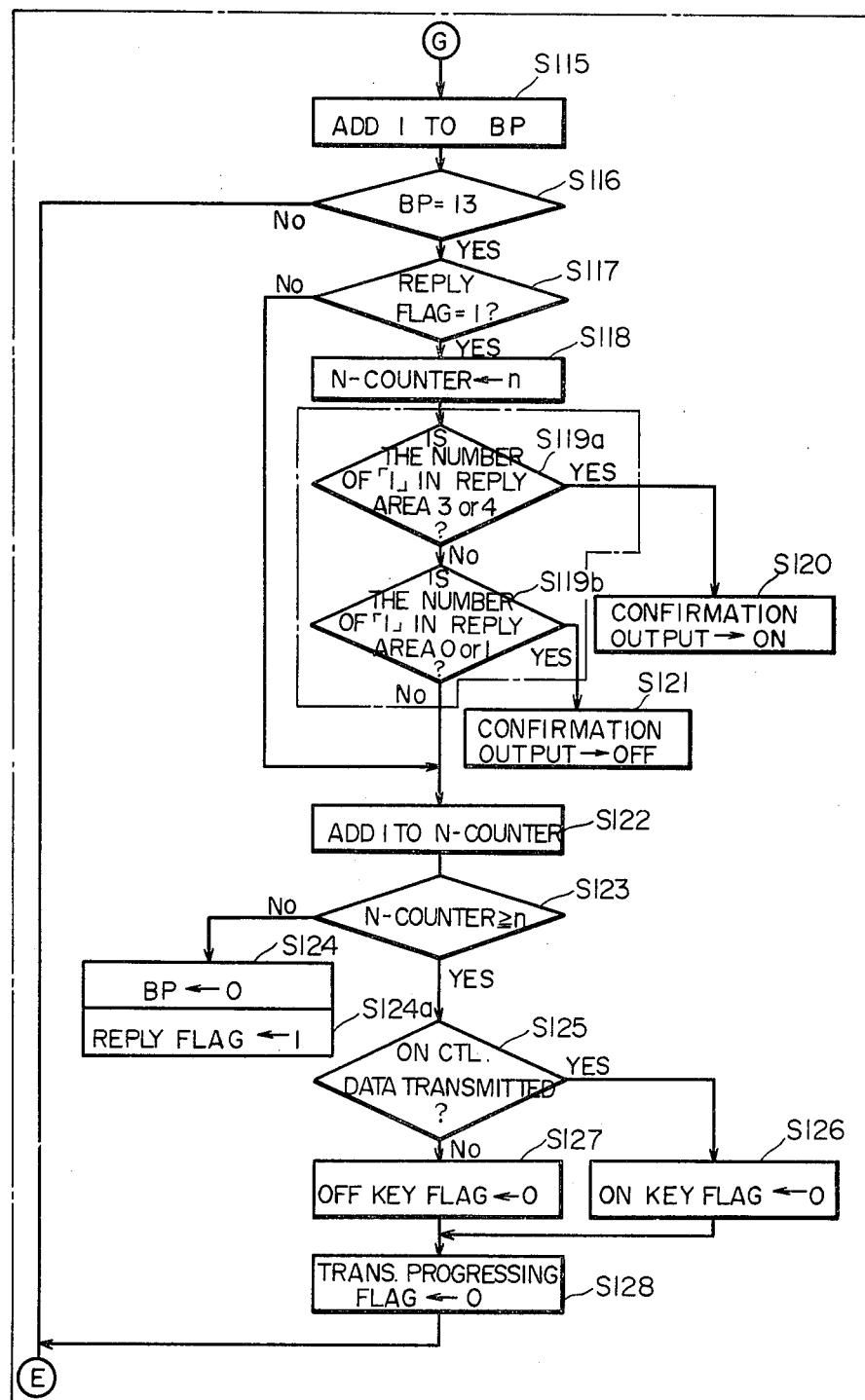
FIG. 14C is a modification of the flow diagram shown in FIG. 14A.

FIG. 14C is a modification of the flow diagram shown in FIG. 14A-(5). At the steps A119 and S120 or S121 shown in FIG. 14A, the confirmation output was set to ON or OFF depending on the reply data. The ON or OFF of the confirmation output was determined depending on whether the content stored in the reply data storing area is "1111" or not. However, in the case where a noise is superposed on the bit constituting the reply signal, an error could occur that the data "0" originally intended for transmission is determined as the data "1". Specifically described, now consider a case where the reply data is constituted of four bits and let it be assumed that when the confirmation output is ON all the four bits are constituted of 1 whereas when the confirmation output is OFF all the four bits are constituted of 0. 1 or 0 of each bit is determined by the four bits constituting each bit. For example, in the case where the subbit code is "0111", the bit is determined as "1", whereas when the subbit code is "0100" the bit is determined as 0. If and when a noise is superposed on the third and fourth subbits while the subbit code "0100" is being transmitted so that the data "0111" is received, the corresponding bits are stored in the reply data storing area at "1" in spite of the fact that the same should have been originally stored as "0". According to the FIC. 14C embodiment, even if such partial error occurs, if and when the number of "1" stored in the reply data storing area is a majority, it is determined as if ON was returned, whereas if and when the number of "1" stored in the reply data storing area is a minority it is determined as if the OFF was returned. The above described operation would be readily understood when the steps S119a and S119b encircled with one dotted line in FIG. 14C are reviewed.

FIG. 15A shows one example of a flow diagram for the transmitter of still a further embodiment of the present invention. FIG. 15A embodiment is adapted such that the number of times of transmission is different depending on the kinds of key entry made by the operation button switch (170 of FIG. 2). The embodiment shown is further provided with a crime preventing key entry switch, besides the key entry of ON and OFF. Now consider that in the case of key entry of ON and OFF the transmission is repeated n1 times whereas in the case of the crime preventing key the transmission is repeated n2 times. Since it is usually desired that the means being controlled on the part of the receiver be assuredly controlled upon operation of the crime preventing key, the number of times of transmission in the case of the crime preventing key entry is selected to be larger than the number of times of repetition in the case of the key entry of ON and OFF. In order to achieve the flow diagram shown in FIG. 15A, the random access memory is further provided with a repetition number counter area (hereinafter referred to an N counter) capable of counting the number of times of transmission, and a crime preventing key flag area, in addition to those shown in FIG. 6C.

The fundamental operation in accordance with the flow diagram shown in FIG. 15A is based on the block diagram shown in FIG. 6A. In order to achieve the FIG. 15A embodiment, the portion encircled with one dotted line is added to the FIG. 6A diagram or is substituted for a portion of the FIG. 6A diagram as a modification thereof. Now a case where a normal transmitting operation is made upon key entry of any keys will be briefly described. As is clear from the detailed description in conjunction with FIG. 6A, the operation at the steps S1, S2, S3 and S4 is carried out as described previously. At the step S201 it is determined whether any one of the key flags has become 1. Since at the initial stage no key flags have been set to the logic one, the program proceeds to the step S202. If and when the crime preventing key has been depressed, the program proceeds from the step S202 to the step S205, whereby the crime preventing key flag is set to the logic one and when the ON key has been depressed the program proceeds from the step S203 to the step S206, whereby the ON key flag is set to the logic one, whereas when the OFF key has been depressed the program proceeds from the step S204 to the step S207, whereby the OFF key flag is set to the logic one. When any one of the key flag is set to the logic one at the step S205, S206 or S207, at the step S208 the content in the N counter is cleared. Thereafter the program returns to the step S3 and the following cycle is started. In the following cycle, likewise the program proceeds through the steps S3 and S4 to enter into the step S201. Since any of the key flags have become the logic one at that stage, the program proceeds from the step S201 to the step S11. The operation at the steps S11 to S16 was fully described in conjunction with FIG. 6A. The new steps S209 and S210 are added after the step S16. These steps are aimed to store the control data in the control data storing area based on the entry of the crime preventing key. Thereafter the same mode as the normal operation mode described in conjunction with FIG. 6A is achieved. However, for the purpose of repetitively transmitting the transmission data, some steps after the steps S52 in the case where the transmission bit pointer BP has become 8 have been modified. More specifically, after transmission is made up to the control data, at the step S211, 1 is added to the content in the N counter. At the following step S212 it is determined whether the crime preventing control data is being transmitted. If and when the crime preventing control data is being transmitted, at the step S213 it is determined whether the content in the N counter is n2. If and when transmission has not been made n2 times, the program proceeds to the step S216 and the transmission bit pointer BP is cleared. Thereafter again the normal transmission mode is repeated. If and when the transmission control data has been transmitted n2 times, the program proceeds from the step S213 to the step S214. At the step S214 the crime preventing key flag is reset and thereafter at the step S56 the transmission progressing flag is also reset. If and when the crime preventing control data is not being transmitted, the program proceeds from the step S212 to the step S215 and it is determined whether the content in the N counter is n1. In the case where the determination is NO, the program proceeds through the step S216 and the same transmission mode is repeated. After such transmission mode is repeated n1 times, the program proceeds from the step S215 to the step S53. Upon determination at the step S53, the key flag of OFF or ON is reset at the step S54 or S55 and at the step S56 the transmission progressing flag is also reset. Thus it would be appreciated that transmission of the transmission data can be made a predetermined number of times predetermined depending on the kinds of the key entry.

Figure 15B:
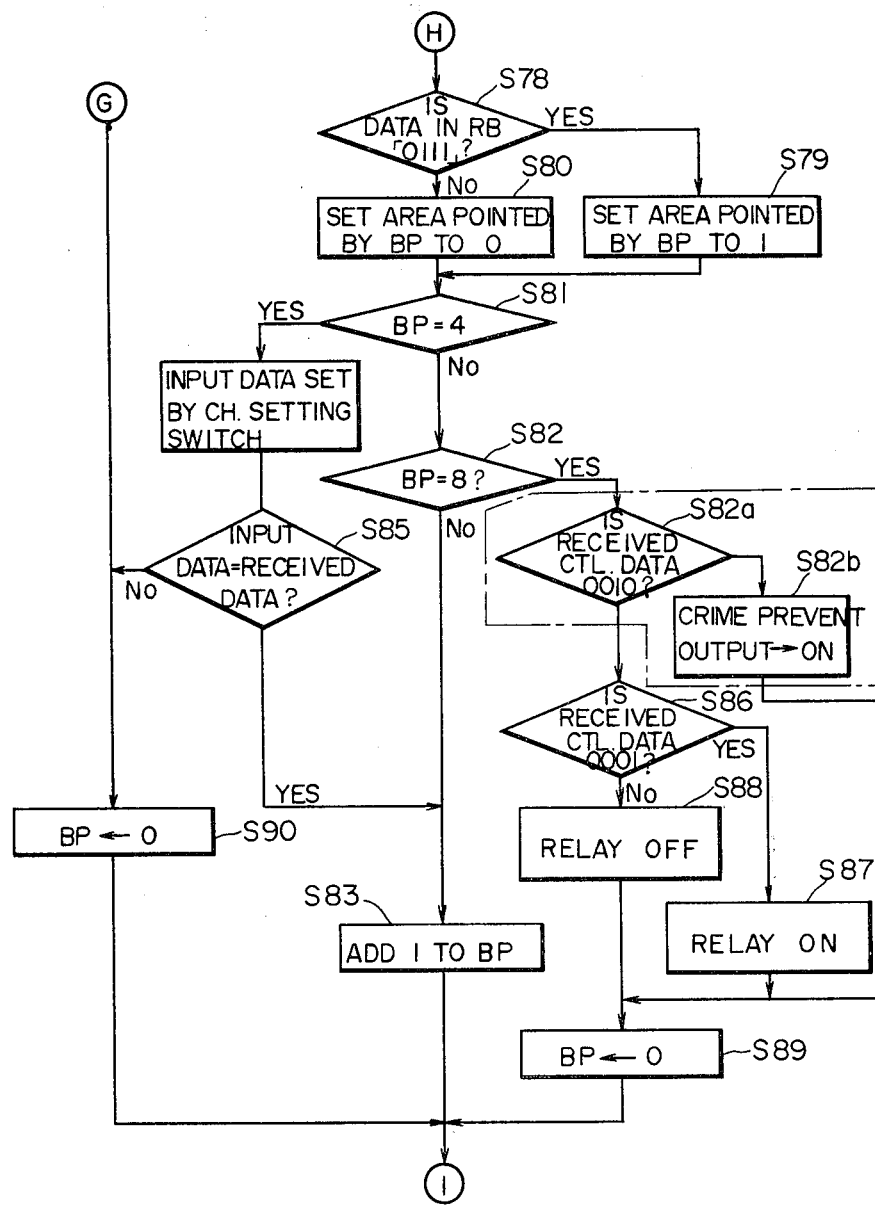
FIG. 15B is a flow diagram for the receiver provided corresponding to the flow diagram for the transmitter shown in FIG. 15A.

FIG. 15B is a flow diagram for the receiver provided corresponding to the flow diagram for the transmitter shown in FIG. 15A. Those steps encircled with one dotted line are applicable to the flow diagram shown in FIG. 6B-(3). FIG. 15B additionally contains only the step S82a for determining whether the control data as received is the crime preventing data or not, and the step S82b for setting the crime preventing output ON depending on the previous determination. Accordingly, it is not believed necessary to describe the FIG. 15B diagram in more detail.

Figure 16:
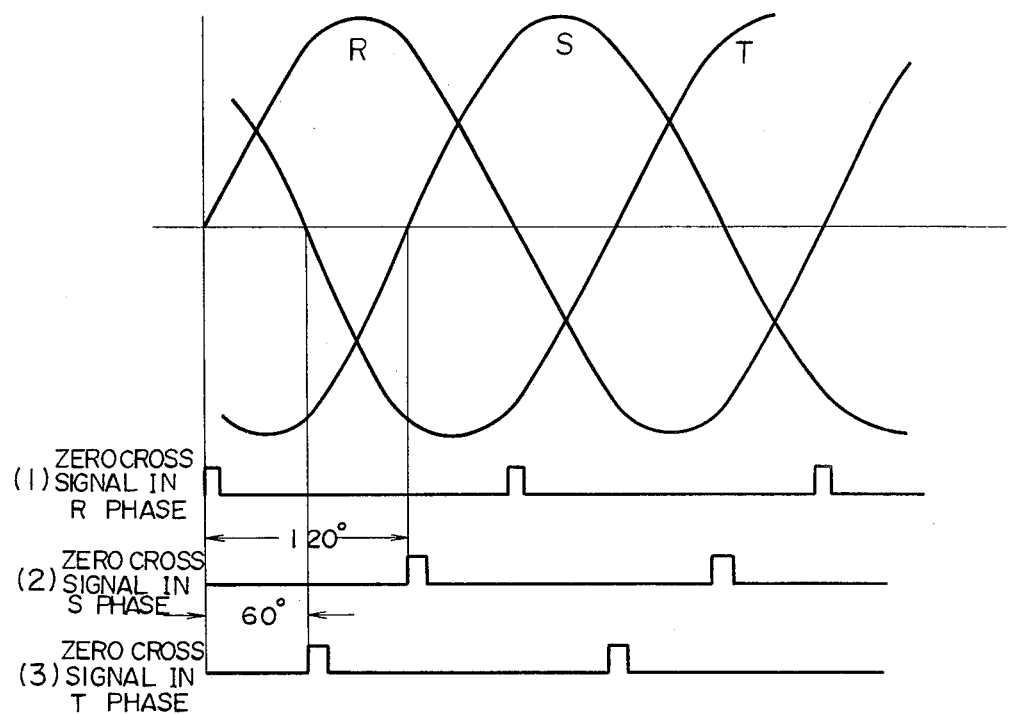
FIG. 16 is a graph showing waveforms of a 3-phase alternating current, and a clock or zero crossing signal generated in synchronism with each half cycle of each phase.

FIG. 16 is a graph showing waveforms of a 3-phase alternating current, and a clock or zero crossing signal gernerated in synchronism with each half cycle of each phase. As shown in FIG. 16, considering the R phase as a reference, the S phase has a phase difference of 120° and the T phase has a phase difference of 60°. Observing these phase differences in terms of the time axis, the phase difference of 120° corresponds to 6.6 millisecond and the phase difference of 60° corresponds to 3.3 milisecond in the case where the alternating current frequency is 50 Hz. Thus, in the case of the 3-phase alternating current, there exist the above described phase differences and thus the above described embodiment of the inventive signal transmission system cannot be properly used without any modification.

Figure 17:
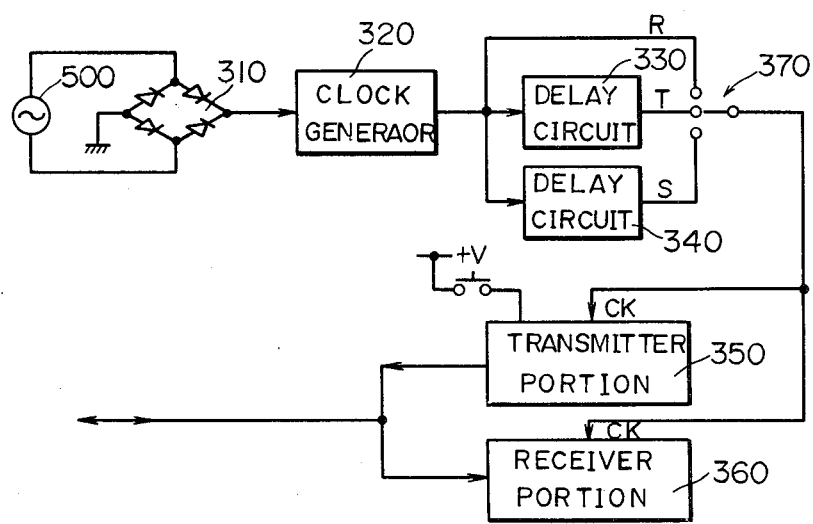
FIG. 17 is a block diagram of one embodiment for modifying the previously described embodiments to be adaptable to the 3-phase alternating current power supply.

FIG. 17 is a block diagram of one embodiment for modifying the previously described embodiments to be adaptable to the 3-phase alternating current power supply. Briefly described, the FIG. 17 embodiment is adapted such that one phase out of the three phases is selected as a reference and the clock signal or the zero crossing signal is obtained from the selected phase, whereupon a predetermined time period corresponding to the above described phase difference is delayed from the obtained clock, whereby the clocks or zero crossing signals for the remaining two phases are prepared in a pseudo-manner. Now referring to FIG. 17, the embodiment will be described in more detail. The R phase, for example, of the 3-phase alternating current power supply 500 is full-wave rectified by a full-wave rectifying circuit 310. A clock generating circuit 320 is responsive to the full-wave rectified output to provide a clock in synchronism with each half cycle of the R phase. In order to generate the clocks for the remaining two phases, i.e. the T phase and the S phase, based on the above described clock generated in synchronism with the R phase, the clock obtained from the clock generating circuit 320 is applied to a first delay circuit 330 and a second delay circuit 340. The first delay circuit 330 is adjusted such that the delay time period corresponds to the phase difference of 60° and the second delay circuit 340 is adjusted such that the delay time corresponds to the phase difference of 120°. As a result, the delay output from the first delay circuit 330 correspond to the clock output being generated responsive to the T phase and the delay output from the second delay circuit 340 correspond to the clock signal being generated responsive to the S phase. These three kinds of clock signals thus obtained are supplied through a selector switch 370 for selecting any one phase out of the R phase, the S phase and the T phase, to the transmitting portion 350 and the receiving portion 360. Accordingly, by properly selecting the selector switch 370, the clock signal corresponding to one phase is applied as a reference clock to the transmitting portion 350 and the receiving portion 360. If and when the reference clock signal is thus obtained, then the previously described transmission system described as applicable to the single phase alternating current can be employed in exactly the same manner.

Figure 18:
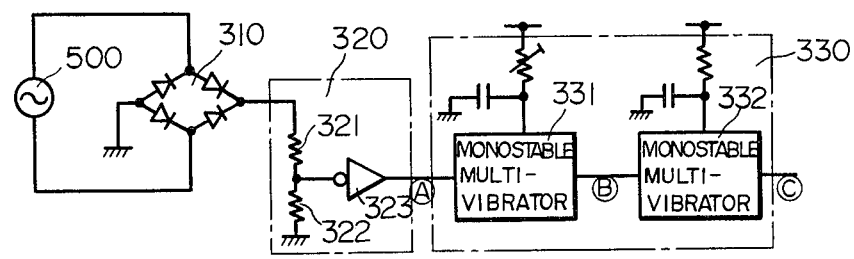
FIG. 18 is a block diagram showing in more detail the clock generating circuit and the delay circuit which are major portions of the FIG. 17 embodiment.
Figure 19:
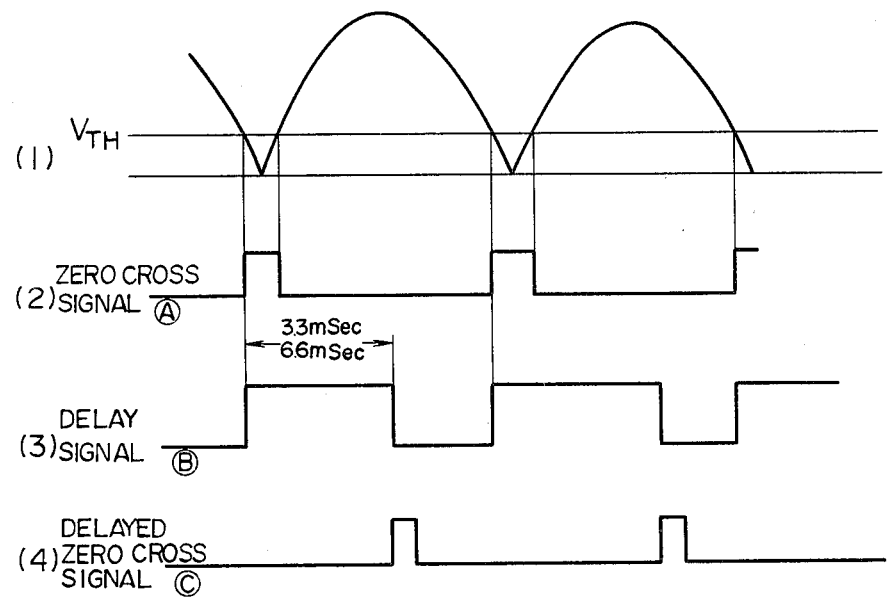
FIG. 19 is a graph showing waveforms for explaining the operation of the FIG. 18 diagram.

FIG. 18 is a block diagram showing in more detail the clock generating circuit and the delay circuit which are other major portions of the FIG. 17 embodiment. For the purpose of simplicity of illustration, however, the second delay circuit 340 has been omitted from illustration, because the structure and operation thereof is exactly the same as the first delay circuit 330, except for a difference of the delay time period. FIG. 19 is a graph showing waveforms for explaining the operation of the FIG. 18 diagram. Referring to FIG. 19 as well as FIG. 18, the structure and operation of the FIG. 18 embodiment will be described. The clock generating circuit 320 comprises voltage dividing resistors 321 and 322 and a voltage detecting circuit 323. The voltage detecting circuit 323 is adapted to have a predetermined threshold value $V_{TH}$ so that when the input voltage is lower than the above described threshold value $V_{TH}$ the output is obtained. The input and output of the clock generating circuit 320 are shown as (1) and (2) in FIG. 19. The first delay circuit 330 comprises a cascade connection of monostable multivibrators 331 and 332. The first monostable multivibrator 331 is responsive to the rise of the output ((2) in FIG. 18) of the above described voltage detecting circuit 323 to provide a pulse output having a pulse width of a time period corresponding to the phase difference of 60° in this case. The second monostable multivibrator 332 is responsive to the output of the rise of the monostable multivibrator 331 to provide a pulse output of a very small pulse width. The output of the monostable multivibrator 331 and the output of the monostable multivibrator 332 are shown as (3) and (4) in FIG. 19, respectively. As the result, it would be appreciated that the output of the delay circuit 330 is the delayed clock signal having the phase difference of 60° as compared with the clock generated by the clock generating circuit. Although not shown, in the case of the second delay circuit 340 the pulse width of the first monostable multivibrator is selected to be a time period corresponding to the phase difference of 120°, as is readily understood. Although the FIG. 18 embodiment employed monostable multivibrators as delay elements of delay circuits, alternatively counter circuits may be employed for digitally processing the pulses or RC time constant circuits may also be employed.

Figure 20:
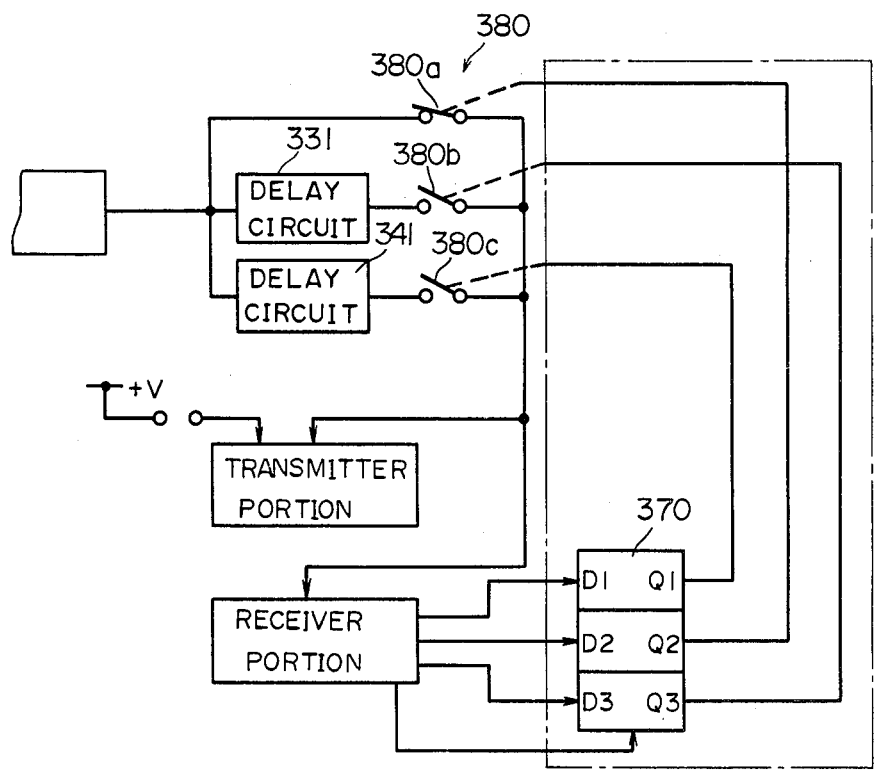
FIG. 20 is a block diagram showing another embodiment of a modification applicable to the 3-phase alternating current power supply.
Figure 21:
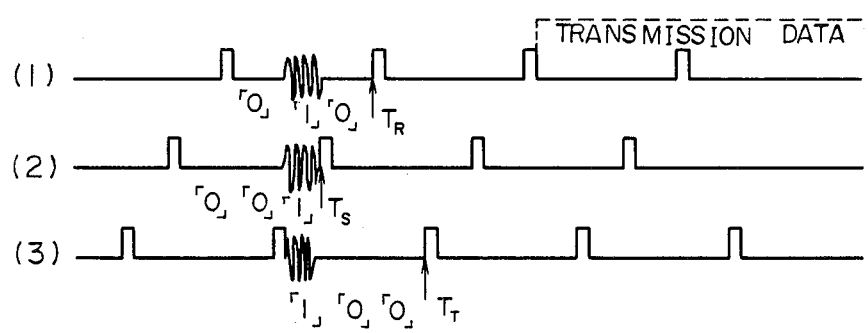
FIG. 21 shows the data of a predetermined format defined as a synchronizing signal in the system wherein the synchronizing signal of the format of "010" is employed.

FIG. 20 is a block diagram showing another embodiment of a modification applicable to the 3-phase alternating current power supply. The FIG. 20 embodiment is adapted to make phase setting conversion on the part of the receiver. Since the transmitter is adapted to transmit, before transmission, to the receiver a synchronizing signal in synchronism with a suitable phase, the receiver is adapted to receive the above described synchronizing signal. Although the received signal is subjected to a change due to the deviation of the zero crossing position on the part of the receiver, the above described deviation of the phase between the transmitter and receiver and the change of signal has some correlation. The FIG. 20 embodiment positively utilizes the above described predtermined correlation in implementing the circuit configuration. Now referring to FIGS. 20 and 21, the operation of the embodiment will be described.

As the premise of the embodiment, the transmitter is adapted to transmit the data of a predetermined format defined as a synchronizing signal in the system. In the case of the FIG. 21 example, the synchronizing signal of the format of "010" is employed and is transmitted. Therefore, the receiver is also adapted to receive the above described synchronizing signal of the particular code transmitted by the above described transmitter. More specifically, when a carrier wave signal is received in any of the subbits between the zero crossing signals it is determined that the synchronizing signal has been transmitted. Then at the time point when the following zero crossing signal occurs (such as at Ts, Tt, Tr in FIG. 21) the synchronizing signal detected pulses are obtained. At the same time at that time point presence or absence of the carrier wave at the respective subbits are latched in the three-bit latch 370. Since the synchronizing signals as received are those modified from the synchronizing signals as transmitted in terms of the code format depending on the phase difference between the transmitter and receiver, the phase setting selector switch 380 is selected responsive to the signals Q1, Q2 and Q3 of the latch 370. Since the code format of the synchronizing signal transmitted from the transmitter in the example in discussion is "010", the receiver receives the synchronizing signal as "010" in the case of the R phase, as "100" in the case of the T phase, and as "001" in the case of the R phase. The bit code thus received is latched in the latch 370 as described previously. As a result, if the data as latched in the latch 370 is "010", then the selector switch 380a is turned on, if the data latched in the latch 370 is "100", then the selector switch 380c is turned on, and if the data latched in the latch 370 is "001" the selector switch 380b is turned on. As a result, it follows that the delayed zero crossing signal on the part of the receiver comes to coincide with the zero crossing signal on the part of the transmitter. After the adjustment of the phases is thus made, the previously described embodiment of the transmitters and receivers can be applied to the 3-phase alternating current power supply.

FIG. 22A is a block diagram showing the transmitter implemented in a hardware configuration to achieve the flow diagrams previously described. The transmitter basically comprises a key entry portion, a data preparing portion, a transmission controlling portion, and an error detecting portion. Upon depression of the ON or OFF key switch in the key entry portion, the ON or OFF control data is latched and the transmission start data enabling the transmitting circuit is generated. When the key is depressed, the key entry signal is latched in the key entry latch circuit 610. The key entry latch circuit 610 comprises a flip-flop 611 for constituting the ON key flag area previously described, and a flip-flop 612 for constituting the OFF key flag area. These flip-flops are reset responsive to the END pulse to be described subsequently. When either the flip-flop 611 or 612 is set, the data of that instant is applied to the least significant digit of the control data of the transmission signal, whereby the control data of "0001" is prepared in the case of ON and the control data of "0000" is prepared in the case of OFF. The above described relation is determined by the connection of the output of the flip-flop 611 and the least significant digit position $p_0$ of the 9-bit shift register 630 to be described subsequently.

Figure 23:
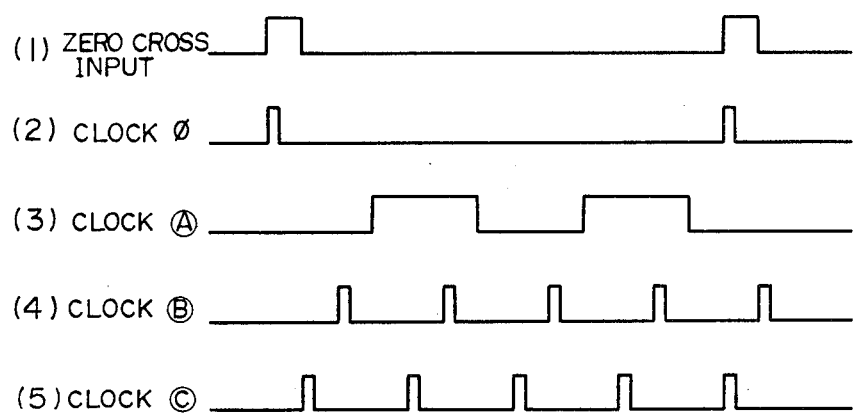
FIG. 23 shows signals for explaining the operation of the transmitter in FIG. 22A and the receiver in FIG. 22B.

The transmission start data generating circuit 620 is adapted to generate the transmission start data when all the transmission start conditions are met. As described previously in conjunction with the flow diagram, these conditions are (1) existance of a key entry of ON or OFF, (2) no detection of the busy signal, (3) no continuous detection of the busy signal by P times (waiting for P cycles; see FIG. 9), and (4) no detection of the busy signal for the cycle period of the channel code allotted (see the flow diagram in FIG. 11). When these conditions are met, the transmission start data is for the first time provided. In order to see whether these four conditions are met, the AND gate 621 is connected to receive the output from the key entry latch circuit 610, the inverted output of the busy signal detected output, the output from the P cycle waiting portion 640, and the output from the waiting portion 650 for waiting for a cycle period corresponding to the channel code. When these four conditions are met, the AND gate 621 is turned ON and the transmission enable signal of the high level is generated. In order to provide the above described transmission enable signal for one bit period allotted, a D type flip-flop 622 is provided. As described as (2) in FIG. 23, the signal φ being applied to the clock input of the D type flip-flop 622 is a clock pulse of a narrow width in synchronism with the rise of the zero crossing input. The Q output of the D type flip-flop 622 and the output of the above described AND gate 621 are applied to the AND gate 623. As the result, the transmission start data is provided only for one bit period.

The data preparing portion is adapted to parallel/serial convert the channel code set by the channel setting switch and the control data of ON/OFF responsive to the input of the above described transmission start data and to provide the converted output to the transmission controlling portion. More specifically, in the case where the transmission start data is generated, for the purpose of waiting for one cycle when the transmission controlling portion provides the transmission start data, first the transmission start data as generated is applied to the D type flip-flop 661 included in the transmission bit counter 660, whereby one cycle period is delayed. Thereafter the RS latch 662 is set. The set output is applied to one input of the AND gate 663. The other input of the AND gate 663 is connected to receive the clock φ. As a result, the output of the AND gate 663 is applied to the shift register 630 as a shift pulse in synchronism with the clock φ. The shift register 630 comprises a one field data memory of 9 bits. The shift register 630 is supplied with the channel data and the control data and is responsive to the above described shift pulse to provide the data in a serial fashion. The above described shift pulse is also counted by the four bit counter 664. When the eighth pulse is counted and the ninth pulse is to be counted, the count output as decoded responsive to the ninth shift pulse is applied to the above described RS latch 662 and the above described shift register 630 to reset the same. Furthermore, the count output as decoded responsive to the ninth shift pulse is also applied to the reset input of the key input latch circuit as an END pulse. In the above described transmission bit counter 660, the latch output of the above described RS latch 662 and the transmission start data from the above described transmission start data generating circuit 620 are applied to the OR gate 665. The output of the OR gate 665 is obtained as a transmission enable signal. The transmission enable signal is applied to evaluate the logical sum of the same, the transmission start data and the RS latch output, so that the transmission enable signal assumes the high level during a time period from the rise of the transmission start data until the above described END pulse.

Now the transmission controlling portion converts the signal from the data preparing portion into a predetermined signal format, thereby to provide a desired transmission output signal.

Furthermore the error detecting portion serves to check the reception signal. First the receiving portion 670 always receives the signal on the transmission line. As a result, whether another transmitter is in process of transmission may be monitored and the receiving portion may monitor whether its own transmission data is influenced by noise or the like. The input signal from the reception signal input terminal is applied to the counter 671. The counter 671 operates in accordance with the reception signal read out subroutine previously described in conjunction with FIG. 6B. First the counter 671 is reset responsive to a timing pulse shown as (5) in FIG. 23 and the count value is transferred to the shift register of the next stage at the timing as shown as (4) in FIG. 23. If and when the number counted by the counter 671 during a time period between the reset timing and the read-in timing is larger than a predetermined number, it is determined that the subbit data is "1" and the data is read in the shift register of the next stage. Such operation is carried out four times during one cycle of the zero crossing input. Accordingly, it follows that the data of the second, third and fourth subbits have been stored in the shift register 672. It is pointed out that in the FIG. 22A embodiment determination of the first subbit has been omitted. Therefore, the second subbit comes to the Q3 output of the shift register 672, so that the Q3 output is obtained, whereby the AND gate 621 is notified whether the signal exists on the transmission line. Meanwhile, the Q1 output of the shift register 672 always provides the data of the immediately preceding subbit. Accordingly, it is checked whether the transmission data has been properly transmitted, through comparison of the above described subbit data from shift register 672 and the output of the transmission controlling portion. In the case where these are different, a transmission error signal is obtained through comparison made by the subbit data comparing portion 680.

Now an operation on the occasion of an error will be briefly described. First consider a case where another transmitter is in process of transmission on the occasion of key entry. Since the transmission progressing signal, i.e. the busy signal being applied to the input of the AND gate 621 included in the transmission start data generating circuit 620 in the key entry portion is the high level, the AND gate 621 is off and accordingly the transmission start data is not obtained. The P counter 641 of the p cycle waiting portion 640 has been reset responsive to the above described busy signal. If and when the busy signal becomes the low level, the resetting of the P counter 641 is released and as a result the P counter is enabled. When the count number within P-counter 641 becomes P, the output of the high level is applied from the P counter 641 to the AND gate 621. After the high level output is obtained from the P counter 641, the counting operation is stopped. As a result, it follows that with a delay of p cycles the transmission start data is obtained. When the line becomes busy again, the P counter 641 is again reset and the above described operation is repeated.

Now consider a case where a transmission error occurs. Since the transmitter of the embodiment always monitors the signal on the transmission line, an error pulse is generated in the case where a signal different from its own transmission data is received. This detection is carried out for each subbit. When the error pulse is generated, the P counter 641 is reset and at the same time the error latch 652 is reset and the transmission bit counter portion 660 is also reset, so that transmission is stopped. Thereafter the P counter 641 starts a counting operation up to P. The clock is obtained responsive to the counter up output P and is applied to the down counter 651. The down counter 651 is responsive to the above described error pulse to preset the channel code data. After the number of times corresponding to the channel code is counted, the zero output of the down counter 651 becomes high and is applied to the input of the AND gate 621 included in the transmission start data generating circuit. On completion of transmission, the error latch 652 is reset responsive to the above described END signal, whereby the transmitter is returned to a normal state.

Figure 22B:
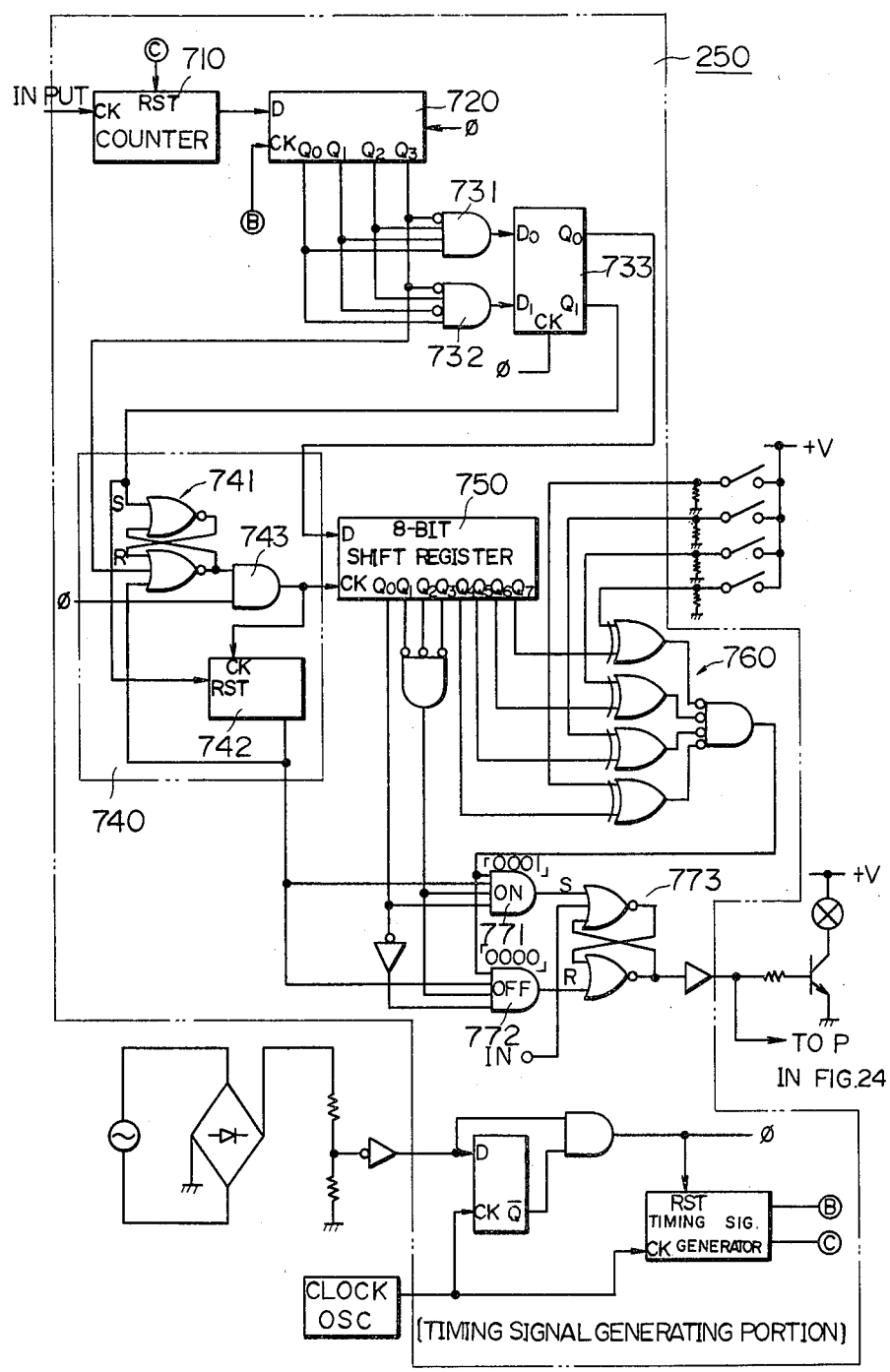
FIG. 22B is a schematic diagram for achieving the operation of the flow diagram of the receiver previously described.

FIG. 22B is a schematic diagram for achieving the operation of the flow diagram of the receiver previously described. The reception input is detected based on whether the pulses counted by counter 671 of the transmitter number more than a predetermined number. The detected signal is written in the four-bit shift register 720 at the timing shown as (4) in FIG. 23 and is converted into the parallel data of four subbits. The parallel outputs Q0, Q1, Q2 and Q3 of the shift register 720 are applied to the AND gate 731 for detection of the data "1" and the AND gate 732 for detection of the transmission start data. If and when the transmission start data is detected and the output of the AND gate 732 becomes high, the high level signal is obtained from the Q1 output of the D latch circuit 733. The high level signal of the Q1 output means the start mark signal has been received. Responsive to reception of the start mark, the flip-flop 741 included in the transmission bit counter 740 is set and the counter 742 is reset. Responsive to the transmission start data obtained from the transmission bit counter 740, the clock is aplied to the 8-bit shift register 750. At the time when the 8-bit data is applied, the shifting operation of the shift register 750 is stopped. The received channel data stored in the 8-bit shift register 750 is compared with the data set by the channel setting switch of the receiver by means of the comparing circuit 760. On the other hand, in order to see whether the control data stored in the shift register 750 is the ON control data or the OFF control data, the above described control data is applied to the AND gates 771 and 772. These AND gates 771 and 772 are enabled responsive to the coincidence output from the above described comparing circuit 760. The output of the AND gate 771 is coupled to the set output of the flip-flop 773 and the output of the AND gate 772 is coupled to the reset input of the flip-flop 773. As a result, the ON or OFF control data is obtained and the output relay is turned on or off. The set input IN of the flip-flop 773 is supplied with the control signal prepared by the transmitter as to be described subsequently. Generation of the control signal will be described in more detail with reference to FIG. 24.

Figure 24:
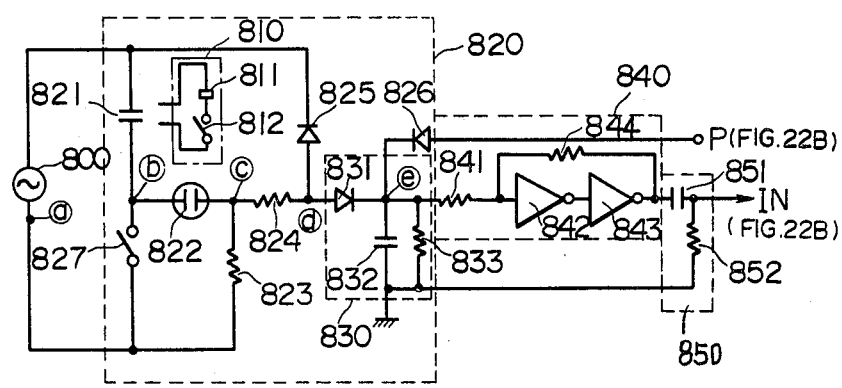
FIG. 24 is a schematic diagram of a modification of a portion of the receiver.

FIG. 24 is a schematic diagram of a modification of a portion of the receiver so far described in the foregoing. The transmission system described in the foregoing was adapted to transmit the predetermined control signal by operating the operation push-button switch from the end of the transmitter for the purpose of ON/OFF controlling a means being controlled on the part of the receiver. Accordingly, inconvenience was involved in that the means being controlled on the part of the receiver cannot be controlled without the transmitter in hand. Accordingly, it was required that in order to on/off control the means being controlled one has to go to the place where the transmitter is installed or where the means being controlled is directly coupled to the alternating current power supply without controlling the means via the receiver. Under these circumstances, the embodiment shown is aimed to provide the ON control signal from the part of the receiver by turning on a machine switch provided in the means being controlled, even when no ON control signal is applied from the transmitter. Briefly described, the embodiment is adapted such that, by operating the machine switch provided on the part of the receiver, a similar control signal is obtained in a constructive manner from the receiver, as in the case where the control signal transmitted from the transmitter is received to control the means being controlled. The signal thus obtained is applied to the input IN of the FIG. 22B diagram. As a result, the control signal for controlling the means being controlled is obtained even from the receiver. Referring to FIG. 24, a circuit for generating a control signal through operation of the machine switch is shown. The circuit is connected to the alternating current power supply 800. Although not shown, a receiving circuit as shown in FIG. 2 is connected to the alternating current power supply 800. More specifically, a series connection circuit of the outlet 821 and the ON/OFF contact 827 is connected to the power supply 800. A load 810 including a series circuit of a means being controlled 811 such as a television receiver, a lamp, or the like and the machine switch 812 is connected to the above described outlet 821. Connection of the load 810 to the outlet 821 is detected by the load detecting circuit 820. The load detecting circuit 820 comprises a neon lamp 822 serving as a voltage absorbing element coupled to the junction ⓑ between the above described outlet and the above described ON/OFF contact. The neon lamp 822 is connected to the resistor 823 in series therewith and the series connection is connected in parallel with the ON/OFF contact 827. The junction ⓒ of the series connection is connected through the resistor 824 to the rectifying circuit 830. The rectifying circuit 830 comprises a diode 831, and a parallel circuit of a capacitor 832 and a resistor 833 connected in series with the diode 831. The rectified output from the rectifying circuit 830 is applied to the waveform shaping circuit 840. The waveform shaping circuit 840 comprises two series connected inverter gates 842 and 843, and resistors 841 and 844. The wave shaped output is differentiated by the subsequent stage differentiating circuit 850 and the differentiated output is applied to the terminal IN shown in FIG. 22B. The output from the junction ⓔ between the diode 831 and the series connection of the capacitor 832 and the resistor 833 in the above described rectifying circuit 830 is connected through the diode 826 to the P terminal. The rectifying input is bypassed from the input of the above described rectifying circuit 830 through the diode 825 to the alternating current power supply 800.

FIG. 25 is a graph showing waveforms for explaining the operation of the FIG. 24 embodiment, wherein the waveforms (1) to (6) each show the signals appearing at the junctions ⓐ to ⓕ in FIG. 24. Now referring to the waveforms shown in FIG. 25, the operation of the FIG. 24 embodiment will be described. First considering a case where no load 810 is connected to the outlet 821, no voltage is generated across the resistor 823. The voltage in such a case is a voltage in the direction for charging the capacitor 832. Accordingly, the output of the rectifying circuit 830 is zero. Now consider a case where the load 810 is connected and the machine switch 812 is turned on with the ON/OFF contact 827 opened, i.e. in the off state. Accordingly, an alternating current voltage is applied through the neon lamp 822 across the resistor 823. The applied voltage is applied through the resistor 824 to the rectifying circuit 830. Therefore, the capacitor 832 of the rectifying circuit 830 is charged and the voltage of the capacitor 832 increases. When the voltage across the capacitor becomes larger than a predetermined voltage, the waveform shaping circuit 840 becomes operable. More specifically, the output of the inverter gate 843 which was the low level at the beginning becomes the high level. As the output of the inverter gate 843 turns to the high level, the differentiation circuit 850 provides a pulse of a predetermined width. The above described pulse is applied to the terminal IN of FIG. 22B. The flip-flop 773 in FIG. 22B is responsive to the pulse to be set and the output relay is driven. The above described operation is considered with reference to the waveforms shown in FIG. 25. When the load 810 has not been connected to the outlet 821, a waveform A shown as (3) in FIG. 24 appears across the resistor 823. If and when the load 810 is connected to the outlet 821, the voltage is obtained during the positive half cycle rather than the negative voltage cycle. In order that the voltage A of the voltage shown as (3) in FIG. 24 may not be applied to the rectifying circuit 830, the diode 825 is provided for the purpose of bypassing to the voltage source 800. As a result, the voltage as shown as (4) in FIG. 25 is applied to the rectifying circuit 830. The rectified output from the rectifying circuit 830 is shown as (5) in FIG. 25. As seen from (5) in FIG. 25, for each positive half cycle the voltage level is increased. As seen from (6) in FIG. 25, the time point when the rectified output from the rectifying circuit 830 exceeds a predetermined voltage level, the output of the high level is obtained from the junction (f).

Thus, the load detecting circuit 820 detects whether the load 810 has been connected by applying the alternating current voltage to the load 810 and therefore no problem is caused even when a resistive load such as a lamp and other load are connected to the load 810. Since a voltage absorbing element such as the neon lamp 822 is employed across the load means being controlled 811, a voltage minus the voltage drop across the neon lamp 822 is applied across the load 810. Accordingly, in the case where the load is a fluorescent lamp, a glow lamp is not kept lighted and hence the life of the glow lamp is not shortened. Furthermore, since a voltage in the direction toward the neon lamp 822 through the resistor 823 (referred to as a diverse directional voltage) out of the voltage being applied to the resistor 823 is bypassed by means of the diode 825, the capacitor 832 is not charged. In the case where the capacitor 832 had been charged due to the above described diverse directional voltage, the load detecting circuit 820 had not been operated. Furthermore, after the ON/OFF contact 827 is turned on, a voltage in the direction for charging the capacitor does not occur across the resistor 823, but since the P point of the receiving circuit (FIG. 22B) has been connected to the capacitor 832 through the diode 826, the capacitor 832 is placed in a state of being supplied with the voltage when the ON/OFF contact 827 is turned on, i.e. the P point of the receiving circuit is the high level. Accordingly, the load detecting circuit 820 will not be operated on the occasion of a normal ON/OFF controlling by the transmitter and is operated only when the load 810 is connected.

Figure 27:
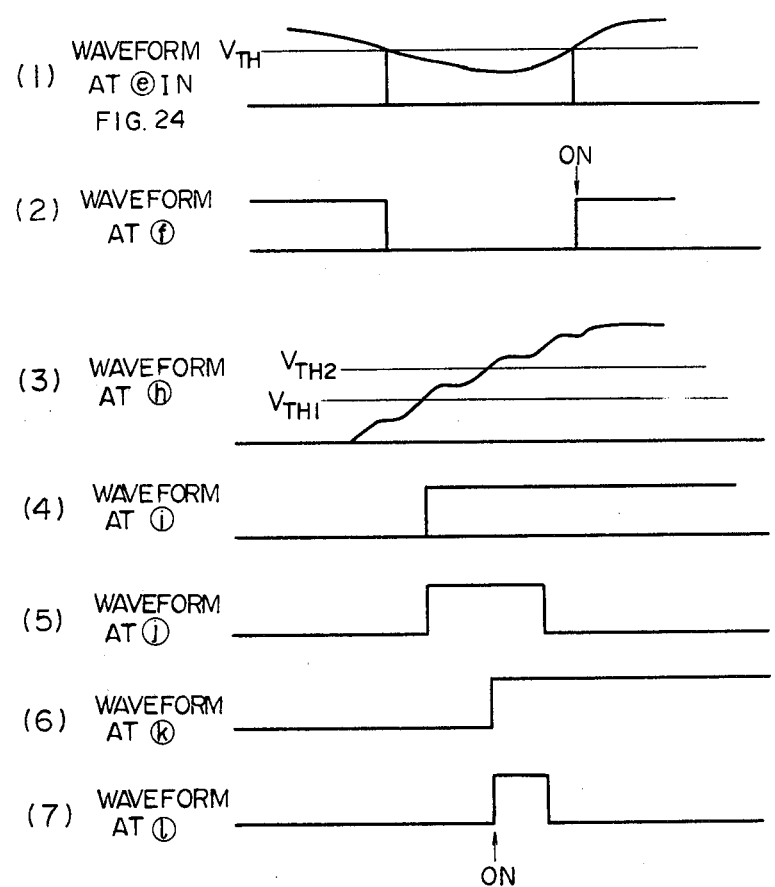
FIG. 27 is a graph showing waveforms for explaining the operation of the FIG. 26 diagram.

FIG 26 is a schematic diagram of a modification of the FIG. 24 diagram. FIG. 27 is a graph showing waveforms for explaining the operation of the FIG. 26 diagram. According to the FIG. 24 embodiment, due to a fluctuation of the load and a fluctuation of the power source voltage, it could happen that the output of the rectifying circuit 830 does not become as shown as (5) in FIG. 25 but rather the output voltage of the rectifying circuit 830 fluctuates in the vicinity of the threshold value as shown as (1) in FIG. 27. As a result, the same output voltage as in the case where the load is detected is obtained and malfunction could occur. Therefore, in the FIG. 24 embodiment the comparators 861 and 862 are connected in parallel and to the rectifying circuit 830. The output of the comparator 861 is applied to the rise detecting circuit 863. The output of the pulse rise detecting circuit 863 and the output of the above described second comparator 862 are applied to the AND gate 864. Because of the above described structure, only when the output of the comparator 2 is obtained within a predetermined time period upon detection by the comparator 861, the load detected output is obtained from the AND gate 864. The above described operation will be readily understood from the waveforms shown in FIG. 27. More specifically, the threshold value of the comparator 861 is set to be lower than the threshold value of the comparator 862 (see (3) in FIG. 27). Accordingly, the comparator 861 provides the output of the high level earlier than the comparator 862 (see (4) in FIG. 27). The comparator 862 provides the high level signal later than the comparator 861 (see (6) in FIG. 27). The output of the comparator 862 and the pulse output of a predetermined pulse width generated from the pulse rise detecting circuit responsive to the output of the comparator 861 are ANDed by the AND gate 864. The output of the AND gate 864 is used as a control signal and is shown as (7) in FIG. 27.

The term "cycle" shown and used in the preferred embodiments is a half cycle of an alternating current power supply. However, it is to be understood that a full cycle of an alternating current power supply may also be employed for the purpose of the present invention. Thus, according to the present invention, a full cycle may be divided into at least two phase sections or alternatively only one half cycle of a full cycle may be used for transmission of the data and thus may be divided into at least two phase sections. Therefore, it is intended that the term "cycle" used in the claims includes both of a half cycle and a full cycle of an alternating current power supply.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data transmission system utilizing a power line coupled to an alternating current power supply for transmission of data having a plurality of bits, said data being transmitted in synchronism with the cycles of said alternating current power supply, said data transmission system comprising:
 a plurality of transmitters coupled to said power line; and
  a plurality of receivers coupled to said power line;
   each said transmitter including:
    synchronizing signal generating means responsive to the cycles of said alternating current for generating a synchronizing signal in synchronism with the cycles of said alternating current,
    data generating means for generating data for transmittal, said data including receiver identifying information for identifying one of said receivers to receive said data being transmitted and control information for representing a control to be made in said one receiver, busy state information generating means for generating information representing that said data is being transmitted by said data generating means, each cycle of said alternating current comprising a first phase section for transmission of said busy state information and a second phase section for transmission of said data, transmitting means responsive to said synchronzing signal generating means of said transmitter, said data generating means and said busy state information generating means for transmitting a high frequency carrier wave signal representing said busy information in said first phase section of each cycle of said alternating current and for transmitting a high frequency carrier wave signal representing said data in said second phase section of each cycle of said alternating current, receiving means for receiving said high frequency carrier wave signal transmitted by other ones of said transmitters, and transmission inhibiting means operatively coupled to said receiving means of said transmitter and said transmitting means of said transmitter for inhibiting transmission of said high frequency carrier wave signal in response to said busy state information of other transmitters;

each said receiver including:

synchronizing signal generating means responsive to the cycles of said alternating current for generating a synchronizing signal in synchronism with the cycles of said alternating current, receiving means responsive to said synchronizing signal generating means for receiving said high frequency carrier wave signals in said first and second phase sections of each cycle of said alternating current, and decoding means responsive to said receiving means of said receiver for decoding said receiver identifying information and said control information being transmitted and for providing a control signal associated with said control information provided to said one receiver identified by said receiver identifying information.

2. A data transmission system in accordance with claim 1, wherein said data in each said second phase section of each cycle of said alternating current constitutes one-bit of information, said data being transmitted over a plurality of cycles of said alternating current to thereby constitutes one field of said data having a plurality of bits in a bit serial code fashion.

3. A data transmission system in accordance with claim 1, wherein said transmitter further comprises means for entering an enabling signal for enabling generation of said data to be transmitted;

said transmission inhibiting means of said transmitter comprising enabling means responsive to the presence of said enabling signal and absence of said busy state information from said receiving means of said transmitter for enabling transmission of said data and said busy state information.

4. A data transmission system in accordance with claim 3, wherein said entry means includes storing means for storing said enabling signal.

5. A data transmission system in accordance with claim 4, wherein each said receiver comprises:

reply data generating means responsive to said control signal from said decoding means for generating reply data representing that said control signal is provided, and transmitting means responsive to said synchronizing signal generating means of said receiver and said reply data generating means for transmitting a high frequency carrier wave signal representing said reply data in said second phase section of at least one cycle of said alternating current.

6. A data transmission system in accordance with claim 5, wherein each said transmitter comprises means responsive to said reply data received by said receiving means of said transmitter for resetting said storing means of said entry means of said transmitter.

7. A data transmission system in accordance with claim 5, wherein each said transmitter comprises reenabling means responsive to non-reception of said reply data by said receiving means of said transmitter from said receivers for repeating transmission of said high frequency carrier wave signal by said transmitting means for a predetermined number of times.

8. A data transmission system in accordance with claim 7, wherein said predetermined number of times said transmission is repeated by said repeating means is selected to be different for different kinds of said control data.

9. A data transmission system in accordance with claim 7, wherein each said transmitter further includes, disabling signal providing means responsive to receipt of said reply data by said receiving means of said transmitter from said receivers for providing a disabling signal, and disabling means responsive to said disabling signal of said disabling signal providing means for disabling said reenabling means.

10. A data transmission system in accordance with claim 3, wherein said receiving means of said transmitter includes non-busy state detecting means for detecting the absence of said busy state information.

11. A data transmission system in accordance with claim 10, wherein said non-busy state detecting means includes means responsive to non-detection of said busy state information during a predetermined number of cycles to ensure the absence of said busy state information.

12. A data transmission system in accordance with claim 11, wherein said predetermined number is selected to be different for each said transmitter.

13. A data transmission system in accordance with claim 1, wherein said decoding means of each said receiver comprises:

receiver identifying information setting means for presetting the receiver identifying information associated with each said receiver;

comparing means for comparing said receiver identifying information received by said receiving means of said receiver and said preset receiver identifying information and for providing an output upon coincidence thereof, and control signal providing means responsive to said coincidence output of said comparing means for providing said control signal associated with said control information provided to said one receiver.

14. A data transmission system in accordance with claim 1, wherein each said receiver comprises means to be controlled responsive to said control signal.

15. A data transmission system in accordance with claim 14, wherein said means to be controlled includes a switch ON/OFF controlled in response to said control signal, and a machine controlled by said switch.

16. A data transmission system in accordance with claim 1, wherein
each said cycle of said alternating current further comprises a third phase section where no high frequency wave signal is transmitted;
each said transmitter further including,
noise detecting means for detecting a noise being superimposed on said alternating current during said third phase section of the cycles of said alternating current, and
disabling means responsive to said noise detected by said noise detecting means for disabling said transmitting means of said transmitter.

17. A data transmission system in accordance with claim 1, wherein the second phase section comprises a first half phase portion and a latter half phase portion, said first half phase portion and said latter half phase portion being used for representing four different logical patterns for representing said data being transmitted, first and second ones of said different logical patterns representing the logic one and the logic zero.

18. A data transmission system in accordance with claim 17, wherein the third logical pattern of said four different logical patterns represents the start of transmission of said data.

19. A data transmission system in accordance with claim 17, wherein the fourth logical pattern of said four different logical patterns represents the end of transmission of said data.

20. A data transmission system in accordance with claim 1, wherein
said alternating current power supply is of a three-phase alternating current, and
said synchronizing signal generating means of at least one of each said transmitter and each said receiver comprises
means responsive to one phase of said three-phase alternating current for generating three different phase signals representing the phases of said three-phase alternating current, and
selecting means for selecting one out of said three different phase signals, whereby said phase signal selected by said selecting means is used as said synchronizing signal.

* * * * *